United States Patent
Johnson et al.

(10) Patent No.: US 11,341,410 B1
(45) Date of Patent: *May 24, 2022

(54) SUBSURFACE STRESS CRITICALITY ASSOCIATED WITH FLUID INJECTION AND DETERMINED USING MACHINE LEARNING

(71) Applicant: Triad National Security, LLC, Los Alamos, NM (US)

(72) Inventors: Paul Allan Johnson, Nambe, NM (US); Claudia L. Hulbert, Los Alamos, NM (US); Bertrand Rouet-Leduc, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 220 days.

This patent is subject to a terminal disclaimer.

(21) Appl. No.: 16/706,166

(22) Filed: Dec. 6, 2019

Related U.S. Application Data

(63) Continuation-in-part of application No. 16/212,448, filed on Dec. 6, 2018, now Pat. No. 11,169,288.
(Continued)

(51) Int. Cl.
*G06N 3/08* (2006.01)
*G06N 5/02* (2006.01)
(Continued)

(52) U.S. Cl.
CPC .............. *G06N 3/08* (2013.01); *G06N 5/02* (2013.01); *G06N 20/10* (2019.01); *G06N 20/20* (2019.01)

(58) Field of Classification Search
CPC .......... G06N 3/08; G06N 20/20; G06N 20/10; G06N 5/02
See application file for complete search history.

(56) References Cited

U.S. PATENT DOCUMENTS

| | | |
|---|---|---|
| 6,062,083 A | 5/2000 | Dunegan |
| 6,615,648 B1 | 9/2003 | Ferguson et al. |
| | (Continued) | |

FOREIGN PATENT DOCUMENTS

| | | |
|---|---|---|
| GB | 2467419 A | 8/2010 |

OTHER PUBLICATIONS

Adeli et al., "A probabilistic neural network for earthquake magnitude prediction," *Neural Networks*, vol. 22, pp. 1018-1024 (May 2009).

(Continued)

*Primary Examiner* — Elias Desta
(74) *Attorney, Agent, or Firm* — Klarquist Sparkman, LLP

(57) ABSTRACT

Machine-learning methods and apparatus are disclosed to determine critical state or other parameters related to fluid-driven failure of a terrestrial locale impacted by anthropogenic activities such as hydraulic fracturing, hydrocarbon extraction, wastewater disposal, or geothermal harvesting. Acoustic emission, seismic waves, or other detectable indicators of microscopic processes are sensed. A classifier is trained using time series of microscopic data along with corresponding data of critical state or failure events. In disclosed examples, random forests and artificial neural networks are used, and grid-search or EGO procedures are used for hyperparameter tuning. Once trained, the classifier can be applied to live data from a fluid injection locale in order to assess a frictional state, assess seismic hazard, assess permeability, make predictions regarding a future fluid-driven failure event, or drive engineering solutions for mitigation or remediation. Variations are disclosed.

22 Claims, 28 Drawing Sheets

Related U.S. Application Data

(60) Provisional application No. 62/776,281, filed on Dec. 6, 2018, provisional application No. 62/776,281, filed on Dec. 6, 2018, provisional application No. 62/596,001, filed on Dec. 7, 2017.

(51) Int. Cl.
  G06N 20/10 (2019.01)
  G06N 20/20 (2019.01)

(56) References Cited

U.S. PATENT DOCUMENTS

| | | | | |
|---|---|---|---|---|
| 10,364,662 | B1 * | 7/2019 | Basu | G06N 20/00 |
| 10,546,072 | B2 * | 1/2020 | Holland | E21B 49/02 |
| 2016/0070614 | A1 | 3/2016 | Joshi et al. | |
| 2019/0120044 | A1 * | 4/2019 | Langnes | E21B 47/135 |

OTHER PUBLICATIONS

Alt et al., "In Situ Stress and Active Faulting in Oklahoma," *Bulletin of the Seismological Society of America*, vol. 107, No. 1, pp. 1-13 (Dec. 2016).
Asencio-Cortés et al., "Earthquake Prediction in California Using Regression Algorithms and Cloud-based Big Data Infrastructure," pp. 1-29, (preprint submitted to Elsevier Sep. 2017). (also published as Asencio-Cortés et al., "Earthquake Prediction in California Using Regression Algorithms and Cloud-based Big Data Infrastructure," *Computers & Geosciences*, vol. 115, pp. 198-210, (Jun. 2018)).
Asim et al., "Seismic activity prediction using computational intelligence techniques in northern Pakistan," 13 pages, (Sep. 2017) (also published as Asim et al., "Seismic activity prediction using computational intelligence techniques in northern Pakistan," *Acta Geophys.*, vol. 65, No. 5, pp. 919-930, (Oct. 2017)).
Bohnhoff et al., "Fault mechanisms of induced seismicity at the superdeep German Continental Deep Drilling Program (KTB) borehole and their relation to fault structure and stress field," *Journal of Geophysical Research: Solid Earth*, vol. 109, B02309, pp. 1-13 (Feb. 2004).
Bouchon, et al., "Potential slab deformation and plunge prior to the Tohoku, Iquique and Maule earthquakes," *Nature Geoscience*, vol. 9, pp. 380-383, (May 2016).
Capelli, "Acoustic Emissions from Progressive Failure of Snow," Doctoral Thesis downloaded from https://www.research-collection.ethz.ch/bitstream/handle/20.500.11850/292791/PhDThesis_CapelliAchille.pdf?seguence=8&isAllowed=y on Oct. 16, 2018, pp. 1-129 (apparently dated Oct. 2018).
Corbi, "Analog modelling of subduction megathrust earthquakes: challenges, applications and future directions," *Geophysical Research Abstracts*, vol. 20, EGU2018-6549, 2018, EGU General Assembly 2018.
Delorey et al., "Tidal triggering of earthquakes suggests poroelastic behavior on the San Andreas Fault," LA-UR-15-26081, 63 pages (Apr. 2017) (also published as Delorey et al., "Tidal triggering of earthquakes suggests poroelastic behavior on the San Andreas Fault,", *Earth and Planetary Science Letters*, vol. 460, pp. 164-170 (Feb. 2017)).
Goebel, "Statistical Seismology and Rock Mechanics: Where is the connection?", downloaded from http://dornsife.usc.edu/tgoebel/research/ on Nov. 3, 2017, *Department of Earth Sciences, University of Southern California*, pp. 1-6.
Hulbert et al., "Characterizing Slow Slip Applying Machine Learning," *American Geophysical Union, Fall Meeting 2017*, Abstract #S53F-06 (Aug. 2017).
Hulbert et al., "Estimating the physical state of a laboratory slow slipping fault from seismic signals," *arXiv*:1801.07806, pp. 1-16 (Jan. 2018).
Hulbert et al., "Learning the Timing of Failure Machine learning for the timing and magnitude of laboratory slow slips," 32 pages (Aug. 2017).
Hulbert et al., "Similarity of fast and slow earthquakes illuminated by machine learning," *Nature Geoscience*, vol. 12, No. 1, pp. 69-74 (Dec. 17, 2018).
Hutterer, "About to Crack," 1663, pp. 14-17 (Apr. 2014).
Kossobokov, "Earthquake prediction: 20 years of global experiment," *Nat Hazards*, vol. 69, pp. 1155-1177, (Nov. 2013).
Langenbruch et al., "How will induced seismicity in Oklahoma respond to decreased saltwater injection rates?", *Sci. Adv. 2*, e1601542, pp. 1-9 (Nov. 2016).
Maceira et al., "Joint inversion of surface wave velocity and gravity observations and its application to central Asian basins shear velocity structure," *Journal of Geophysical Research: Solid Earth*, vol. 114, B02314, pp. 1-18 pages (Feb. 2009).
"Machine-learning earthquake prediction in lab shows promise," downloaded from https://www.lanl.gov/discover/news-release-archive/2017/August/0830-machine-learning-earthquake-prediction.php on Oct. 18, 2017, pp. 1-3 (document marked Aug. 2017).
Martinez-Garzon et al., "Stress tensor changes related to fluid injection at the Geysers geothermal field, California," *Geophysical Research Letters*, vol. 40, No. 11, pp. 2596-2601 (Jun. 2013).
Martinez-Garzon et al., "Sensitivity of stress inversion of focal mechanisms to pore pressure changes," *Geophysical Research Letters*, vol. 43, pp. 8441-8450 (Aug. 2016).
Messer, "Slow earthquakes: It's all in the rock mechanics," Penn State News, downloaded from https://news.psu.edu/story/277292/2013/05/20/research/slow-earthquakes-its-all-rock-mechanics on Nov. 3, 2017, pp. 1-2 (document marked May 2013).
Poli, "Seismic signals preceding the the [sic] Nuugaatsiaq landslide (Greenland): Insights into the nucleation processes," *Geophysical Research Abstracts*, vol. 20, EGU2018-2815, 2018, EGU General Assembly 2018.
Rouet-Leduc et al., "Applying machine learning to predict failure," 48 pages (Mar. 2017).
Rouet-Leduc et al., "Breaking Cascadia's Silence: Machine Learning Reveals the Constant Chatter of the Megathrust," *arXiv*:1805.06689v1, pp. 1-14 (May 2018).
Rouet-Leduc et al., "Estimating Fault Friction From Seismic Signals," *ArXiv*1710.04172v3, pp. 1-18 (Nov. 2017).
Rouet-Leduc et al., "Estimating fault friction from seismic signals in the laboratory," *Geophysical Research Letters*, vol. 45, pp. 1321-1329 (Feb. 2018).
Rouet-Leduc et al., "Friction Laws Derived From the Acoustic Emissions of a Laboratory Fault by Machine Learning," *American Geophysical Union, Fall Meeting 2017*, Abstract #S53D-01 (Aug. 2017).
Rouet-Leduc et al., "Frictional State Derived From the Acoustic Emissions of a Laboratory Fault by Machine Learning," pp. 1-49 (Aug. 2017).
Rouet-Leduc et al., "Machine Learning Predicts Failure," ICNEM Presentation, 35 pages (May-Jun. 2017).
Rouet-Leduc et al., "Machine learning predicts laboratory earthquakes," *Geophysical Research Letters*, vol. 44, pp. 9276-9282 (Sep. 2017).
Rouet-Leduc et al., "Supplementary Materials for Fault Frictional Constitutive Law Derived From Continuous Acoustic Emissions by Machine Learning," pp. 1-14 (Jan. 2018).
Rouet-Leduc et al., "Supporting Information for: Machine Learning predicts laboratory earthquakes," *Geophysical Research Letters*, https://agupubs.onlinelibrary.wiley.com/action/downloadSupplement?doi=10.1002%2F2017GL074677&file=gr156367-sup-0001-supinfo.pdf, pp. 1-11 (Aug. 2017).
Rouet-Leduc et al., "Continuous chatter of the Cascadia subduction zone revealed by machine learning," *Nature Geoscience*, vol. 12, No. 1, pp. 75-79 (Dec. 17, 2018).
Schoenball et al., "Change of stress regime during geothermal reservoir stimulation," *Geophysical Research Letters*, vol. 41, pp. 1163-1170 (Feb. 2014).
Snee et al., "State of stress in Texas: Implications for induced seismicity," *Geophysical Research Letters*, vol. 43, pp. 10,208-10,214, (first published Oct. 2016, corrected Dec. 2016).
Trugman, "ECE 285—Machine Learning: Seminar Summary," 3 pages (apparently dated May 2017).

(56) References Cited

OTHER PUBLICATIONS

Walsh et al., "Probabilistic assessment of potential fault slip related to injection-induced earthquakes: Application to north-central Oklahoma, USA," Geological Society of America, 4 pages (also published as Walsh et al., "Probabilistic assessment of potential fault slip related to injection-induced earthquakes: Application to north-central Oklahoma, USA," *Geology*, vol. 44, Issue 12, pp. 991-994 (Dec. 2016)).

Walsh et al., "FSP 1.0: A program for probabilistic estimation of fault slip potential resulting from fluid injection," downloaded from https://www.researchgate.net/profile/Rall_Walsh/publication/315381911_FSP_10_A_Program_for_Probabilistic_Assessment_of_Fault_Slip_Potential_Resulting_From_Fluid_Injection/links/58cf17d292851c374e170398/FSP-10-A-Program-for-Probabilistic-Assessment-of-Fault-Slip-Potential-Resulting-From-Fluid-Injection.pdf on Oct. 23, 2018, pp. 1-46 (Mar. 2017).

Yuan et al., "Using Machine Learning to Discern Eruption in Noisy Environments: A Case Study using $CO_2$-driven Cold-Water Geyser in Chimayó, New Mexico," *ArXiv*, 1810.01488v1, pp. 1-16 (Oct. 2018).

Hulbert et al., "A Silent Build-up in Seismic Energy Precedes Slow Slip Failure in the Cascadia Subduction Zone," *arXiv*:1909.06787, pp. 1-12 (Sep. 2019).

\* cited by examiner

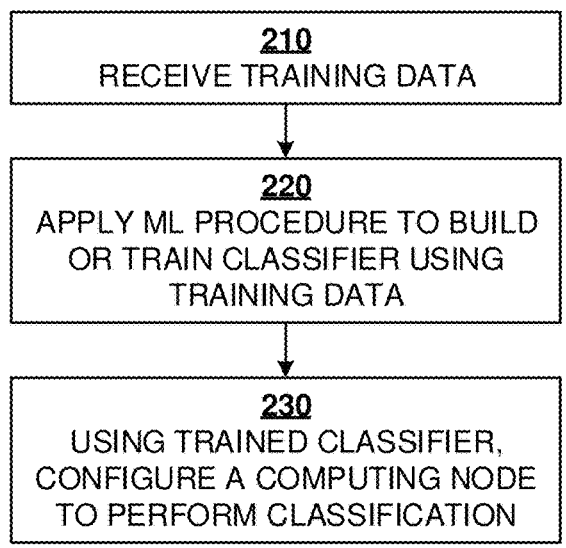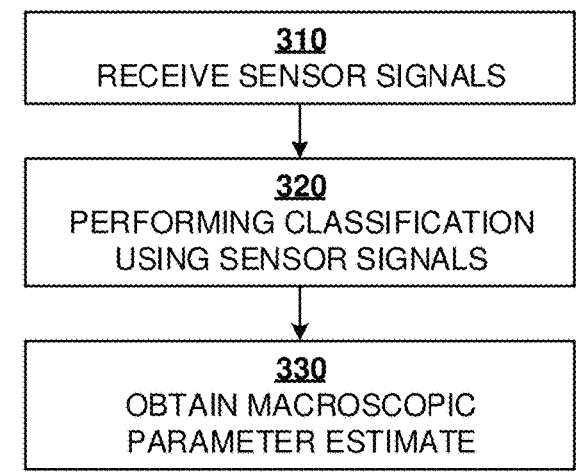
FIG. 2
FIG. 3

SUBSURFACE STRESS CRITICALITY ASSOCIATED WITH FLUID INJECTION AND DETERMINED USING MACHINE LEARNING

CROSS-REFERENCE TO RELATED APPLICATIONS

This application claims the benefit of U.S. Provisional Application No. 62/776,281, entitled "SUBSURFACE STRESS CRITICALITY ASSOCIATED WITH FLUID INJECTION AND DETERMINED USING MACHINE LEARNING," filed Dec. 6, 2018. This application is also a continuation-in-part of U.S. patent application Ser. No. 16/212,448, entitled "FAILURE PREDICTION AND ESTIMATION OF FAILURE PARAMETERS" filed Dec. 6, 2018, which claims the benefit of U.S. Provisional Application No. 62/596,001, entitled "FAILURE PREDICTION AND ESTIMATION OF FAILURE PARAMETERS," filed Dec. 7, 2017, and U.S. Provisional Application No. 62/776,281, entitled "SUBSURFACE STRESS CRITICALITY ASSOCIATED WITH FLUID INJECTION AND DETERMINED USING MACHINE LEARNING," filed Dec. 6, 2018. All of the foregoing applications are incorporated by reference herein in their entirety as if set forth fully herein for all purposes.

ACKNOWLEDGMENT OF GOVERNMENT SUPPORT

This invention was made with government support under Contract No. 89233218CNA000001 awarded by the U.S. Department of Energy/National Nuclear Security Administration. The government has certain rights in the invention.

BACKGROUND

Material failures occur in many circumstances, involving natural media or man-made structures. Of the former, earthquakes are prominent examples, while the latter include failures of bridges or dams. In recent years, mankind's quest for energy has spawned a proliferation of subsurface engineering activities, for example in the areas of hydraulic fracturing (fracking) or geothermal energy. With these activities has come a dramatic upsurge in induced or anthropogenic seismic events—sometimes dubbed man-made quakes.

Prediction of failures has tremendous potential to alleviate both physical damage and loss of life. Terrestrial media have proven difficult to characterize. Traditionally, earthquake forecasting has largely relied on catalogs of past events to determine e.g. periodic behavior or historic event magnitudes.

Earthquake early warning systems presently rely analysis of the first few seconds of the seismic signal following arrival of the compressional wave associated with an earthquake (e.g., SHAKEALERT [https://www.shakealert.org/]). Present early warning systems warn of an earthquake that is in the process of occurring. The amount of warning time at nearby locations is minimal and may be only a few seconds. This approach also saturates, and cannot distinguish between larger magnitude events—those of most interest. There is currently much R and D regarding early warning.

The true internal conditions of terrestrial media can be difficult to determine, and failure can occur without warning. Accordingly, there remains ample opportunity for technology that can discern internal conditions of terrestrial media subject to anthropogenic activities, make timely predictions of future failure, or generate corresponding alerts.

SUMMARY

Apparatus, computer-readable storage media, and methods are disclosed for analyzing subsurface stress criticality using machine learning, and applications thereof. With certain examples of the disclosed technologies, estimates can be made of difficult-to-observe parameters such as an internal stress state in a terrestrial medium subject to fluid injection. The disclosed technologies can be used to warn of a critical state of the medium, or to guide engineering procedures for mitigation or remediation. The disclosed technologies can also be used to predict failures and can determine attributes of a predicted failure, such as time-to-failure, type of failure, size of the failure, or estimated energy release in the failure.

In certain examples, the disclosed technology can be implemented as a method of predicting a future fluid-driven failure of a terrestrial medium. Signals representative of microscopic processes within the terrestrial medium are received. One or more classifications of the received signals are performed using a trained machine learning (ML) model. Estimates are obtained, using the classifications, of one or more macroscopic parameters of the terrestrial medium indicative of the future fluid-driven failure. In some examples, the microscopic processes can be movements or deformations occurring within the terrestrial medium prior to failure; the signals can be acoustic signals, and the macroscopic parameter can be a predicted property of the future fluid-driven failure.

In additional examples, the terrestrial medium can include a fluid injection site, a hydraulic fracturing site, or a geothermal energy extraction site. The microscopic process can include fluid-driven fracturing of the terrestrial medium, or buildup or annealing of stress, due to propagation of injected fluid.

In further examples, the method can include selecting sensor locations in the vicinity of a given fluid injection site on the basis of remote sensing measurements of a dynamic displacement field, and placing sensors at the selected locations, to provide the received signals. The remote sensing measurements can be obtained by, for example, interferometric synthetic aperture radar (InSAR), Global Positioning System (GPS), or instruments that locally measure deformations, such as strain or tilt meters. The trained ML model can be trained on data from the terrestrial medium itself, from a terrestrial locale distinct from the terrestrial medium, and/or from a laboratory experiment. In some examples, remote sensing data or other displacement measurements can also be used to obtain surface displacement for training data labels.

In some examples, the macroscopic parameter can be provided as input to an engineering remediation protocol. The macroscopic parameters can include any of the following, or an error measure or a confidence measure of any of the following: incidence of a critical state of the terrestrial medium, rate of change of stress; friction, displacement, displacement rate, shear stress; predicted time to failure, predicted location of a failure, predicted duration of a failure, predicted energy release of a failure; fault area, fault density, fault length, fault width, fault location; or available energy. In some examples, the macroscopic parameter can include the permeability of the medium, which can include one or more faults and/or surrounding rock.

In varying examples, the signals can be received during fluid injection, during a temporary or permanent stoppage of fluid injection, during site production activities, or following depressurization. The method can also include, after stoppage of fluid injection, receiving second signals representative of second microscopic processes within the terrestrial medium, and applying a different trained ML model, with the second signals as input, to obtain estimates of one or more additional macroscopic parameters of the terrestrial medium related to a future fluid-driven failure.

The microscopic processes can include one or more of: crack propagation, fracture, asperity wear, slip, change of state, phase transformation, or chemical reaction. The data can be preprocessed, e.g., filtered, before processing, for example to mask out unwanted noise e.g. from flowing fluid. In further examples, the signals can correspond to one or more of acoustic emission, laser, pressure, electric field, or magnetic field signals propagated from the failing medium to the sensors. The signals received at the sensors can be continuous representations of such propagated signals, or can be discretized parameters obtained from such propagated signals.

In some examples, a computing node can include a non-transitory medium storing executable instructions embodying a trained machine learning model which, when executed by at least one of the processors, cause the computing node to perform the one or more classifications. The trained machine learning model can include a trained random forest, a trained artificial neural network (or as used herein, simply "neural network"), a trained support vector machine, a trained decision tree, a trained gradient boost machine, trained logistic regression, or trained linear discriminant analysis. In additional examples, outputs of the training model can be used as inputs to additional executable instructions of a second trained machine learning model which, when executed by at least one of the processors, cause the computing node to obtain a second macroscopic parameter. A non-transitory medium of the computing node can store further executable instructions which, when executed by at least one of the processors, cause the computing node to extract one or more signal parameters from the received signals. The classifications can be performed on the extracted signal parameters, wherein the extracted signal parameters can include, without limitation, an amplitude, a power, a variance, a standard deviation, a kurtosis, a statistical moment, an average, a peak value, a fitted parameter, a spectral density, or a time constant.

In certain examples, the disclosed technologies can be implemented as a method of configuring an apparatus for determining a macroscopic parameter of a terrestrial medium from signals representative of fluid-driven microscopic processes within the terrestrial medium. Training data is received, including training signals representative of fluid-driven microscopic processes in a training medium, together with associated values of the macroscopic parameter for the training medium. A machine learning procedure is applied to train or build one or more classifiers using the received training data. A computing node of the apparatus is configured to perform classifications using the trained or built classifiers operating on the signals of the terrestrial medium, for determining the macroscopic parameter of the terrestrial medium.

In some examples, the training medium can be the same medium as the terrestrial medium, or at the same locale, while in other examples the training medium can be distinct from the terrestrial medium; the training medium can be at an indoor or outdoor laboratory setting. The received training data can span at least one fluid-driven failure event. The training data may also be derived from numerical simulation applying a poroelastic model.

In additional examples, the computing node can be configured to use distinct trained or built classifiers in respective phases during and after fluid injection. The machine learning procedure can include forming, from the received training data, a plurality of samples associated with respective time windows, each sample containing (i) a plurality of features derived from the first signal(s) over the respective time window, and (ii) a value of the macroscopic parameter corresponding to the respective time window. The features can include, without limitation, one or more of: variance, kurtosis, a count of data points above a threshold, a count of data points below a threshold, a count of data points above a percentile of at least 90%, or a count of data points below a percentile of at most 10%. The classifiers can include one or more of: a random forest, a neural network, a support vector machine, a decision tree, a gradient boost machine, logistic regression, or linear discriminant analysis. Accordingly, the machine learning procedure can include one or more of: training a random forest, training a neural network, training a support vector machine, training a decision tree, training a gradient boost machine, training logistic regression, or training linear discriminant analysis.

In further examples, one of the classifiers can be a random forest including multiple decision trees. For a first node of a decision tree, the available samples at that node can be identified, a proper subset of sample features can be selected, and an effective partitioning of the available samples can be determined, at least partly based on a feature of the subset of features. Child nodes of the first node can be generated corresponding to the determined partitioning. The feature subset selection can be performed independently of any acts performed for parent nodes of the instant node, or the selecting can be constrained based on features used to partition one or more parent nodes of the first node. The determination of an effective partition can be based on an amount of reduction of variance or statistical moment from the first node to child nodes. In some examples, the effective partitioning is always binary, while in other examples, a node can have an N-way partition into child nodes, for N>2. In further examples, for a second node of a decision tree, the available samples at that node can be identified, a determination can be made that the second node is a leaf node, and an output value of the macroscopic parameter for the leaf node can be determined based on the values of the macroscopic parameter in the available samples.

In additional examples, combination logic can be configured to determine an output value of the macroscopic parameter for the random forest, based on output values of the macroscopic parameter for at least one of the decision trees. Configuring the computing node can include defining and storing trained parameters accessible by previously stored instructions embodying a machine learning model; automatically generating and storing executable instructions embodying a trained machine learning model; or automatically generating and storing executable instructions equivalent to a trained machine learning model.

In certain examples, the disclosed technologies can be implemented as a system of sensors coupled to a computing node over at least one network, for predicting a future fluid-driven failure in a terrestrial medium. The computing node incorporates processors, memory, and network adapters. The computing node is configured to receive, from the sensors, signals representative of respective fluid-driven processes within the terrestrial medium, and to extract classification parameters therefrom. The computing node is further configured to perform classification using the classification parameters as input, and to obtain macroscopic parameter estimates from the classification outputs. The computing node is further configured to determine fault parameters associated with the future fluid-driven failure of the terrestrial medium, and to issue an alert over a second network.

In varying examples, the terrestrial medium can encompass a fluid injection site, a hydraulic fracturing site, a geothermal energy extraction site, or a CO2 injection site. The microscopic processes can occur in the vicinity of such site, or the fluid-driven fault can occur in the vicinity of such site. The vicinity can extend laterally to an extent comparable with spread of injected fluid at the site, or to an extent of associated changes in the subsurface stress field. The microscopic processes can include fluid-driven fracturing.

In further examples, the sensors are positioned in the vicinity of a fluid injection site at respective locations chosen at least partly on the basis of differential remote sensing measurements of a surface displacement field. The sensors can include one or more of: a microphone, a seismometer, a strain gauge, a piezoelectric transducer, a polarimeter, a geophone, an accelerometer, a linear variable differential transformer (LVDT), a linear variable differential capacitor (LVDC), an interferometer, a vibration sensor, a distributed optical fiber sensor, high-frequency GPS, interferometric synthetic aperture radar (InSAR), or an electronic amplifier, in any combination.

In additional examples, the system can include receivers coupled to the computing node over the second network, the receivers being configured to receive the alert issued by the computing node and cause an engineering remediation action to be performed. The receivers can include one or more of: an annunciator, an email server, a mobile computing device, or a network adapter, in any combination. The receivers can be part of one or more of: a fluid injection control station, a civil defense network, an early warning system, a public broadcast network, or a messaging system.

In certain examples, the disclosed technology can be implemented as a method of predicting a future fluid-driven failure of a terrestrial medium including a fluid injection site. Using interferometric synthetic aperture radar (InSAR) to perform remote sensing measurements of a displacement field, sensor locations can be selected in the vicinity of a given fluid injection site, and sensors are placed at the selected locations. Signals representative of acoustic emission by microscopic processes within the terrestrial medium can be received from the sensors, and signal parameters can be extracted from the received signals. The microscopic processes can be movements or deformations occurring within the terrestrial medium prior to failure. One or more classifications of the received signals can be performed on the extracted signal parameters using a trained machine learning (ML) model. Using the classification(s), one or more macroscopic parameters of the terrestrial medium can be estimated. At least one of the macroscopic parameter(s) can be a predicted property of the future fluid-driven failure. Although not a requirement, some of these examples can incorporate a trained random forest in the trained ML model.

In certain examples, the disclosed technologies can be implemented as a method of configuring an apparatus for determining a macroscopic parameter of a terrestrial medium from signals representative of first fluid-driven microscopic processes within the terrestrial medium. Training data spanning at least one fluid-driven failure event can be received, including training signals representative of the first, or second, fluid-driven microscopic processes in a training medium, together with associated values of the macroscopic parameter for the training medium. A machine learning procedure can be applied to train or build one or more classifiers using the received training data. One of the classifiers can be a random forest including multiple decision trees. For a first node of a decision tree, the available samples at that node can be identified, and a proper subset of sample features can be selected. The selecting can be constrained based on features used to partition one or more parent nodes of the first node. An effective partitioning of the available samples can be determined, at least partly based on a feature among the proper subset of the sample features. The partition determination can be based on an amount of reduction of variance or statistical moment from the first node to child nodes of the first node, and the child nodes can be generated according to the determined partitioning. Combination logic can be configured to determine an output value of the macroscopic parameter for the random forest, based on output values of the macroscopic parameter for at least one of the decision trees. A computing node of the apparatus can be configured to perform classifications using the trained or built classifiers operating on the signals of the terrestrial medium, for determining the macroscopic parameter of the terrestrial medium.

In certain examples, the disclosed technologies can be implemented as a system of a computing node coupled to sensors and to a receiver, over at least one network, for predicting a future fluid-driven failure in a terrestrial medium encompassing a fluid injection site. The computing node incorporates processors, memory, and network adapters. The computing node is configured to receive, from the sensors, signals representative of respective fluid-driven microscopic processes within the terrestrial medium, and to extract classification parameters therefrom. The computing node is further configured to perform classification using the classification parameters as input, and to obtain macroscopic parameter estimates from the classification outputs. The computing node is further configured to determine fault parameters associated with the future fluid-driven failure of the terrestrial medium, and to issue an alert to the receiver. The receiver is configured to receive the alert and cause an engineering remediation action to be performed.

Innovative methods can be implemented as part of one or more computing systems adapted to perform an innovative method, or as part of non-transitory computer-readable media storing computer-executable instructions for causing a computing system to perform the innovative method(s). The various innovations can be used in combination or separately. The foregoing and other objects, features, and advantages of the disclosed technology will become more apparent from the following detailed description, which proceeds with reference to the accompanying figures.

BRIEF DESCRIPTION OF THE DRAWINGS

FIG. 2 is a flowchart of an exemplary method for making an apparatus according to disclosed technologies.

FIG. 3 is a flowchart of an exemplary method for using an apparatus according to disclosed technologies.

DETAILED DESCRIPTION

Figure 1:
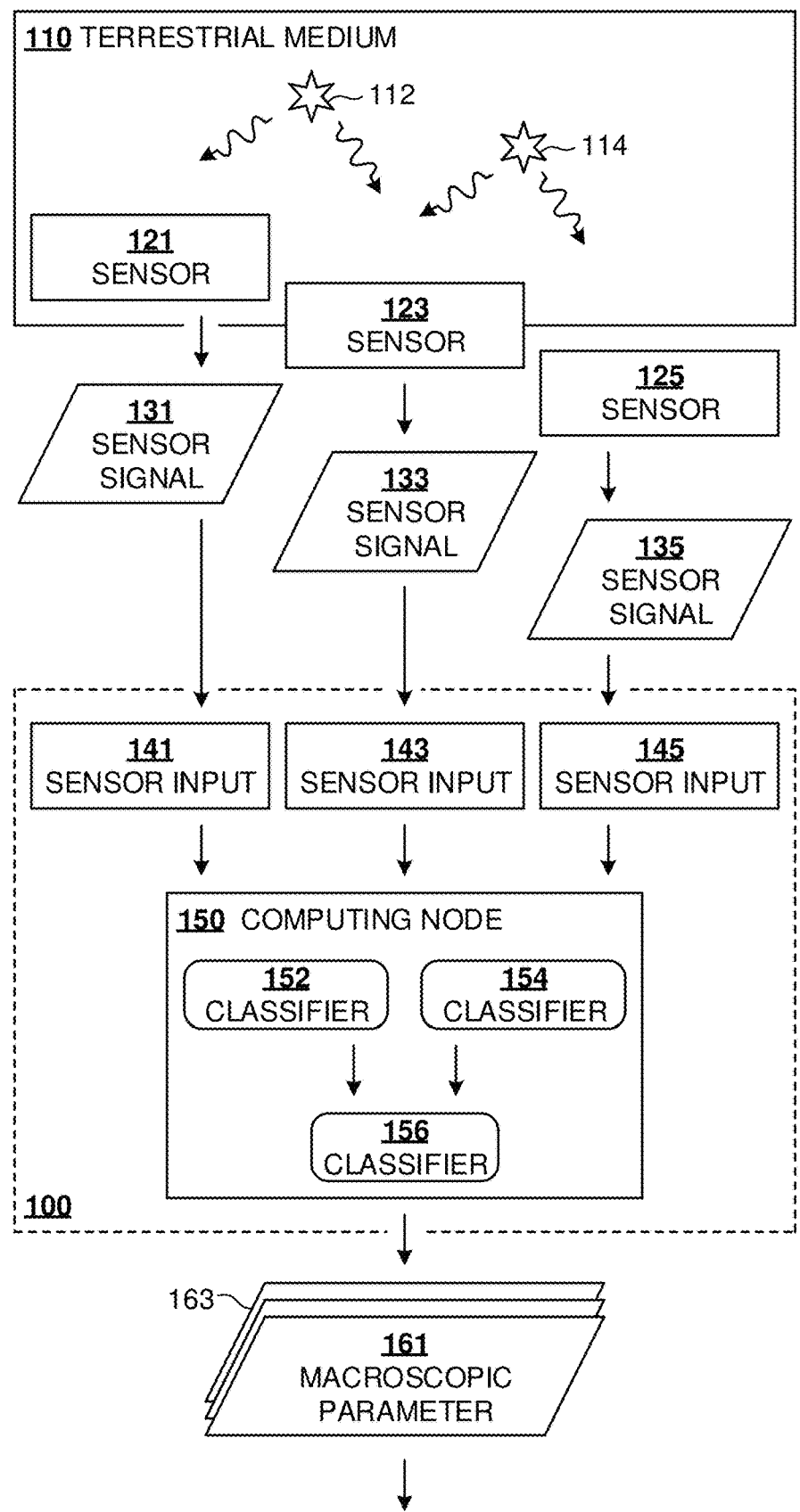
FIG. 1 is a block diagram of an example apparatus according to an embodiment of the disclosed technology.

This disclosure is set forth in the context of representative embodiments that are not intended to be limiting in any way.

I. Terminology

As used herein, "acoustic" emissions or signals refer to any elastic wave propagated through a medium, and can include longitudinal, pressure, compressional, shear wave, or surface wave oscillations. Acoustic signals of interest can span a wide range of frequencies, according to the medium, from microhertz to megahertz. An acoustic signal need not be audible to a human ear. Seismic signals are acoustic emissions in this context. In some instances, audible acoustic signals propagating through air or water can be used.

As used herein, an "asperity" is a projection of a surface that can make contact with an opposing surface. The surface can have a number of asperities, only some of which make contact with the opposing surface at any given time; over time the subset of asperities making contact can vary as the surfaces move past one another. An asperity can make contact with an opposing asperity or with a portion of an opposing surface which is not an asperity. Asperities can vibrate, wear, or fracture; any of these processes can lead to acoustic emission.

As used herein, "classification" refers to a computer-implemented act whereby a sample is associated with one or more categories or labels. Classification can be one-dimensional or multi-dimensional. Within a dimension, classification can be binary (binary classification), plural (e.g. classification according to a categorical variable), quasi-continuous (where differences between neighboring categories is insignificant), or continuous. Classification into quasi-continuous or continuous output labels is sometimes termed "regression." The category or categories associated with a sample is generally denoted as its "class" or "label."

As used herein, a "classifier" is a computer-implemented model or computer-implemented algorithm that can accept a sample, event, or signal as input and produce output which is the class of the input. A classifier can be a trained machine learning model, such as a random forest, neural network, or support vector machine (SVM). The term "classifier" includes computer-implemented models or computer-implemented algorithms that perform regression, which are sometimes termed "regressors."

As used herein, the "coefficient of determination" denoted $R^2$, indicates the proportion of the variance in a dependent variable that is predictable from the independent variable, e.g. using a classifier.

As used herein, the terms "damage" and "fracture" are used to describe deterioration of a medium. "Damage" refers to any physical discontinuity in the medium, on any scale from nanoscopic to microscopic to macroscopic, and can include voids, crystal dislocations, cracks, or phase transitions. "Fracture" refers to a type of damage in which medium is separated into two or more parts at one or more boundaries. Two fractured parts are not held together by a crystalline bond directly across their common boundary but may be rigidly fixed due to external forces, an adhesive interlayer, or by being joined together beyond an end of the fracture, as in the case of a partial fracture or microfracture. Fractured parts can have some freedom for relative motion. A fracture can be caused, directly or indirectly, by injection of a fluid such as water or a fracking fluid. However, this is not a requirement of using the disclosed technology. For example, fractures can be created by forces unrelated to injected fluid. Fractures can be pre-existing, or can be newly formed due to stresses in the medium.

As used herein, an "earthquake" is a shaking of the Earth's surface due to a geological or anthropogenic cause. The terms "earthquake event," and "seismic event," are also used, interchangeably. An "event" can refer to any discrete medium failure, including but not limited to earthquakes.

As used herein, "failure" refers to any process whereby stresses internal to a medium are relieved through irreversible transformations within the medium. Generally, during failure, damage is increased and energy is released. Failure can occur as any combination of discrete events, a continuous process, or episodes of activity. Failure can occur before, during, or after a fracture. In a terrestrial environment subject to fluid injection, induced failure (dubbed a fluid-driven failure) can occur during fluid injection, or after a temporary or permanent stoppage of fluid injection.

As used herein, a geological "fault" is a discontinuity in the rock of the Earth's crust at which displacement can occur or has occurred. Geologic forces can build up stored energy over time. Movement of the rock under the influence of geological forces can release the stored energy, some of which can be manifested in the form of an earthquake. Numerous faults of different sizes can be located in proximity to one another, within a "fault zone," which can be a portion of a medium having larger spatial extent than the fault zone. Geological faults can be of natural origin, of anthropogenic origin, or naturally occurring faults enhanced by anthropogenic activity.

As used herein, "fluid" refers to any of several fluids associated with anthropogenic subsurface activities, including without limitation water, treated water, produced water, wastewater, extracted hydrocarbons, heated water, or steam. While many fluids are in liquid or slurry form (e.g. generally incompressible fluids), other fluids can be in gaseous form, or a supercritical fluid (e.g. generally compressible fluids).

As used herein, a "hyperparameter" is a characteristic of a machine learning model that is outside the scope of training of the model, and can be preset. Examples of hyperparameters for a random forest include (i) the maximum depth of a decision tree, (ii) the number of trees in the forest, (iii) the fraction of features selected between at each node, or (iv) various rules for degree of split, weights, imbalance, acceptance criterion for a split, or cross-validation. Other machine learning models can have other hyperparameters. Examples of hyperparameters for an artificial neural network include (i) the number of layers on the network, (ii) the types of connections between layers (e.g. fully connected, convolutional layers with simply local connextions, skip connections between non adjacent layers, etc.), (iii) the activation function that introduces non-linearity between layers (iv) the training parameters (e.g. the optimizer and its parameters, the number of training examples for each training step, the number of training steps, etc.). A hyperparameter can be set arbitrarily, or according to various factors such as availability of computing resources, availability of training data, required quality of performance, and experience with other similar models. In some examples, an EGO (efficient global optimization) method is used to select hyperparameter values guided by classifier performance.

As used herein, the terms "macroscopic" and "microscopic" are used in this disclosure to denote aspects of a medium or a process therein according to the scale at which it is described. Macroscopic refers to bulk effects averaged over the entire material or a portion of the material, whereas microscopic refers to scales within the bulk that may or may not be heterogeneous. Microscopic effects or phenomena can be at a granular level, on a scale of a few microns to a millimeter. Macroscopic effects or parameters can be at (or averaged over) a scale of a fault zone. An example macroscopic property is temperature, which is a property of a bulk material and which corresponds at the microscopic level to corresponding amount of kinetic or vibrational energy of individual atoms, ions, or molecules. Another example macroscopic property is friction, which is a bulk matter description of force along a sliding surface, and which corresponds at a microscopic level to contact and wear between asperities of one surface and the opposing surface. Generally, macroscopic influences on a medium, such as external forces can generate macroscopic stress and strain within the medium, leading in turn to microscopic forces at asperities on an interface within the medium and consequent microscopic damage with attendant acoustic emission. The microscopic damage processes can result in a macroscopic yield point being reached, with a consequent macroscopic failure event and significant energy release or significant displacement. Macroscopic phenomena are not necessarily more easily detectable than microscopic phenomena: macroscopic stress or friction within a medium can be difficult to measure directly, while acoustic emission from microscopic wear can be detected without much difficulty. Displacement can be used to describe processes at both microscopic and macroscopic scales.

Some common terms, such as stress and strain, have both macroscopic and microscopic manifestations. For example, a macroscopic view of a fault zone can have smoothly varying stress across a fault zone; this bulk or average stress can be locally homogeneous. However, viewed microscopically at a fracture plane, stress can be considerably heterogeneous (e.g. concentrated at asperities), with local microscopic stress values that can differ by up to orders of magnitude from the bulk stress. In this disclosure, "stress" refers to bulk or macroscopic stress, except where clear from the context or explicitly indicated otherwise.

In another example, the macroscopic view of a fault zone can have a quasistatic distribution of strain associated with the stresses present. However, strain is a measure of relative displacement. Detected acoustic emissions also have a displacement amplitude, which can be referred back to one or more source locations of the acoustic emissions according to a wave propagation model, to obtain a microscopic strain (dubbed a dynamic strain) associated with the acoustic emission itself. In this disclosure, "strain" refers to local or microscopic dynamic stress, except where clear from the context or explicitly indicated otherwise.

As used herein, a "medium" is a spatial extent of one or more materials capable of supporting shear stress. A medium is generally considered to be solid, however some supercooled liquids or viscoelastic materials can support shear stress and are included in the scope of medium. Common fluids such as water and air cannot support shear stress and are not considered media. A medium can be homogeneous or heterogeneous, and can have varying structure such as single-crystal, polycrystalline, amorphous, monolithic, stratified, powder, composite, or agglomerate at different locations over its spatial extent. A medium can incorporate damage of any sort. A medium can be a porous solid or a solid permeated by fluid channels.

As used herein, a "prediction" refers to an estimate of a future event or parameter. The output of a machine learning model is termed an "estimate," which can be an estimate of a present quantity or a prediction of a future quantity.

As used herein, a "sample" refers to a temporal segment of one or more acoustic emission or other microscopic signal data, and can refer to any combination or subcombination of raw signals, processed signals, or parameters or features extracted therefrom. While microscopic events at e.g. individual asperities can be discrete or bounded in time, the aggregate acoustic emission from many microscopic sources in a fault zone is generally continuous. Particularly, the acoustic emission signal includes acoustic emission during precursor events such as foreshocks or microseismic activity (natural or man-made) and acoustic emission at times that are free of any precursor activity.

It can be useful to distinguish time samples (A) containing seismic activity of an amplitude qualifying for cataloging as a discrete event, dubbed "event samples" (B) containing no precursor events or microseismic activity, dubbed "sub-threshold samples" or "continuum samples" and (C) containing intermediate levels of e.g. microseismic activity, dubbed "intermediate samples."

In some examples, the disclosed technology can be operated without any differentiation between event samples, intermediate samples, or sub-threshold samples. In other examples, preprocessing of input signals can be used to discard precursor events or de-emphasize microseismic activity and focus on sub-threshold acoustic emission data. Unlike previous approaches, the disclosed technology can make estimates and predictions without any event samples, and even without any intermediate samples. With the disclosed technology, a single sub-threshold sample can be sufficient to estimate and predict macroscopic parameters of a medium such as a terrestrial medium subject to fluid injection and prone to fluid-driven failure.

II. Introduction to the Disclosed Technology

Many failure events occur in the presence of mechanical stress within a medium. As stress builds up, microscopic processes can occur within the medium, causing local damage, and eventually a yield stress can be exceeded at one or more points within the medium, resulting in a failure event. Through laboratory experiments and onsite monitoring of zones at risk of anthropogenic seismicity, technology is demonstrated that uses detected acoustic emission from internal microscopic processes to estimate internal friction or shear stress within the medium. Particularly, analysis of emitted sounds by machine learning can provide a fingerprint of friction within a fault. Other macroscopic parameters of the medium can similarly be determined. Furthermore, with some history of failure events in the same or similar medium, a prediction of a future failure event can also be made. Applicants have demonstrated the feasibility of predicting a future fluid-driven failure event, with useful accuracy that surpasses any conventional method. In examples, the future event prediction can be made with just one sample of an acoustic emission signal observed at a present time. In varying examples, a prediction of a failure event can be made at least an hour or at least a day past the time of making the prediction.

Earthquake activity has commonly been regarded as bursts of activity separated by quiet periods. Examples of the disclosed technology enable accurate predictions of future events from signals detected during so-called quiet periods. The disclosed technology can effectively use all the available signal during both quiet and active periods, rather than just the signal in the immediate interval of active seismicity.

The disclosed technology has broad applicability to all areas where it is desired to place time bounds on future fluid-driven failure events. This includes applications to hydraulic fracturing, energy extraction, waste disposal, excavations, carbon dioxide (CO2) sequestration, or mining.

III. Example Environments

Hydraulic Fracture (Fracking)

Figure 24:
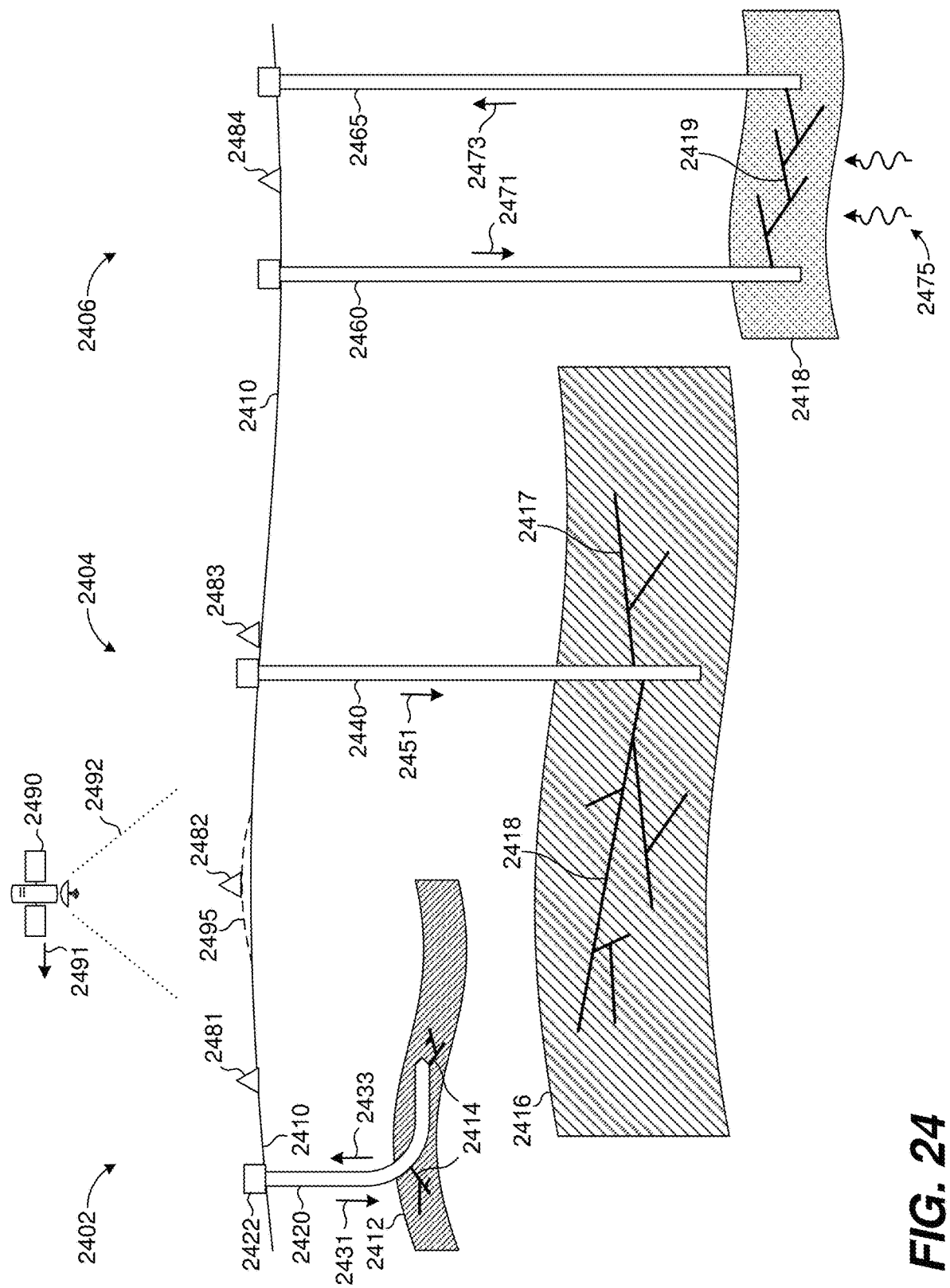
FIG. 24 is a diagram illustrating environments for application of the disclosed technologies.

FIG. 24 is a diagram illustrating environments for application of the disclosed technologies. On the left is a hydrocarbon extraction site 2402 with a production well 2420 penetrating into a hydrocarbon-bearing layer 2412 (such as shale) and extending horizontally within the shale layer 2412. In examples, the hydrocarbon-bearing layer can be a few meters to hundreds of meters thick, an can be at a depth of tens or hundreds of meters below the earth's surface 2410, or below an ocean floor. After drilling, fracking fluid can be injected 2431 into the well 2420. Fracking fluid can be a slurry of water and sand or other proppants, together with a range of chemical additives. The chemical additives can fulfill a range of functions and can include solvents, salts, lubricants, thickening agents, bactericidal compounds, polymers, and pH control agents. Under pressure, commonly hundreds of atmospheres, the injected fluid in well 2420 can cause the surrounding rock layer 2412 to fracture, creating low-impedance paths 2414 for hydrocarbon molecules contained within the porous rock to escape to a nearby fracture and thence to the well head 2422. The well 2420 can be a cased well, and fracture locations 2414 can be sited by making selective penetrations in the casing. Upon removal of fluid pressurization, much of the injected water is expelled 2433 under pressure from the well, and hydrocarbons such as natural gas are also delivered 2433, under pressure, to the well head 2422, through a web of fractures 2414 in the hydrocarbon bearing layer and the well 2420 itself.

Wastewater Injection

In the center of FIG. 24, a wastewater injection site 2404 is depicted. Commonly, such a site includes a deep bore well 2440, which can have a depth of a thousand meters or more, well below the depth of a hydrocarbon producing well 2420. Deep disposal well 2440 can terminate in a relatively impermeable layer 2416, however even such an impermeable layer can incorporate a web of fractures 2418, allowing wastewater to be injected 2451. The wastewater injection 2451 can further enlarge pre-existing fractures 2418 and cause new fractures 2417 to develop. Wastewater can seep a considerable distance, up to tens of kilometers in the horizontal direction, and up to kilometers in the vertical direction, through a fracture network 2418, 2419.

Geothermal Extraction

To the right of FIG. 24, a geothermal extraction site 2406 is depicted, comprising wells 2460 and 2465 extending down into a hot rock layer 2418 heated by the earth's interior. In a first development phase, one or both wells 2460, 2465 can be injected with a fracking fluid to create a web of fractures 2419 within the hot rock layer 2418, until a relatively low impedance path for fluid flow is formed extending between wells 2460, 2465 through the hot rock layer 2418. Then, in a second production phase, the hot rock layer serves as a heat exchanger. Cold supply water can be pumped 2471 down into well 2460, where it can be heated as it permeates through the fracture web 2419 in hot rock layer 2418, and can emerge 2473 as hot return water or steam from well 2465. Heat 2475 from the earth's mantle can keep the hot rock layer 2418 heated, and resulting in net heat transfer from the earth's interior to circulating fluid 2471, 2473 in the water loop for extended or essentially unlimited periods of time.

Additional Features

Also shown in FIG. 24 are sensor stations 2481-2484 that can be located proximate to an associated well head, or at an extended distance from the well head but still within the lateral extent of the associated subterranean field of injected fluid. An airborne or satellite remote sensor 2490 such as InSAR (Interferometric Synthetic Aperture Radar) can be used for differential displacement sensing of the earth's surface. As illustrated, the remote sensor 2490 can be flown on a path 2491, with instantaneous field of view 2492. A bulging of the earth's surface 2495 can be an indicator of strain and associated stress in the injected fluid field beneath the surface 2410. Such locations can be preferred for siting acoustic or seismic sensors 2482 which serve as inputs for the disclosed technologies. In other examples, any device suitable to measure surface displacement over time can be used to assess temporal changes of the earth's surface. For example, GPS or strain gauges can be used to measure surface displacement over time.

IV. Example Apparatus

FIG. 1 depicts an example apparatus 100 for determining a macroscopic parameter of a terrestrial medium, according to an embodiment of the disclosed technology. Apparatus 100 includes sensor inputs 141, 143, 145 and a computing node 150, described further below. In FIG. 1, features of an exemplary environment are also depicted in order to provide context.

Apparatus 100 is shown with three sensor inputs 141, 143, 145 for receiving respective sensor signals 131, 133, 135 from sensors 121, 123, 125. Sensor inputs 141, 143, 145 are coupled to computing node 150, which incorporates one or more processors with memory coupled thereto. The computing node 150 is configured to execute computer-readable software instructions, which can be provided on a non-transitory computer-readable storage medium, and thereby performs one or more classifications using the received sensor signals 131, 133, 135 provided to the computing node 150 via sensor inputs 141, 143, 145.

In FIG. 1, three classifiers 152, 154, 156 are depicted as software modules, execution of which provides the classifications as configured. Outputs of classifiers 152, 154 are piped to classifier 156 which performs a further classification. Classifiers 152 and 154 can be used, in some examples, to predict start and stop times (or, equivalently start time and duration) of a future failure event, and classifier 156 can be used to predict the energy release of the predicted future event. Through the classifications, estimates of one or more macroscopic parameters 161-163 can be obtained and output.

As shown in FIG. 1, sensors 121, 123, 125 are coupled to receive signals emanating from or associated with fluid-driven microscopic processes represented by starbursts 112, 114 in a terrestrial medium 110. In some examples, these signals (shown as wavy lines) can be acoustic emission signals or other seismic signals, and the microscopic processes can be movements or deformations occurring within the terrestrial medium prior to a fluid-driven failure event.

With this disclosure in hand, one of ordinary skill will appreciate that many variations are possible. As shown, sensors can be variably positioned within the terrestrial medium, partially within the medium, adjacent to the medium or external to the medium. A wide range of sensor types and technologies can be used to collect acoustic emission or other signal data from within the medium 110. The signal paths from sensors 121, 123, 125 to computing node 150 can be multiplexed or can incorporate any of a wide range of signal processing functions such as filtering, digitization, amplification, modulation, error-correction, data cleaning, parameter extraction, or statistical analysis. These functions can be provided partially or wholly external to apparatus 100, within apparatus 100, or even within the computing node 150. Alternate classifier topologies can be used. In some embodiments, multiple classifiers operate in parallel to determine respective macroscopic parameters. Multiple classifiers can operate on same, distinct, or partly common sensor signals, or they can operate on same or different extracted parameters from the sensor signals. The computing node 150 can be configured to generate one or more macroscopic parameters with a single classifier. A downstream classifier such as 156 can avail of sample features, in addition to the outputs of upstream classifiers such as 152, 154. In some examples (for example with neural networks), features used by a classifier can be automatically extracted by the classifier itself; such classifiers can operate on any combination of raw sensor signals, processed continuous or quasi-continuous signals, or discrete features.

Additionally or alternatively to outputting the macroscopic parameters, computing node 150 can be further configured to selectively generate an alert based on the values of one or more macroscopic parameters and output the alert. The estimated macroscopic parameters or alerts can be provided to a storage, to an annunciator, to another downstream or networked computing environment, to a public agency, a news organization, a website, or another destination.

The terrestrial medium can be a locale at, around, or in the vicinity of a fluid injection site, a hydraulic fracturing site, a geothermal energy extraction site, or another site associated with subsurface anthropogenic activities including, without limitation, fluid injection or mining. The terrestrial medium can incorporate materials such as a porous, striated, impermeable solid, conglomerates, fissures, or injected fluids, in any combination. The terrestrial medium can be in a state of fracture, incipient fracture, crack growth, ongoing fault movement, or partial separation. Microscopic processes within the medium can include one or more of crack propagation, fracture, asperity wear, slip, change of state, phase transformation, or chemical reaction. The microscopic processes can be directly or indirectly driven by fluid injection, such as fluid-driven or hydraulic fracturing, and can involve natural rock, the injected fluid, proppant, produced fluids, or wastewater, in any combination. The microscopic process can be monitored throughout the lifecycle of activities at a site, e.g. before, during, or after any period of fluid injection, site development, or production. Because injected fluid can propagate during a fluid injection phase, and can continue to propagate within a subsurface environment after stoppage of fluid injection, the monitored microscopic processes can reflect buildup, annealing, or redistribution of stress in the subsurface environment.

The signals received at the signal inputs can correspond to primary signals propagated from the terrestrial medium to the sensors; the primary signals can include one or more of acoustic emission, a laser signal, a pressure signal, an electric field, a voltage, a current, or a magnetic field. The signals received at the signal inputs can be generally continuous representations (or equivalent time series) of the primary signals, or can be discretized parameters obtained from the primary signals. Alternatively, a received signal can be a high-frequency GPS signal itself providing primary indication of the instantaneous or evolving position of a surface-fixed sensor relative to an invariant planetary coordinate system of the GPS satellite network.

The estimated macroscopic parameters can include any one or more of the following: present or future friction within a medium or fault, present or future displacement, de-trended displacement, present or future displacement rate, present or future shear stress; predicted time to failure, predicted location of a failure, predicted duration of a failure event, predicted energy release of a failure event; fault area, fault density, fault length, fault width; available energy; or fault system permeability, relative permeability, permeability variation; fluid pressure, relative fluid pressure, or fluid pressure variation. In some examples, a critical state of stress can be defined as a percentage of an estimated stress threshold for failure, and the macroscopic parameter can be an indication of the incidence of such a critical state. For example, the macroscopic parameter can indicate a likelihood that the medium has reached critical state, an estimate of the volumetric or areal fraction of the medium that has entered the critical state, or an estimated time before critical state is reached. Estimates related to critical state can be relevant for initiating engineering mitigation or remediation with a safety margin before a failure event occurs. The estimated macroscopic parameters can include error measures or confidence measures of any of these abovementioned parameters, or of the classification. Future failures can be predicted to occur at least one minute, two minutes, five minutes, ten minutes, thirty minutes, an hour, two hours, five hours, ten hours, or a day after the macroscopic parameter estimates are obtained, or even farther in the future.

Computing node 150 can incorporate one or more non-transitory media storing associated executable instructions and optionally associated data objects. A first group of these executable instructions can embody a trained machine learning (ML) model which, when executed by processor(s) of the computing node 150, cause the computing node 150 to perform the classifications described herein. An example trained ML model can be one or more of a trained random forest, a trained neural network, a trained support vector machine, a trained decision tree, a trained gradient boost machine, trained logistic regression, or trained linear discriminant analysis, or another ML model or regressor. A second group of executable instructions can embody a second trained ML model which, when executed, cause the computing node 150 to perform a second classification using outputs of another trained ML model. A third group of executable instructions, when executed, can cause the computing node 150 to extract one or more signal parameters from the received signals, wherein at least one classification is performed on the extracted signal parameters. The extracted signal parameters are dubbed "features" and can include one or more of: an amplitude, a power, a variance, a standard deviation, a kurtosis, a statistical moment, an average, a peak value, a fitted parameter, a spectral density, an inter-quartile count, an inter-quantile count, an inter-quartile range, an inter-quantile range, other amplitude-related parameters, band-pass limited features, or a time constant. In some examples, one or more features can be automatically extracted within a classifier.

V. Example Method for Making an Apparatus

FIG. 2 illustrates a flowchart 200 of an exemplary method for making an apparatus as described herein. At process block 210, a corpus of training data is received. The training data can include signals or features representative of fluid-driven microscopic processes in a medium, as well as the corresponding labels. The labels can represent a macroscopic parameter, such as surface displacement. The training data for surface displacement labels can be obtained by interferometric synthetic aperture radar (InSAR), GPS, or another technique for measuring changes in displacement over time. In some examples, the medium is the same as the terrestrial medium with which the apparatus is to be used, or the training signals are obtained the same sensors with which the apparatus is to be used, however neither of these are requirements. Optionally, the signals or medium with which the method is performed can be different than those with which the apparatus is to be used. In some examples, the training data can be obtained from a test well (dubbed an "outdoor laboratory") distinct from a production well, but at the same locale. The training data can span at least one fault or fluid-driven failure event, so as to provide a signature of a fault or failure event for training. In some examples, training data spanning on the order of 100 fault events can provide accurate estimates and predictions, with coefficient of determination ($R^2$) about 0.9.

At process block 220, a machine learning (ML) procedure is applied to build or train a classifier using the training data. The details of constructing a trained classifier (sometimes described as a trained machine learning model) vary among types of ML classifiers. Some classifiers such as decision trees or random forests are constructed during the training procedure, while other classifiers such as neural networks are constructed beforehand and tuned (which can involve determining model parameters) during the training procedure. Regardless of the ML procedure and classifier type, an output of process block 220 is a trained classifier. In some examples, process block 220 can output a plurality of trained classifiers. Further details of an example training procedure are described in context of FIG. 15.

Finally, at process block 230, the trained one or more classifiers are used to configure a computing node to perform one or more desired classifications. In some examples, this can include defining and storing trained parameters accessible by previously stored instructions embodying a machine learning model. In other examples, executable instructions embodying a trained machine learning model can be automatically generated and stored at process block 230. In further examples, executable instructions equivalent to a trained machine learning model can be automatically generated and stored.

In examples where the signals or medium differ between training data and the target environment in which the apparatus is to be used, a further process block can be included between process blocks 220 and 230, to map the trained classifier to the target environment. Mapping can include linear or non-linear scaling of amplitude, frequency, or numerical values, and can be based on a parameterized model applicable to the training environment and to the target environment.

With this disclosure in hand, one of ordinary skill will recognize that many variations are possible. Besides random forests, decision trees, and neural networks, a variety of other machine learning models can be used, such as a support vector machine, logistic regression, a gradient boost machine, or linear discriminant analysis. Accordingly, process block 220 can incorporate training (or building) any one or more of these types of machine learning models.

Examples of the disclosed technologies can employ a random forest for classification of input signals (features) using an aggregate of decision trees. Outputs of the various decision trees can be combined using logic dubbed "combination logic" to form a label or classification result for the entire random forest. Each decision tree can process input signals along a sequence of decision nodes, branching at each decision node to follow a path leading to an output classification of a macroscopic parameter of a terrestrial medium. In other examples, artificial neural networks (NN) can be used, with signal parameters (features) as inputs to an input layer of the NN, and estimates of macroscopic parameters (such as time to a next predicted failure event) as outputs from an output layer of the NN. Particularly, deep neural networks (DNN) having three or more layers of artificial neurons can be used. Some DNN can be convolutional neural networks (CNN), and can include convolutional layers performing a convolution operation on a preceding layer, and the output of the layers can be fed through a non linear function, rectifying linear units (ReLU), normalization layers, or pooling layers, in varying combinations. Other neural networks can be recurrent neural networks (RNN) in which neurons can maintain an internal state. An RNN can have long short-term memory (LSTM) architecture, and can include feedback within a layer or between layers. RNN can employ gated recurrent units (GRU) with simpler architecture than LSTM. In further examples, classifiers can be implemented as a trained support vector machine (SVM) in which input signal parameters (features) are internally mapped into a high-dimensional vector space from which they can be classified into one or more labels indicating estimated values of macroscopic parameters. Variations of these or other machine learning technologies can be used to implement the disclosed technologies. Numerous available file formats and application programming interfaces (API) can be used to store machine learning data of the disclosed technologies, including, without limitation, Beam, Dask, Flink, Keras, ONNX, Pandas, Petastorm, PySpark, PyTorch, ScikitLearn, TensorFlow, or Xarray.

VI. Example Method for Using an Apparatus

FIG. 3 illustrates a flowchart 300 of an exemplary method for predicting a future fluid-driven failure of a terrestrial medium. At process block 310, sensor signals are received. These sensor signals can be representative of microscopic processes in the terrestrial medium, as described in the context of FIG. 1 or elsewhere in this disclosure. At process block 320, a trained ML model is used to perform one or more classifications using the received sensor signals. At process block 330, an output of process block 320 is used to obtain an estimate of one or more macroscopic parameters that are indicative of the future fluid-driven failure. In some examples, he trained ML model can be an artificial neural network or a random forest.

With this disclosure in hand, one of ordinary skill will recognize that many variations are possible. In some examples, process blocks 320 and 330 can be integrated together, so that the classification output is the desired macroscopic parameter estimate. Classification can be performed with an ML model selected for a particular phase of a fluid injection cycle, e.g. a phase of hydraulic fracture, a phase of fluid injection, a production phase, or a pressurized or depressurized phase subsequent to stoppage of fluid injection. In further examples, the macroscopic parameters are subsequently used to determine whether conditions for generating an alert are satisfied, generating such an alert, or disseminating the alert as described herein. The alert can provide indication of an estimated or predicted fault state or a predicted failure event. Conditions for generating the alert can be based on comparing an estimated or predicted fault parameter to a threshold value, and the alert can be generated based on the result of such comparison. For example, when a predicted magnitude of the predicted event, such as a measure of predicted displacement or energy release, is greater than or equal to a magnitude threshold, the alert can be generated. An alert generation condition can be based on whether a predicted time to failure is below a time threshold. Other fault parameters can also be used.

The alert can be a message including information about one or more of time, energy, duration, location, or type of the estimated or predicted fault state or predicted failure event. The alert can be a signal transmitted to an annunciator located near the fluid-injection locale or near a location of the predicted failure event. The alert can be a message transmitted over a communication network to one or more destinations. The alert can be an audible signal emitted near the apparatus or near a user interface of the apparatus.

In some examples, a process block can be implemented between process blocks 310 and 320 to extract signal parameters from the received signals, while in other examples the received signals are themselves parameters extracted, upstream of the apparatus, from raw signals detected by sensors from the terrestrial medium. In some examples, process block 320 operates on such extracted signal parameters. Extraction of signal parameters can include operations such as temporal windowing, filtering, harmonic analysis, binning by percentile, or discriminating with respect to one or more thresholds. In further examples, the method can also provide a quality estimate for an estimated macroscopic parameter. The quality estimate can be in the form of an error measure or a confidence measure.

VII. Example System

Figure 4:
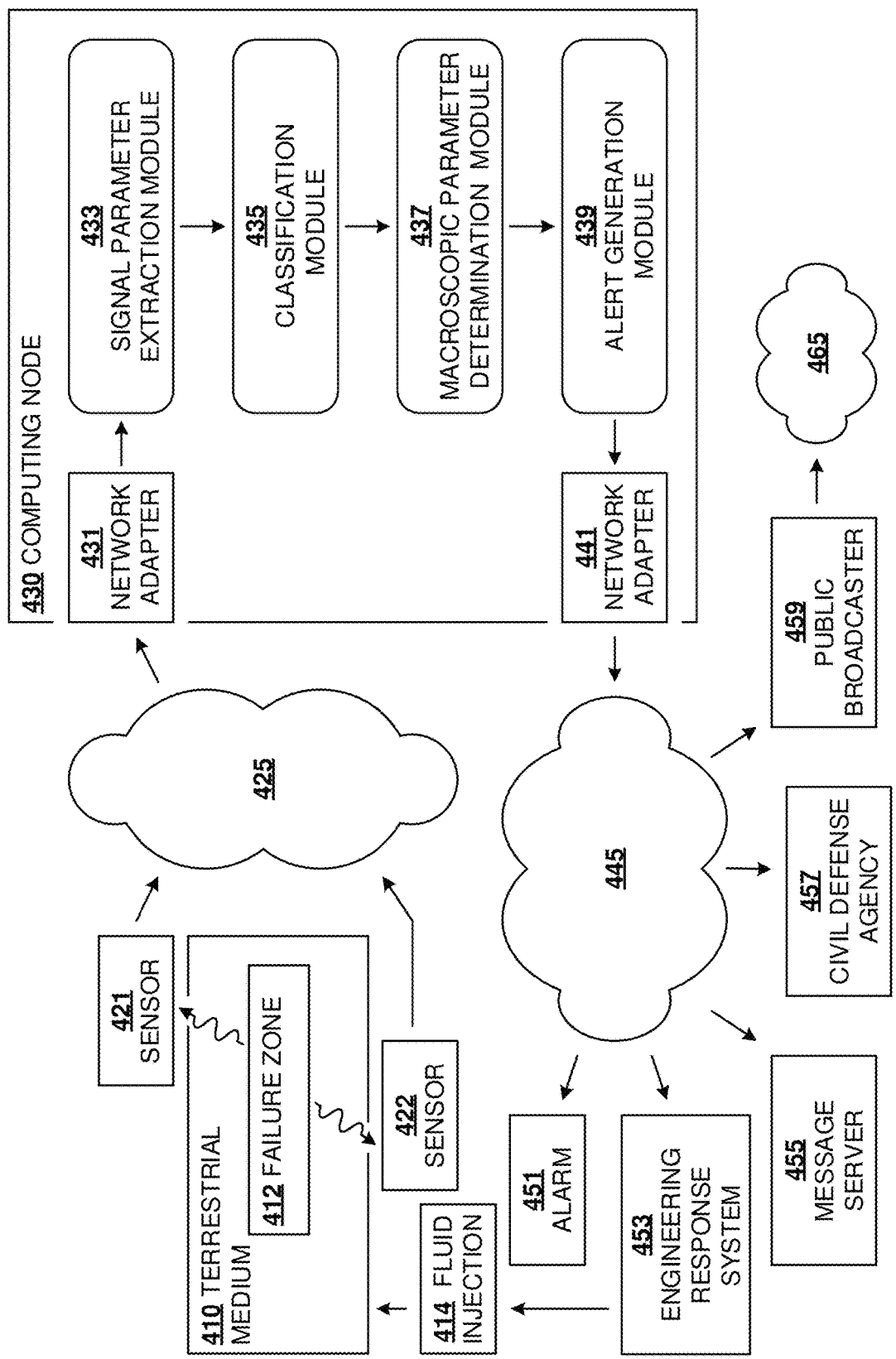
FIG. 4 is a diagram of an example system for predicting a fault event in a terrestrial medium, according to an embodiment of the disclosed technology.

FIG. 4 illustrates an example system for predicting a failure event in a terrestrial medium 410, in an associated environment. The system incorporates a computing node 430 and sensors 421, 422, and is subject to fluid injection 414.

Sensors 421, 422 are situated proximate to a failure zone 412 of a terrestrial medium 410, and are coupled to computing node 430 through network 425. Computing node 430 incorporates one or more processes with memory coupled thereto (not shown), and one or more network adapters 431, 441. Network adapter 431 is coupled to network 425 to receive signals from the sensors 421, 422. The received signals can form one or more samples representative of one or more microscopic processes within the terrestrial medium 410, as described in context of FIG. 1 or elsewhere herein, including fluid-driven microscopic processes.

In the depicted example, computing node 430 is configured to execute software instructions of software modules 433, 435, 437, 439. Signal parameter extraction module 433 is configured to extract one or more features from the received signals. Classification module 435 is configured to perform classification using the features extracted by signal parameter extraction module 433, and thereby determine a class for the sample represented by the received signals. Macroscopic parameter determination module 437 is configured to determine one or more desired parameters using the determined class. Alert generation module 439 is configured to selectively generate an alert regarding a future failure event, based partly on values of the one or more determined macroscopic parameters, and to transmit any such generated alert via network adapter 441 over the network 445 to one or more destinations.

As depicted in FIG. 4, generated alerts can be directed to one or more of a wide range of destinations, including alarm 451 or engineering response system 453. The engineering response system 453 can be coupled to a control system for fluid injection 414, and thereby cause any of several mitigation or remediation actions to be undertaken. Exemplary engineering responses can include pausing or throttling the fluid injection 414 e.g. until stress levels have subsided, depressurizing a fluid injection well, or opening an auxiliary fluid reservoir by means of valve, penetration of a casing, drilling, or explosion. A traffic light system (red, yellow, green) can be used to control the fluid injection rate based on the estimated macroscopic parameters. Red can correspond to a critical state and result in stoppage of fluid injection, or even depressurization, while green can correspond to a low risk state, for which a full desired rate of fluid injection can be applied. Yellow can signify approaching a critical state, and fluid injection can be throttled to a preset rate, allowing the medium time for fluid to permeate or stress to anneal. In other examples, an engineering response can stimulate a low-magnitude controlled seismic event to forestall a potentially larger uncontrolled failure. Macroscopic parameters can be passed directly from computing node 430 to engineering response system 453 as an input to a mitigation or remediation protocol; in some examples the computing node 430 can be part of the engineering response subsystem 453.

Other alert destinations can include an annunciator, an early warning system, a message server 455, a civil defense agency 457, or a public broadcaster 459. Public broadcaster 459 can republish the substance of the alert to public subscribers via another network or signaling environment 465, for example in the form of a television or radio broadcast.

With this disclosure in hand, one of ordinary skill will recognize that many variations are possible. Sensors 421, 422 are depicted outside failure-prone medium 410 for clarity of illustration, but can be located partially or wholly within the failure zone 412, or near the failure zone 412 and within the terrestrial medium 410. In examples, sensors 421, 422 are responsive to acoustic emissions from within the failure zone 412, while in other examples, the sensors 421, 422 can detect displacement, strain, fluid pressure, variations in electrical conductivity or magnetic field, or another quantity associated with microscopic or macroscopic processes within medium 410. The signal path from sensors 421, 422 can incorporate digitization or other signal processing functions. Network 425 can be a private or public wired, wireless, or optical network, such as the Internet, a telephone network, a dedicated sensor network, or a wireless mesh network, using any combination of standard or proprietary protocols. Network adapters 431, 441 can be a single shared network adapter. Network 445 can be a public or private wireless, wired, or optical network, such as the Internet, a telephony network, a dedicated messaging network, or a wireless network. The macroscopic parameters can be used to predict a future fluid-driven failure in the terrestrial medium, or to predict onset of a critical state within the medium.

Sensors 421, 422 can include a wide range of sensor types, including without limitation: a microphone, a laser Doppler vibrometer, a seismometer, a strain gauge, a piezoelectric transducer (PZT), a polarimeter, a geophone, an accelerometer, a linear variable differential transformer (LVDT), a linear variable differential capacitor (LVDC), an interferometer, a vibration sensor, a distributed sensor based on fiber optics, interferometric synthetic aperture radar (InSAR), or a high-frequency GPS sensor. Sensors 421, 422 can incorporate an electronic amplifier, an analog-to-digital converter, or a microprocessor with memory coupled thereto and configured to perform one or more signal processing functions on detected signals.

In examples, one or more receivers such as alarm 451, engineering response system 453, or message server 455 can be included in the disclosed system, and configured to receive, store, or redistribute an alert received from computing node 430. The alert receiver can be one or more of an annunciator, an email server, a text message server, a mobile computing device, or a network adapter. The alert receiver can be part of an early warning system 453, a site management and control system, a civil defense agency 457, or a public broadcaster 459.

VIII. Example Laboratory Experiment

Figure 5A:
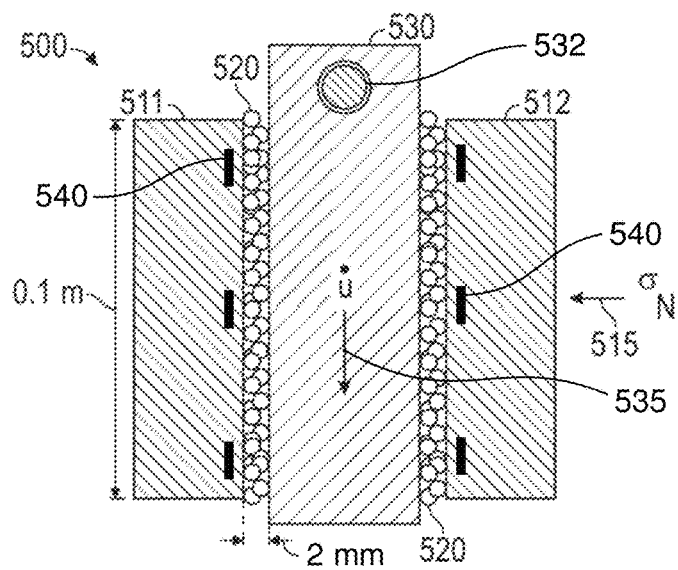
FIGS. 5A-5C illustrate an example laboratory experiment.
Figure 5B:
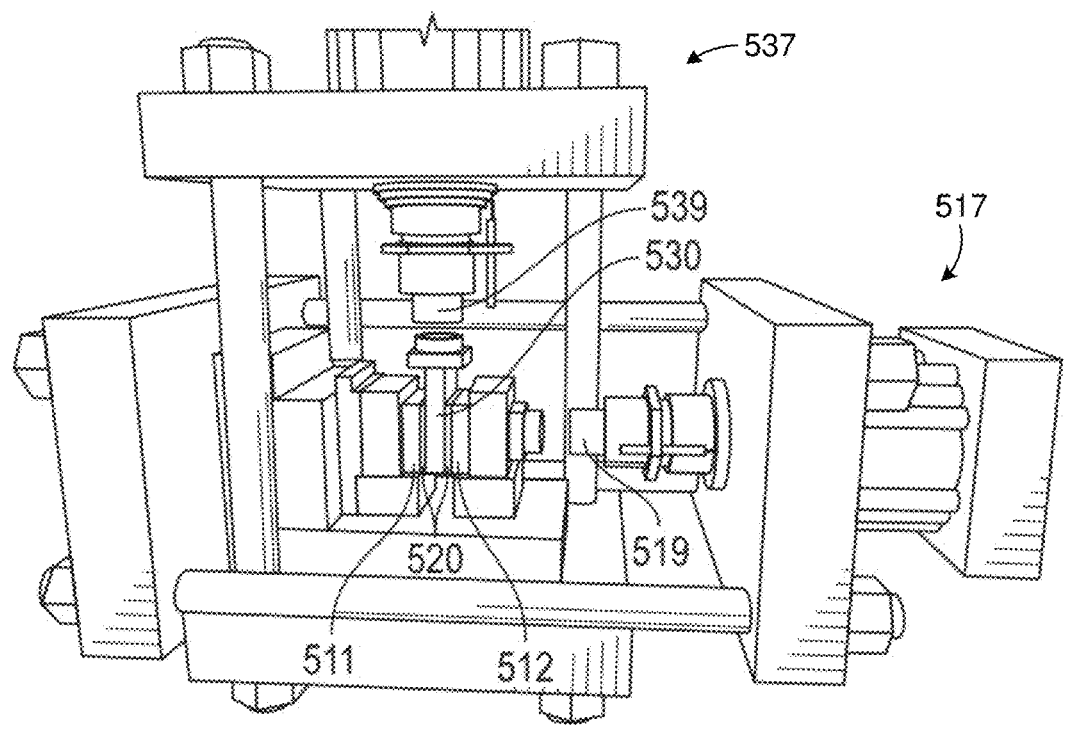
Figure 5C:
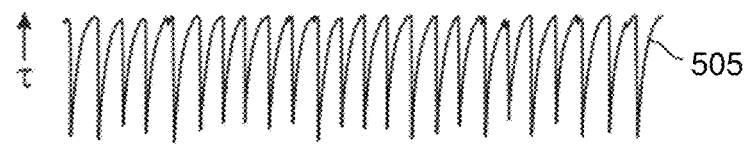

FIGS. 5A-5C illustrate an example laboratory experiment. FIG. 5A is a schematic diagram of the experiment, while FIG. 5B is a rendering of a double direct shear device (dubbed a "bi-ax") for performing the experiment. A laboratory medium is formed by assembling two side plates 511, 512 on either side of a thrust plate 530; a granular material dubbed a "fault gouge" 520 forms boundary layers between the thrust plate 530 and the side plates 511, 512. The boundary layers are damage zones, with the fault gouge serving as damaged material. A press 517 and piston 519 are used to develop normal stress 515 across the boundary layers and through the plates 511, 512, 530. Another press 537 and piston 539 are used to drive the thrust plate in a translational motion between the boundary layers and side plates 511, 512 on either side, in the direction indicated by arrow 535. One or both of presses 517 and 537 can be a hydraulic press. In the illustrated experiment, the presses can develop 1-8 MPa of applied stress. These are illustrative values—in other examples, stress can vary over a considerably larger range (up to many hundreds of MPa). In the illustrated experiment, the fault gouge is comprised of class IV glass beads having diameters in the range 105-149 microns, but similar results can be obtained with a variety of "fault gouge" material. Fault gouge layer thicknesses of about 2 mm, about 5 mm, or within a range 1-10 mm can be used. This experiment illustrates failures induced by shear stress, and is more closely related to applications of disclosed technologies for shear induced faults. However, the disclosed technologies are not so limited, and can be applied to other types of failures, including those induced by tensile stress or compressive stress.

In the illustrated experiment, press 537 is controlled to drive thrust plate 530 at a constant velocity u. Because of the normal force applied by press 517, thrust plate 530 does not move freely. Rather, there is friction between the thrust plate and the boundary layers, within the boundary layers, and between the boundary layers and the respective side plates. To overcome the friction and maintain the motion 535 of the thrust plate 530, press 537 applies a thrust force (downward in FIGS. 5A-5B) on the thrust plate, and corresponding shear stress is developed within and near the boundary layers. As the thrust plate moves through the surrounding layers, the work done by the press 5 is at least partially manifested as further damage in the fault gouge, as well as damage in the adjacent surfaces of plates 511, 512, 530. In this experiment, the thrust plate is moved at about 10 μm/s.

In the illustrated experiment, press 537 is instrumented to provide an electronic output signal (which can be an analog signal or a digital signal) which is proportional to the thrust force applied, and therefore also proportional to the shear stress $\tau$. Piezoelectric sensors 540 are mounted within each plate 511, 512 to detect acoustic emission. Alternatively or additionally, an acoustic detector 532 can be mounted within plate 530. Layer thicknesses, shear stress, normal load, and shear displacement can all be measured and recorded. Data can be digitized at rates that are dependent on the medium and typical processes encountered therein. In the illustrated experiment, acoustic data is digitized at 4 MHz and shear stress data is digitized at 1 kHz. The fault frictional state $\mu$ is defined as the ratio of shear stress $\tau$ to normal stress $\sigma_N$ ($\mu=\tau/\sigma_N$). For experiments performed at constant normal stress, frictional state and shear stress can be used interchangeably, because they are proportional.

FIG. 5C shows a graph 505 of shear stress $\tau$ (on the vertical axis) vs running time of the experiment (on the horizontal axis). The shear stress $\tau$ is observed to exhibit an oscillatory and nearly periodic behavior. On each cycle, as the thrust plate is driven, the shear stress $\tau$ is observed to build up; then, when a yield point is reached, a failure event occurs and the stress is suddenly released. As the material approaches failure, it can exhibit characteristics of a critical stress regime, including many small or microscopic shear failures that emit impulsive acoustic emission. For instance, such a failure event can correspond to one or more microscopic fractures of fault gouge particles or plate surface asperities at points of microscopic stress concentration. An initial microfracture can relieve or decrease microscopic stress locally, but can cause part of the relieved stress to be distributed among other points of contact, increasing their stress and leading to further microfractures in a cascade, until enough stress has been relieved that no points of contact are at or above their yield points. The illustrated behavior is dubbed "stick-slip" behavior. Other types of behavior can be manifested; the oscillatory cycles of stress can be more periodic (narrower frequency spectrum of failure events) or less periodic (broad frequency spectrum); the bulk stress oscillations can exhibit variations in the time duration of failure events. The yield stress at which a failure event occurs can also vary between cycles, and can be dependent on factors such as homogeneity of materials in the damage zone, material ductility, variations in normal force, and random fluctuations.

IX. Example Analysis and Parameter Estimation in a Laboratory Experiment

Figure 6A:
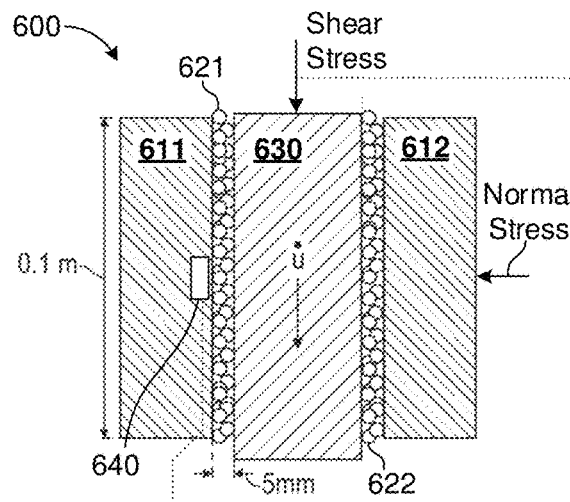
FIGS. 6A-6F illustrate an example data analysis flow for parameter estimation in a laboratory experiment.

FIGS. 6A-6F illustrate an example data analysis flow for parameter estimation in a laboratory experiment. Both training and usage of a classifier are illustrated. FIG. 6A is a schematic diagram of a laboratory apparatus 600 similar to apparatus 500 shown in FIG. 5A. Thrust plate 630 is driven downward at constant velocity while squeezed between boundary layers 621, 622 and side plates 611, 612. Glass beads are used as a fault gouge in the boundary layers 621, 622. In varying examples, quartz powder can be used as a fault gouge, or the boundary layer can be bare granite.

Figure 6B:
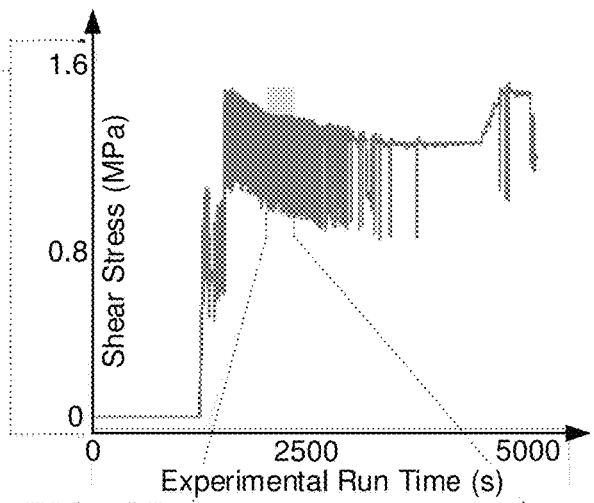

A thrust plate driver is instrumented to provide shear stress data, which is plotted in FIG. 6B. FIG. 6D shows an expanded view of a portion of the shear stress covering about 250 s. During this period of the laboratory experiment, the faulting behavior of the experimental system exhibited aperiodic stick-slip behavior.

A piezoelectric transducer (PZT) 640 is embedded in side plate 621 to detect acoustic vibrations emanating from slip zones of the boundary layers 621, 622 and adjoining proximate regions of plates 611, 612, 630. The detected acoustic vibrations are recorded continuously and are graphed in FIG. 6C, which shows the same time window as the shear stress data shown in FIG. 6D. In alternative embodiments, a similar PZT or other acoustic sensor can be positioned adjoining or within side plate 622. In larger environments, additional sensors can be placed at varying positions along a fault, within a fault zone, or in the vicinity of a fault zone.

Figure 6C:
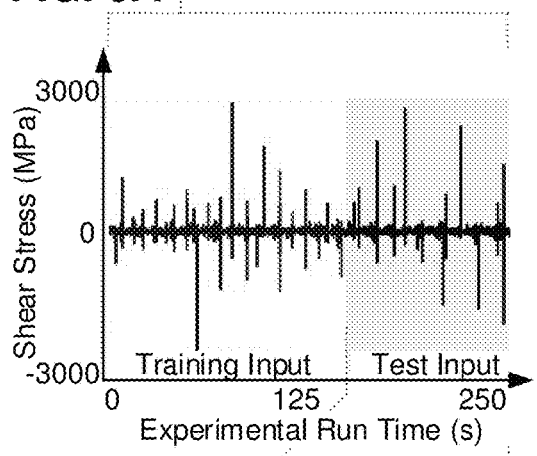
Figure 6D:
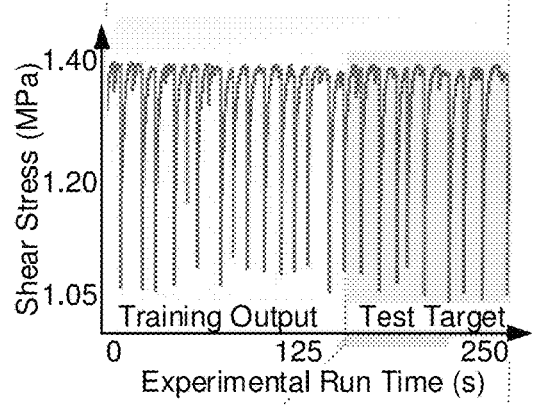

The time windows of FIGS. 6C-6D are partitioned into a training phase of about 150 s and a testing phase of about 100 s, as marked on FIGS. 6C-6D. A succession of samples, about 1.33 s long with about 90% overlap between successive samples, can be extracted from both training and test phases of data. The period of the seismic cycle varies from 7-17 s in this experiment, with an average of about 12 s. Each sample represents a local snapshot of a respective portion of a seismic cycle. Each slip event is the laboratory analog of an earthquake, sometimes dubbed a "labquake."

Features are extracted from the samples' acoustic emission data, and mean values of shear stress are determined from the samples' shear stress signals. The acoustic emission features are inputs to a classifier, and shear stress mean values are the desired output labels; together they constitute a training dataset which is used to train a random forest as described herein. In this example, a random forest classifier having 1,000 trees is used, with binary decision trees and varying tree depths with an average of about 10 levels. The output label of the classifier is a continuous variable, namely, the estimated mean value of the shear stress. The output label for any given sample can be trained solely on input features of that sample.

With a random forest classifier having been trained, the acoustic emission features of the testing phase samples are used as inputs to the classifier, and corresponding estimates of shear stress are determined as output from the classifier. This example classifier is stateless and memory-less: one acoustic emission sample results in one corresponding estimate of shear stress, with no knowledge of any particular prior or future samples.

Figure 6E:
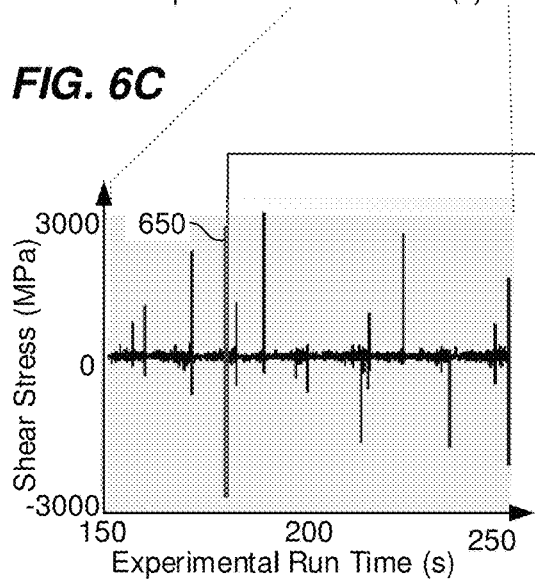
Figure 6F:
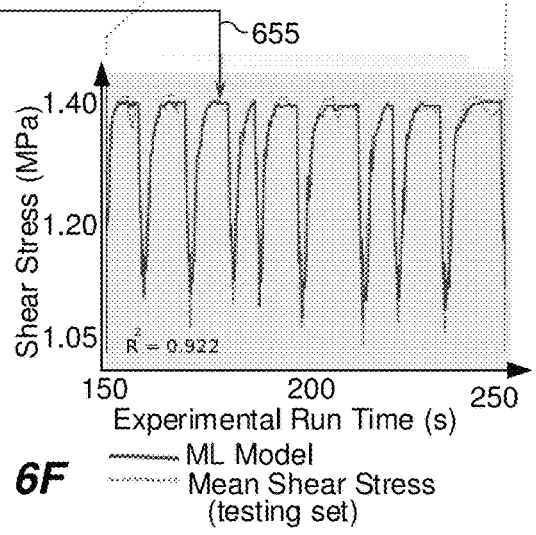

FIGS. 6E-6F show further expanded views of acoustic emission data and shear stress data, respectively. The red dotted line in FIG. 6F is a sample-by-sample time series of the mean value of shear stress over the testing phase. The solid blue line in FIG. 6F is a sample-by-sample time series of the mean value of shear stress estimated by the classifier. Bar 650 in FIG. 6E indicates the time window of a single testing sample, and arrow 655 points to its corresponding estimated shear stress in FIG. 6F.

FIG. 6F demonstrates that the classifier can accurately estimate the internal macroscopic shear stress within the medium based solely on the detected acoustic emission. Particularly, instantaneous statistical characteristics of acoustic emission can be analyzed by machine learning to provide a fingerprint of shear stress and frictional state within a fault zone. The classifier works robustly throughout the seismic cycle, and even for aperiodic behavior.

X. Further Laboratory Studies

Figure 7A:
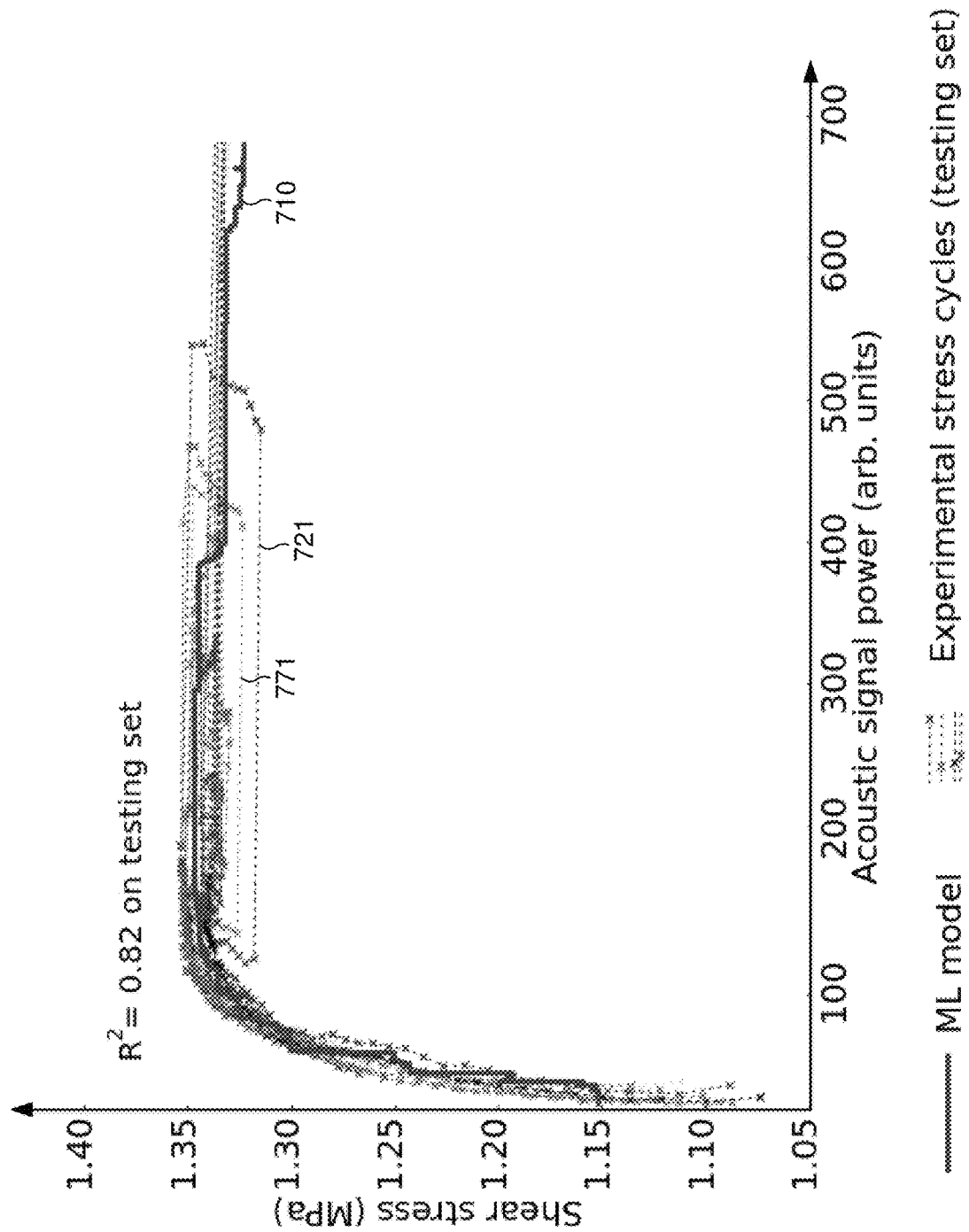
FIGS. 7A-7C show additional examples of laboratory data for aperiodic stick-slip faults.
Figures 7B, 7C:
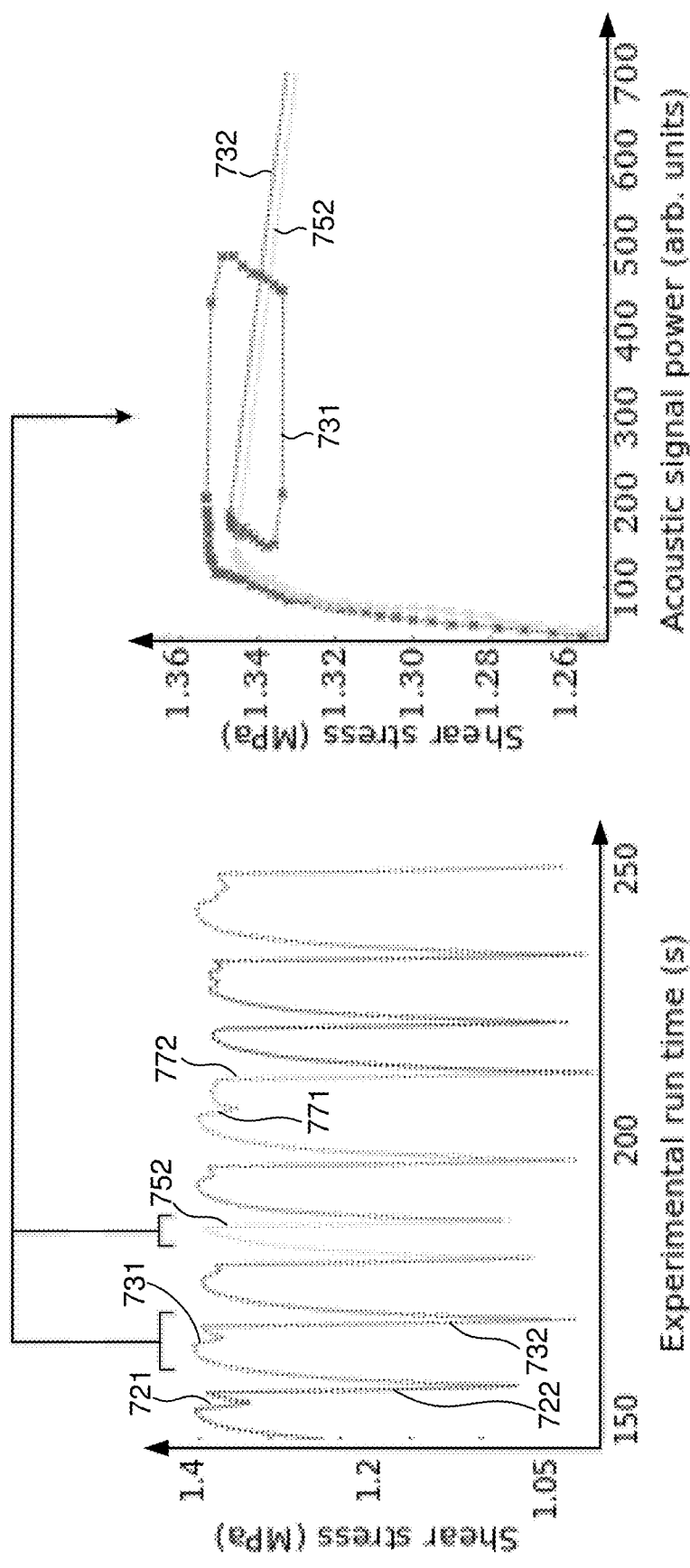

FIGS. 7A-7C show additional examples of laboratory data for aperiodic stick-slip faults. FIG. 7A shows a graph of shear stress vs acoustic signal power for a laboratory experiment similar to that described above in the context of FIG. 6. In this example, a gradient-boosted trees classifier has been trained using a single feature of acoustic emission data, namely the average signal power over a sample time interval. The classifier only uses the acoustic power for the current sample; if the time samples were shuffled before training or before testing, the results would be exactly the same. As before, time samples of 1.33 s duration are used, with 90% overlap between successive samples. Time samples away from failure events are processed with no information regarding the times at which failure events occur.

The solid line 710 in FIG. 7A is a plot of the classifier (trained "ML model") output for different values of acoustic signal power. The dotted lines are plots of various cycles taken from a testing phase; each cycle is shown in a different color. The actual sample points are indicated with X symbols. On some cycles partial retraces 721, 771 can be discerned.

FIG. 7B shows the testing cycles as a time series of shear stress vs running time of the experiment. Partial retraces 721, 731, 771 correspond to incomplete slip (fault) events prior to main slip (fault) events 722, 732, 772. Such incomplete events can be explained as a small or local failure within the fault gouge material, not leading to a general cascade throughout the fault zone. An early slip event 752 is also seen. Such events can occur when the material of the fault zone (in this experiment, the fault gouge) is left in a less stable state following one or more previous failure events. As described herein, the disclosed technologies are able to make accurate estimates and predictions even in the face of these and other forms of cycle-to-cycle variability in behavior.

FIG. 7C shows two particular testing cycles plotted as shear stress vs acoustic power. The green dotted line corresponds to the second cycle of FIG. 7B: an incomplete event 731 is shown prior to a main fault event 732. The blue dotted line corresponds to the fourth cycle of FIG. 7B, corresponding to an early fault event 752. Both graphs in FIG. 7C extend rightward to sample points that are outside the plotted region.

FIG. 7B shows the considerable variation that can occur between cycles in a stick-slip failure environment, with precursor activity such as 721, 731, 771, early faults such as 752, and considerable variation in the time interval between slip events. These aspects of stick-slip behavior indicate the potential difficulty of predicting time or other parameters of a future event, even if the present shear stress is accurately known.

FIGS. 7A and 7C show that varying temporal patterns notwithstanding, the trajectories in the stress-power plane are quite consistent, demonstrating the utility of acoustic emissions (from microscopic events) for estimating shear stress (or equivalently, friction) within a medium.

Figures 8A, 8B, 8C, 8D:
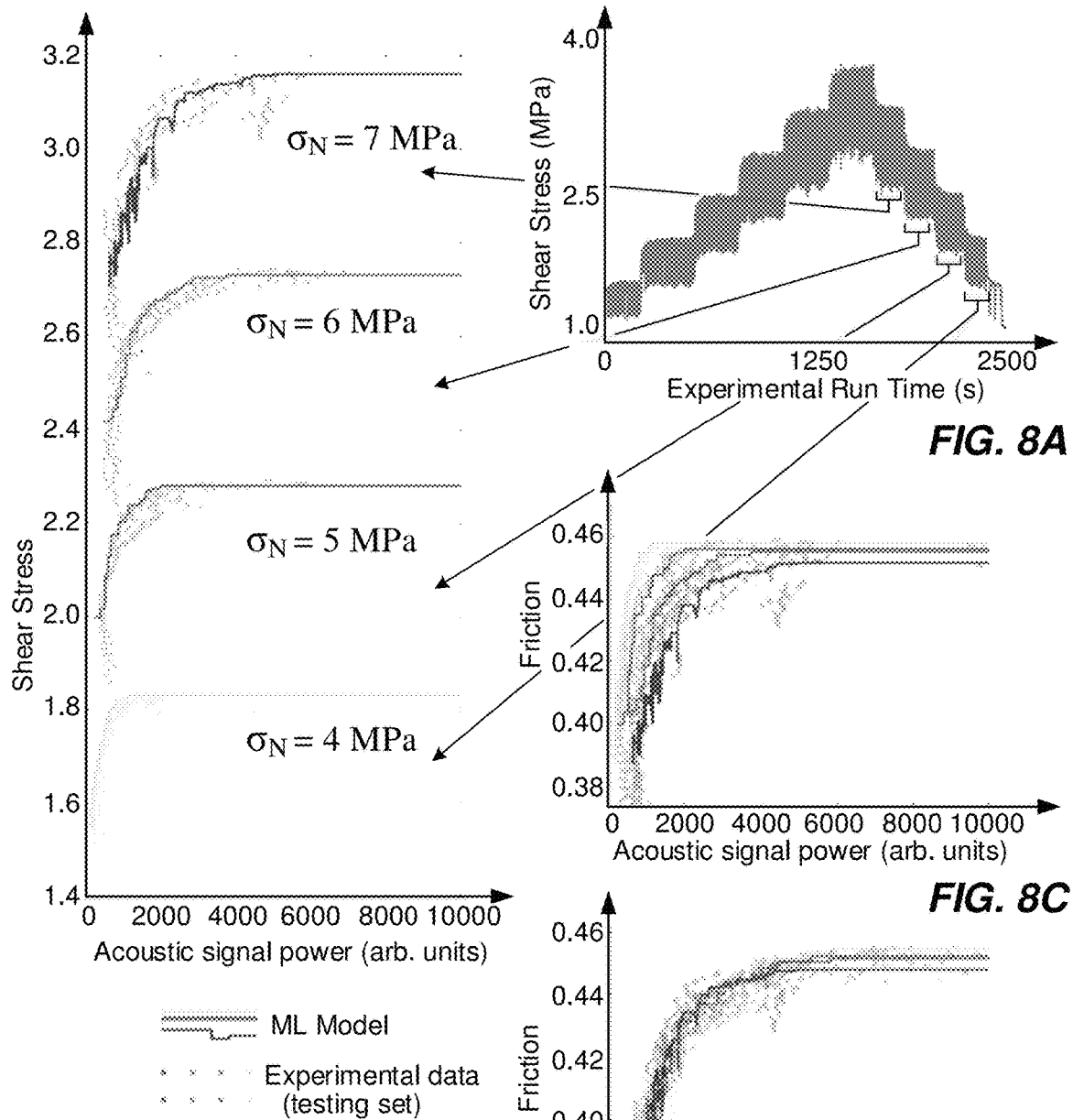
FIGS. 8A-8D are graphs of shear stress data from a laboratory experiment performed over different levels of normal stress.

FIGS. 8A-8D are graphs of shear stress data from a laboratory experiment performed over varying levels of normal stress. FIG. 8A shows raw shear stress data from an experiment performed with apparatus similar to that of FIGS. 5A-5B. In this experiment, the normal stress applied by a hydraulic press similar to 517 can be varied in steps. Generally, when normal stress is increased, the amount of shear stress required to overcome friction is increased, for both gradual sliding and for fault events. From the data of FIG. 8A, steps at 7, 6, 5, and 4 MPa normal stress can be analyzed as separate data subsets. Shear stress and detected acoustic power can be analyzed similarly to the analysis of FIG. 7. That is, a machine learning model can be trained using a single feature, the average acoustic power within a sample. At each step, 80% of the available data can be used for training, leaving 20% of the available data for testing.

FIG. 8B shows plots of shear stress vs acoustic power. The solid lines represent classifier outputs for respective values of normal stress as indicated. The individual points have coordinates of measured shear stress and measured acoustic power for respective samples.

For each data subset, the friction can be calculated as $T/G_N$, whereby the data of FIG. 8B is plotted as graphs of friction vs acoustic power in FIG. 8C. The color coding of datasets in FIG. 8C matches the color coding in FIG. 8B. The graphs for the several data subsets are generally overlapping, but have a noticeable variation in shape as the normal stress is varied. Finally, the acoustic power A can be scaled to $A'=A/(\sigma_N)^3$, and the friction is plotted vs scaled acoustic power A' in FIG. 8D. The different datasets are seen to overlap very well. This demonstrates that classifiers can be scaled between environments having varying or different normal stresses, by using the scaled acoustic power A', for example as a machine learning feature.

XI. Example Stick-Slip Predictions

Figure 9:
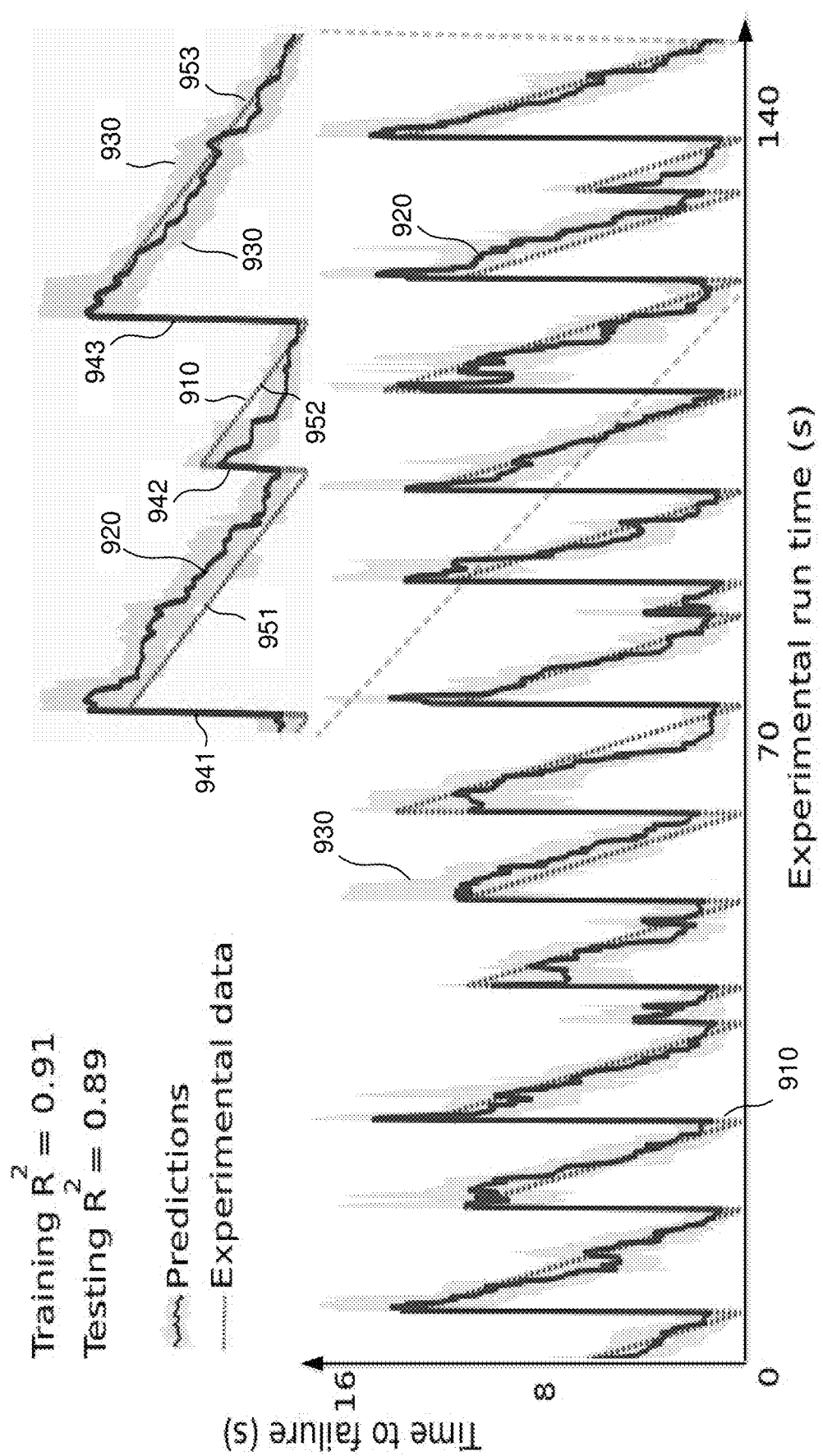
FIG. 9 is a graph comparing stick-slip fault event predictions against observations.

FIG. 9 is a graph comparing stick-slip fault event predictions against observations. Time-to-next-failure-event is plotted on the vertical axis, and time is plotted on the horizontal axis. The red dotted line 910 represents observations. The red dotted line is set to zero at the times of observed stick slip fault events, and projected backward with slope −1 until the preceding event time is reached. Training data (not shown) is used to train a random forest classifier as described herein, with the target class being a continuous variable, namely time to next fault event. As indicated in FIG. 9, the coefficient of determination $R^2$ for the training data is 0.91, meaning that 91% of the observed variance in time-to-next-fault can be predicted by the model, leaving only 9% unaccounted for.

Then, over the time interval illustrated in FIG. 9, a succession of overlapping time windows of an acoustic emission signal are extracted to form a temporal series of samples, and multiple features are calculated for each sample as described herein. For each sample, the classifier is executed and an estimate of time-to-next-fault is obtained. The solid blue line 920 is the time series of the time-to-next-fault determined by the random forest classifier. The testing data has a coefficient of determination $R^2$ of 0.89. Visually, the prediction line 920 is seen to follow the actual observations very well.

Figure 21:
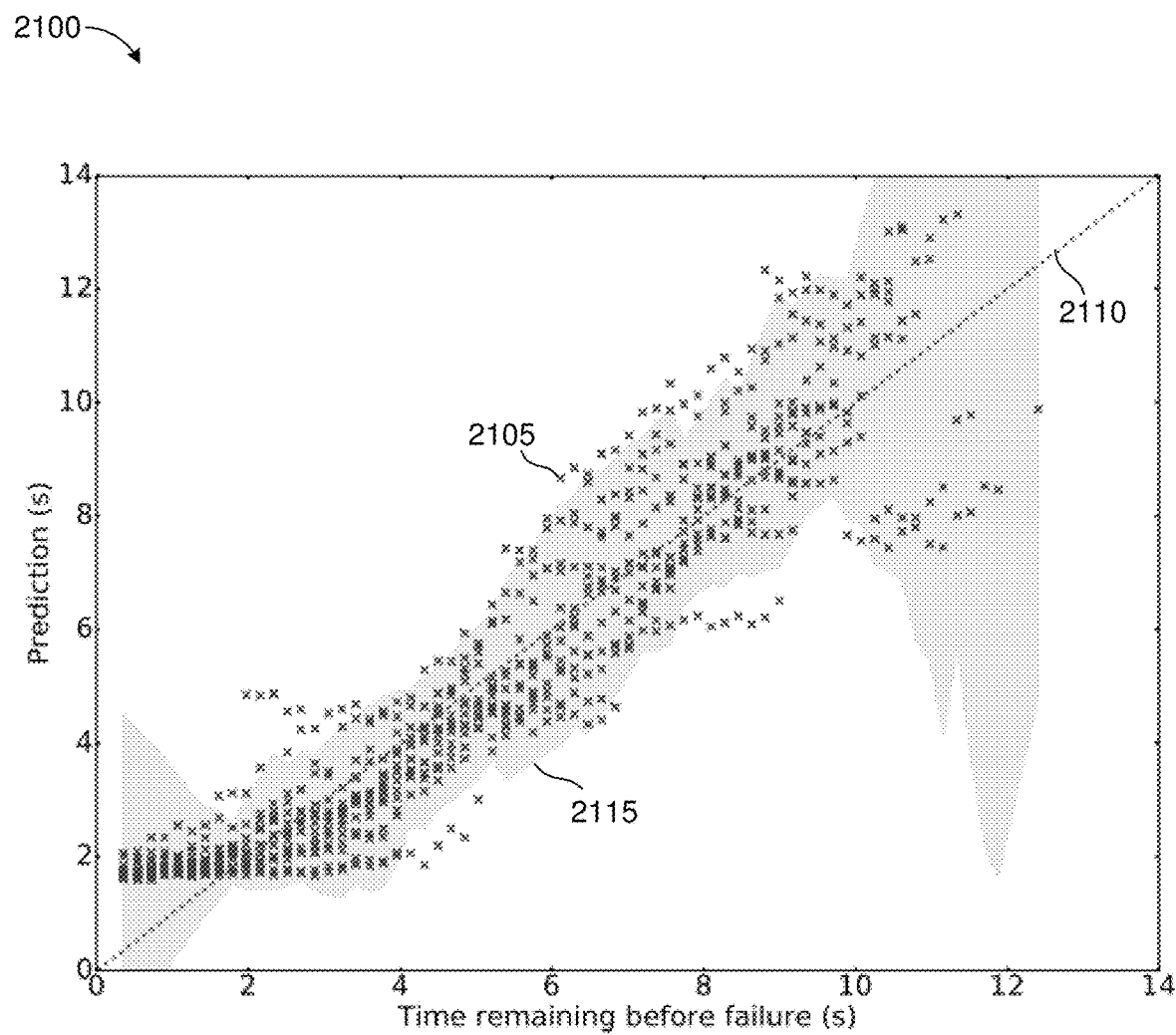
FIG. 21 is a graph showing predicted time to next failure as a function of actual time to next failure for the data of FIG. 9.

FIG. 21 is a graph 2100 showing predicted time to next failure as a function of actual time to next failure, using data from the same experiment as FIG. 9. In FIG. 9, many of the cycles will have a time sample for which the actual time to the next fault event is, say, 5 s. However, the predicted time to the next fault event (dubbed "predicted time") during these cycles may vary over, say, 4-6 s, or even more. FIG. 21 shows the distribution of predicted time values over many cycles, plotted as a function of actual time to next fault event. Each blue cross 2105 in FIG. 21 represents one time sample, with predicted time plotted against actual time to the next fault event. Thus, the range of blue crosses for any given horizontal coordinate represent different cycles of the experiment. The red line 2110 has slope 1: if the predictions were perfect, all the blue crosses would line up on the red line. Additionally, the background shading 2115 indicates the spread of the predictions. The extent of the background shading 2115 is ±two times the average absolute error in the predictions for any given horizontal coordinate value. Generally, the shading 2115 demonstrates that as the actual time remaining to the next fault event decreases, the predictions become more accurate.

FIG. 21 can also be read horizontally. For example, if the predicted time is 5 s, one can conclude that the actual time till the next fault will most likely be between about 4.5 s and 7 s.

Within the random forest are a large number of decision trees, providing independent estimates of time-to-next-fault for each sample. Turning back to FIG. 9, the light shading 930 represents the 5-95 percentile range for these independent estimates: 90% of the individual trees provide an estimate within this range.

Although the data of FIG. 9 appears somewhat periodic, there are a number of short cycles included in the data. The inset shows an expanded view of a short cycle 952 in between two longer cycle 951, 953. The trained classifier is seen to be able to accurately predict, soon after the event 942, that the next event 943 will occur in approximately 4 s; in contrast, after events 941, 943, the classifier accurately predicts that the next event will occur in approximately 10 s. Thus, FIG. 9 demonstrates that the classifier of this example can accurately predict future aperiodic fault events in a stick-slip environment. Although the experiment of FIG. 9 pertains to a laboratory experiment, the same technique applied to an earthquake fault zone can provide accurate earthquake warnings.

Figure 10:
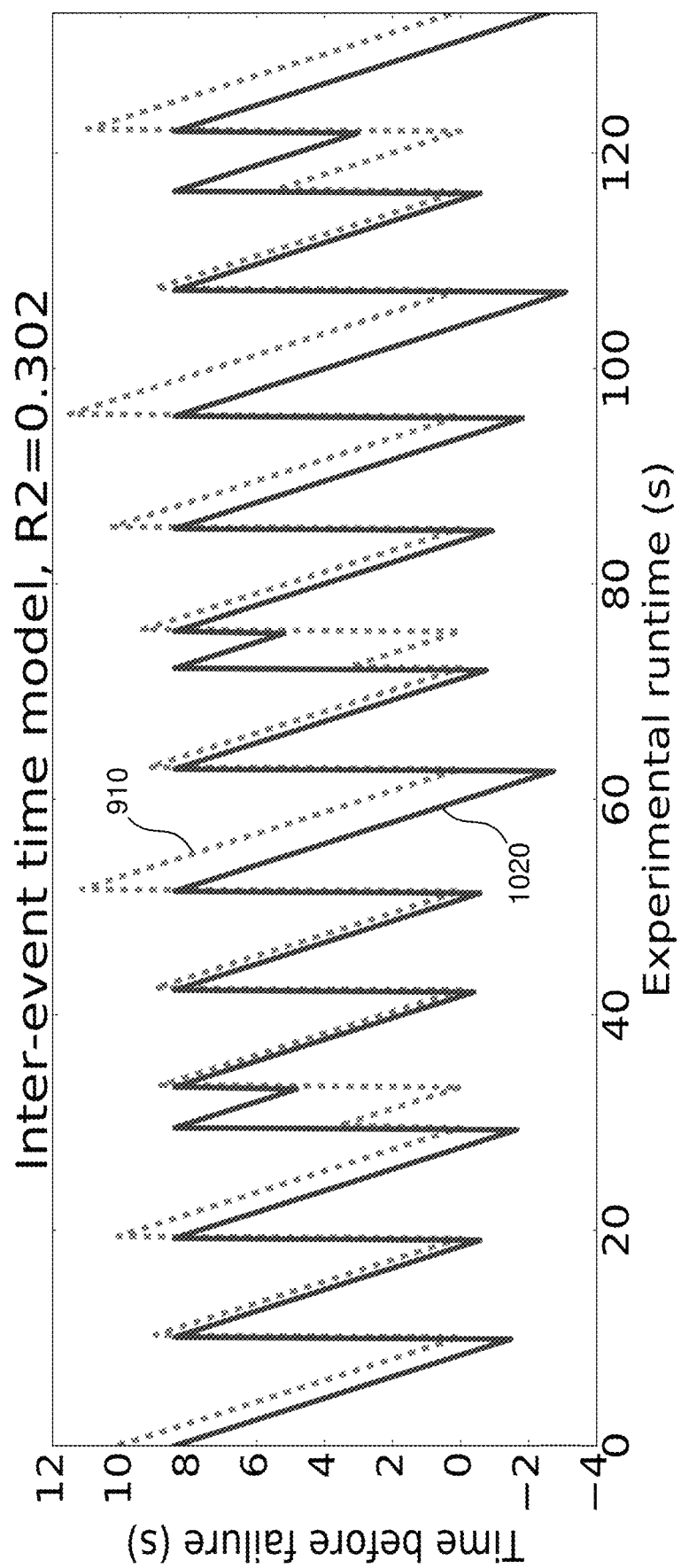
FIG. 10 is a graph of comparative naïve event prediction, for the same dataset as FIG. 9.

For comparison, FIG. 10 is a graph of naïve event predictions made based on the average period of a seismic cycle. The dataset is the same as in preceding FIG. 9, and the red dotted line 910 has previously been described. However, solid blue line 1020 is determined by counting down from an average period of about 8 seconds every time a fault event is detected. Because the seismic cycles do not have a regular period, these naïve predictions perform poorly; the coefficient of determination is only $R^2=0.302$, compared with $R^2=0.883$ obtained with the disclosed machine learning technology as shown in FIG. 9.

XII. Example Slow-Slip Predictions

Figure 11A:
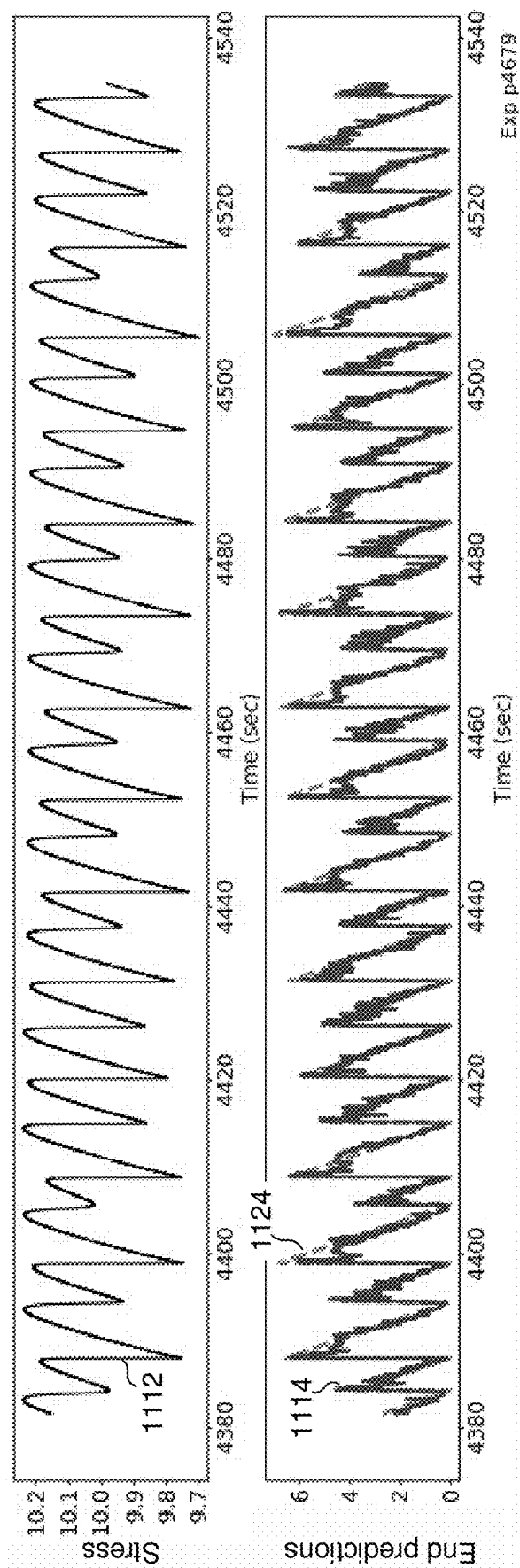
FIGS. 11A-11B are graphs comparing slow-slip fault event predictions against observations.
Figure 11B:
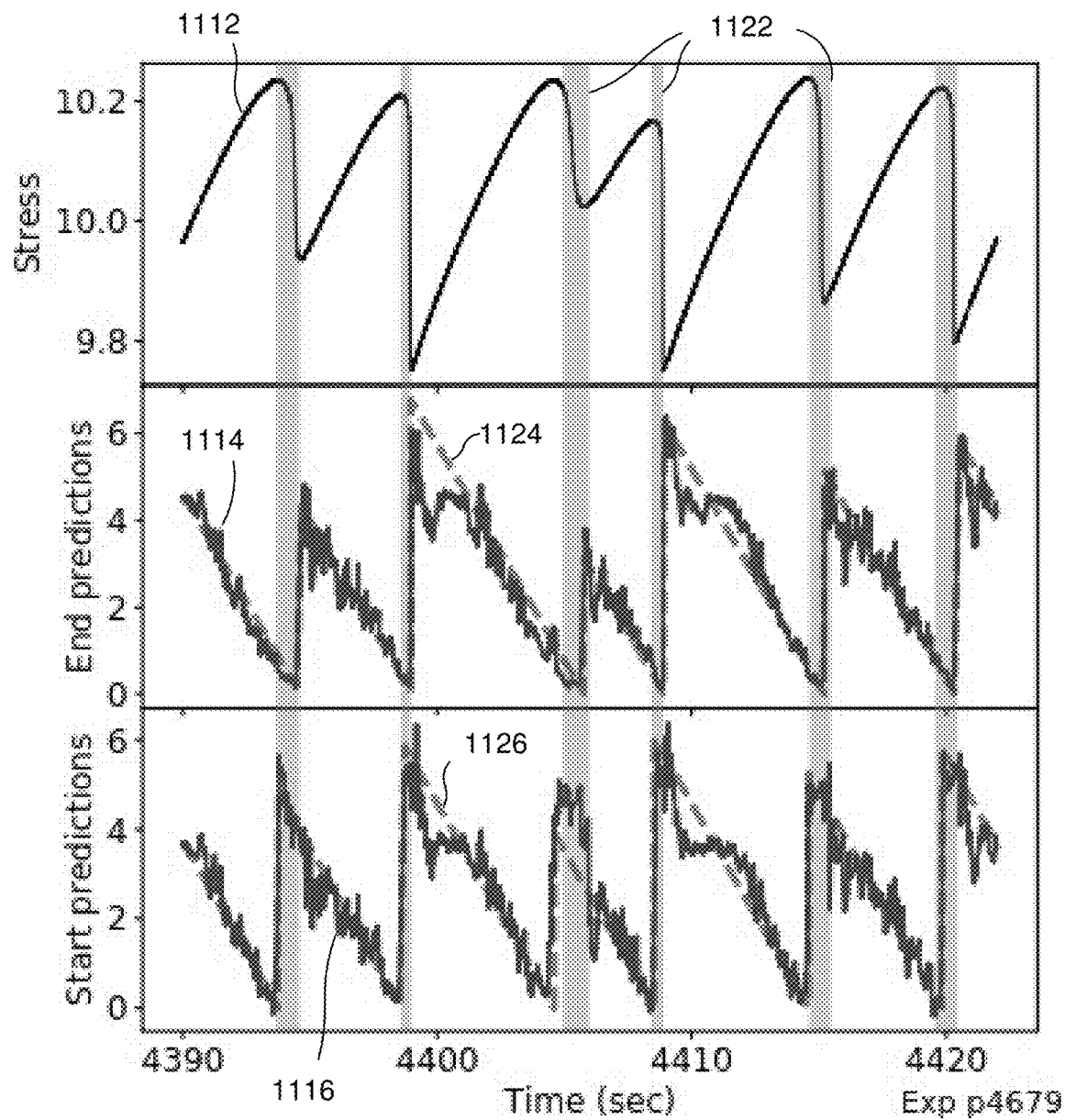

FIG. 11A-11B are graphs comparing slow-slip failure event predictions with observed failure events. Slow-slip failure events are distinguished from stick-slip events in that the failure event, together with its attendant stress decrease and energy release, releases only very modest or insignificant amounts of seismic wave energy as compared to a stick-slip failure. Slow-slip failures can occur over seconds to months in the lab or in a terrestrial environment. In some examples, a slow-slip failure can occur gradually over a period of time greater than 1% of the time interval between faults; in other examples the slow-slip failure event can account for over 2%, over 5%, over 10%, or even over 20% of the time interval between failure events. Therefore, separate predictions can be made for beginning and end times of the slip event, relative to a current sample time at which the predictions are made. Predictions of stress, displacement, or magnitude can also be made.

In this example, the classifier used is a gradient boosted trees model. The first 50% of the experimental data is used as training set, and the following 50% as testing set. The hyper-parameters of the model are optimized automatically by a Bayesian optimization procedure (Efficient Global Optimization).

In FIG. 11A, the upper trace shows a time series of stress data 1112 (in MPa) of a testing phase and the lower trace shows end time predictions (solid blue line 1114) from a classifier trained as described herein. The two traces are temporally aligned. For comparison, the observed end time is shown as a dashed red line 1116, obtained by projecting the observed end times of slip events backwards with slope −1 until the end of a preceding fault event is reached.

FIG. 11B is an expanded view of a portion of FIG. 11A. In addition, a prediction of failure start time (solid blue line 1116) is also shown. The dashed red lines 1124, 1126 are drawn by setting zero where the blue lines 1114, 1116 are estimated to reach zero, and projecting backward with slope −1 till a preceding start/end time is reached. The gray bars 1122 represent the observed slip event durations and are determined from the shear stress data 1112. The classifiers for start and end times are seen to predict the start and end times of the observed slip events well enough to make an accurate prediction of the slip event duration. The individual $R^2$ for each classifier is about 0.88.

Figure 12:
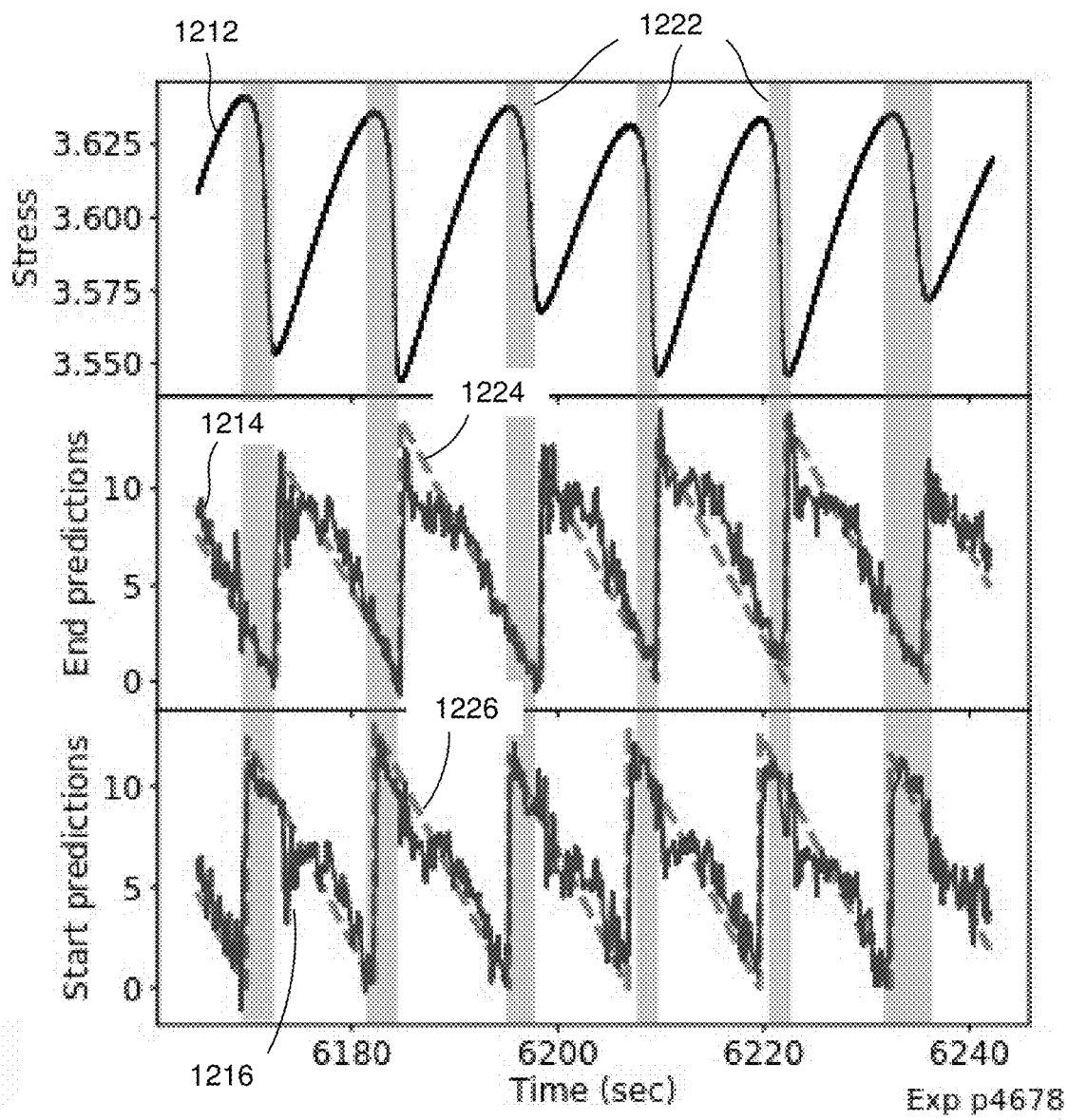
FIG. 12 is a graph illustrating slow-slip predictions in a different regime than FIG. 11.

FIG. 12 is a graph illustrating slow slip predictions in a different slow-slip regime. Whereas the experiment of FIGS. 11A-11B illustrates slow slip events having slow onset and relatively abrupt termination, the slow slip events illustrated in FIG. 12 have slow onset and slow termination. The regime has been changed between FIGS. 11-12 by varying the normal stress. As normal stress decreases, the shear stress yield point can drop, the average period can increase, and the cycle period can become more irregular. Other factors can affect the operative seismic regime, including properties of the medium materials, fluid pressure, the geometry of existing faults, and the geometrical relationship between fault planes and the direction of (terrestrial or laboratory) seismogenic forces. Different regimes can be found simultaneously in different parts of a fault; for example, slow-slip may predominate in deeper regions having more ductile material, while slip-stick can dominate upper or shallow regions having brittle crust. Rupture phenomena including acoustic emission can also vary according to the regime, and can include patterns of small amplitude nonvolcanic tremor, low frequency earthquake (LFE) signals, or supershear rupture.

The top trace 1212 shows a time series of stress data in MPa from a testing phase above and temporally aligned with end time predictions (solid blue line 1214) and start time predictions (solid blue line 1216) from respective classifiers trained as described herein. The dashed red lines 1224, 1226 are drawn by setting zero where the blue lines 1214, 1216 are estimated to reach zero, and projecting backward with slope −1 till a preceding start/end time is reached. The gray bars 1222 represent the predicted slip event durations and are determined from the predictions of failure start times and failure end times. The classifiers for start and end times are seen to predict the start and end times of the observed slip events well enough to make an accurate prediction of the slip event duration in this regime also. The individual $R^2$ for each classifier is about 0.88.

XIII. Example Outdoor Laboratory Studies

Figure 25:
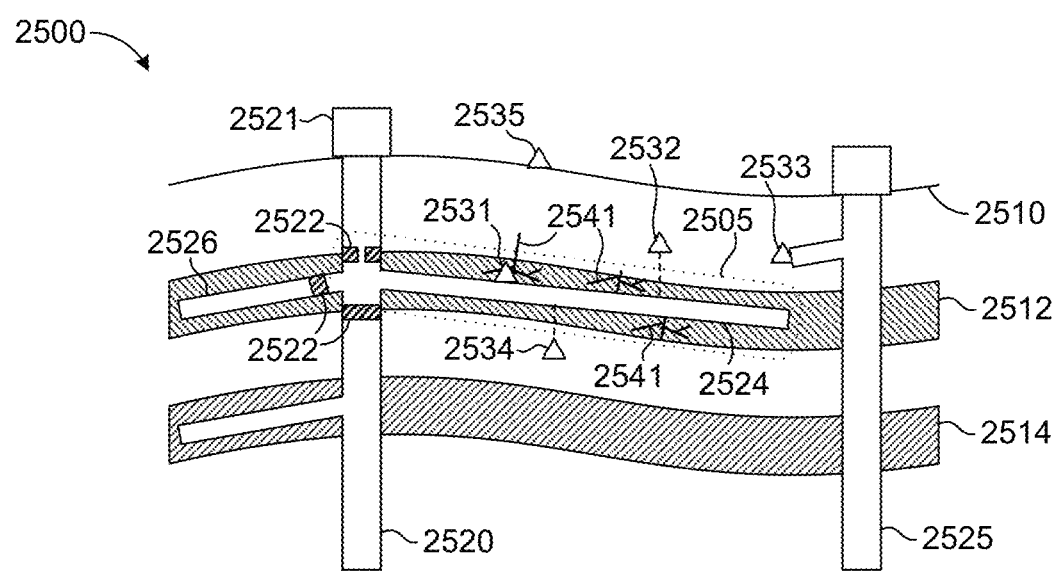
FIG. 25 shows an example of an outdoor laboratory setup for acquiring training data.

FIG. 25 shows an example of an outdoor laboratory setup 2500 for acquiring training data. A dry well 2520 can be configured to isolate a geological layer 2512 of interest using packers 2522 to create a test bed 2505. One or more optional horizontal borings 2524 within the layer can be reused or newly created to extend the test bed 2505. An assortment of sensors 2531-2535 can be deployed to acquire both signals indicative of microscopic processes, and to acquire macroscopic data related to stress and displacement. Generally, microscopic process sensors can include acoustic or seismic sensors as disclosed herein, while macroscopic monitors can include strain gauges placed across cracks or pressure sensors. Commonly, fluid injection volume and pressure can also be monitored. Electromagnetic imaging, acoustic imaging, gas detectors, or other instruments can also be deployed. In varying examples, some sensors 2531 can be placed within the layer of interest 2512, other sensors 2532-2534 can be placed within other strata, or further sensors 2535 can be placed at the terrestrial surface 2510. Subsurface sensors can be accessed through the primary well 2520, or through an auxiliary borehole 2525. Dashed lines indicate wiring for sensors not directly accessible at the surface or at a borehole.

Once instrumented, the outdoor laboratory setup can be subjected to fluid injection from well head 2521 according to protocols having fluid type, pressures, and timing that replicate anticipated fluid injection processes at production sites. Alternatively, accelerated fluid injection protocols can be used, or artificial fluid injection protocols designed to provide training data coverage over an extended range of state space. The instrument data can be collected before, during, and after fluid injection cycles, optionally including depressurization, and processed to obtain a succession of time samples with respective feature vectors in a corpus of training data. This training data can be used to train or build one or more classifiers as described herein, and also to test the resulting classifiers. In some examples, training data can be subdivided according to the phase of a fluid injection protocol (e.g. injection phase, quasi-static pressurization, depressurization, or post-injection), with respective classifiers built or trained for each phase.

After an experiment, horizontal borings 2524 can have fracture damage 2541. These borings 2524 can be plugged, and new horizontal borings 2526 in different directions or at different depths can be used to continue experiments at the same site. A single site can also be reused at another geologic layer 2514.

The laboratory setup of FIG. 25 can be replicated at different sites having different respective geologic conditions. Particularly, a lab setup (e.g. an instrumented test well) can be installed in the vicinity of a production well site to acquire training data in the same geologic conditions encountered in production. The production well can itself be used for an instrumented testbed. Furthermore, evaluation of test well sites with the disclosed technologies can be used proactively, e.g. to select locales for energy extraction or fluid injection based on having low susceptibility to fluid-driven failures.

Figure 26A:
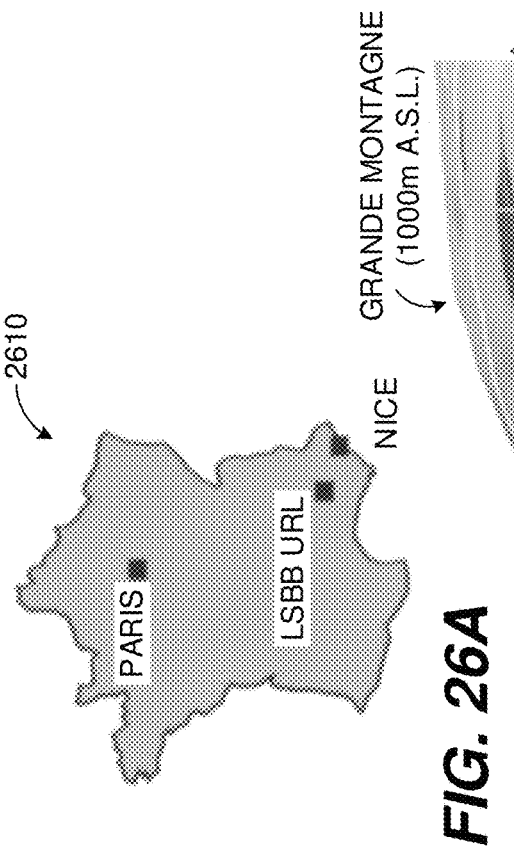
FIGS. 26A-26E describe an example outdoor laboratory experiment conducted at the Low-Noise Underground Laboratory (LSBB URL) in Rustrel, France.
Figure 26B:
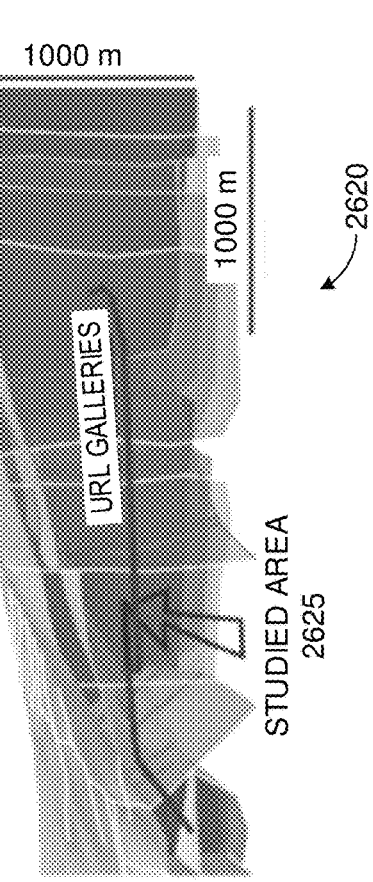

FIGS. 26A-26E illustrate an example experiment conducted at the Low-Noise Underground Laboratory (LSBB URL) in Rustrel, France. FIG. 26A is a map 2610 showing the location of LSBB URL in France. FIG. 26B is a vertical section 2620 showing the geological configuration of the laboratory site, including various research galleries and the particular location 2625 of this experiment.

Figure 26C:
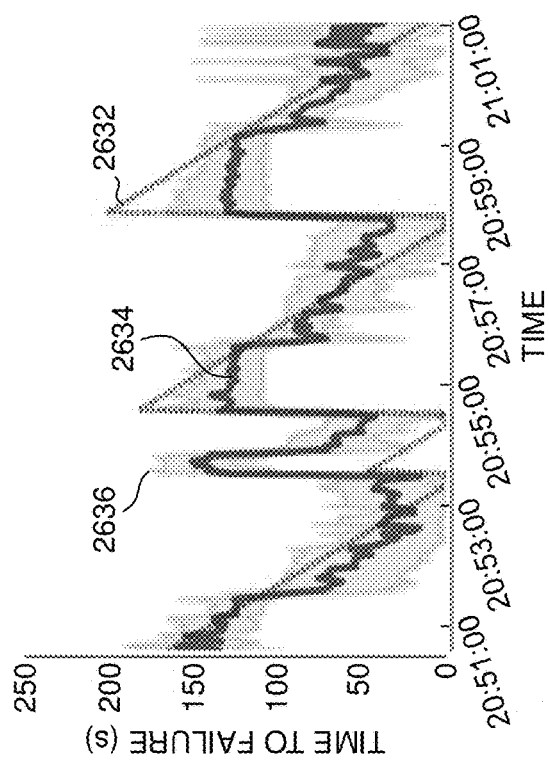
Figure 26C:
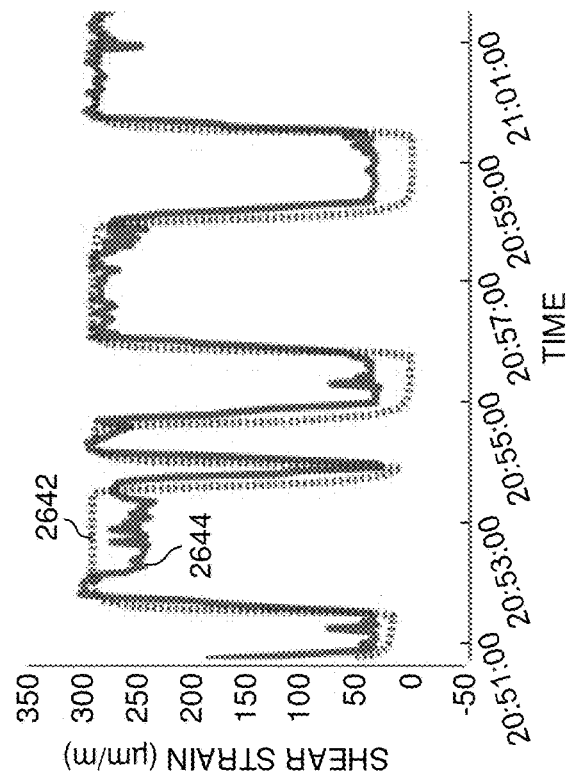

FIG. 26C is a pair of graphs comparing observations with the predictions of a trained machine learning model for one experiment conducted at the site 2625. Similar to FIG. 9, the top graph shows time to failure vs a ten minute run time of the experiment. The red dotted line 2632 represents observations. The red dotted line is set to zero at the times of observed stick slip fault events, and projected backward with slope −1 until the preceding event time is reached. Training data (not shown) is used to train a random forest classifier as described herein, with the target class being a continuous variable, namely time to next fault event, or mechanical strain. Then, over the time interval illustrated in FIG. 26C, a succession of overlapping time windows of an acoustic emission signal are extracted to form a temporal series of samples, and multiple features are calculated for each sample as described herein. For each sample, the classifier is executed and an estimate of time-to-next-fault is obtained. The solid blue line 2634 is the time series of the time-to-next-fault determined by the random forest classifier. Generally good agreement can be seen throughout the earthquake cycle. Within the random forest are a large number of decision trees, providing independent estimates of time-to-next-fault for each sample. The light shading 2636 represents the 12.5-87.5 percentile range for these independent estimates: 75% of the individual trees provide an estimate within this range.

Figure 26D:
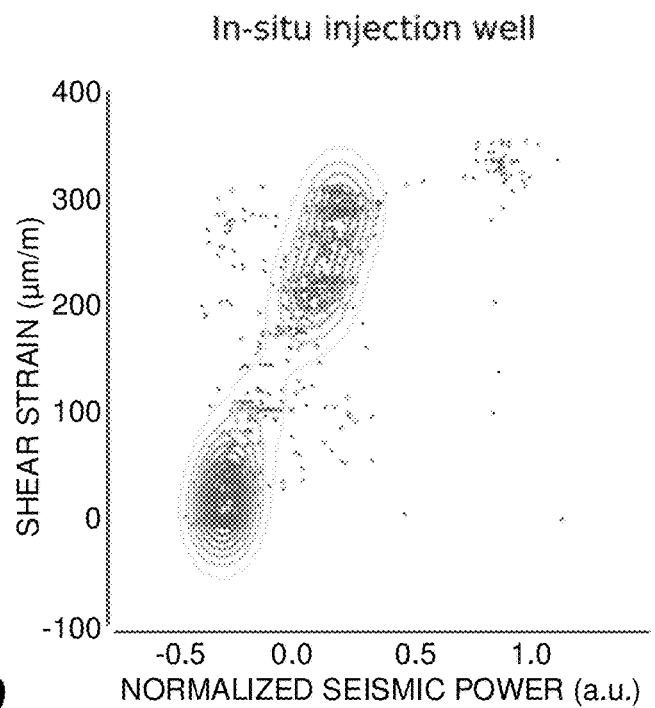
Figure 26E:
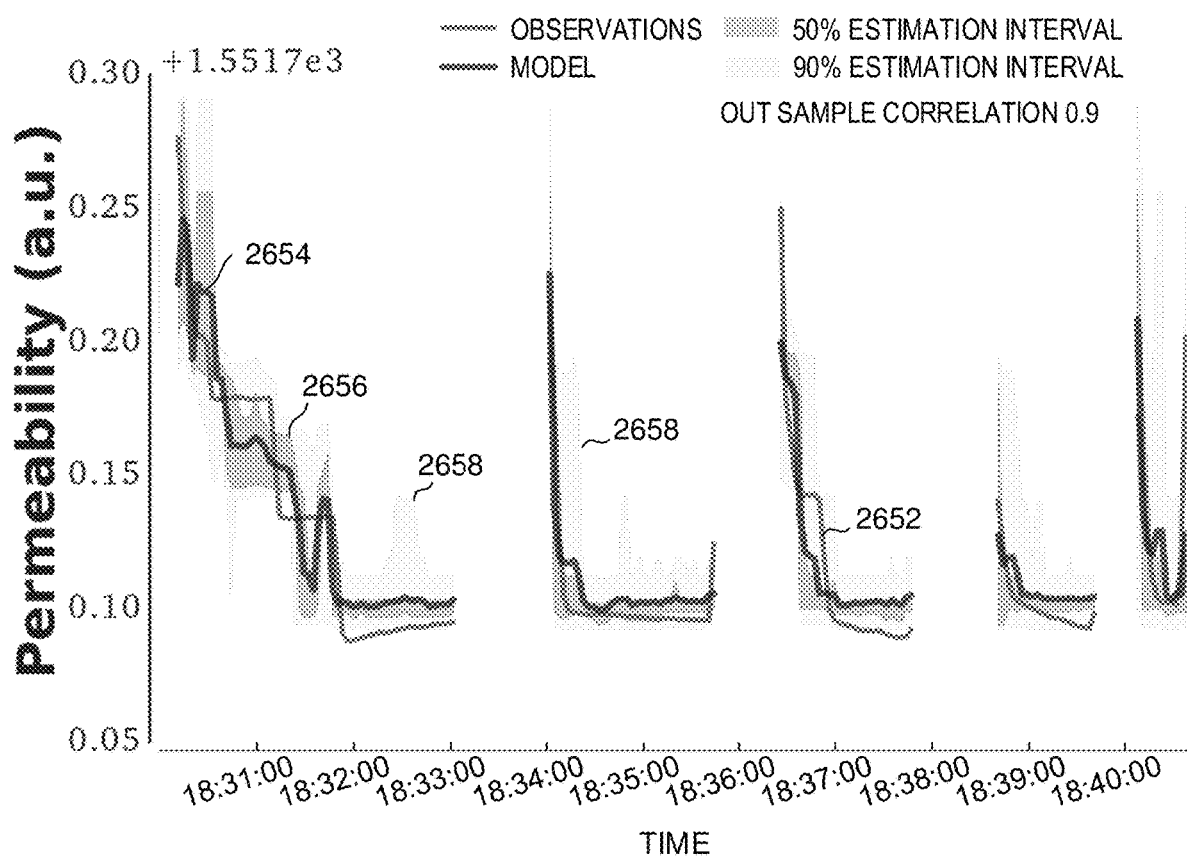

The lower graph of FIG. 26C is a comparison of measured shear strain 2642 (red dotted line) and shear strain predicted by a trained random forest model 2644 (solid blue line). The machine learning model used in the experiments of FIG. 26C used a continuous seismic signal as a single input from which to make predictions. FIG. 26D is a density plot showing shear strain vs normalized seismic power. The bistable nature of this fluid injection environment can be readily observed. Gradient boosted trees regression can be used to make amplitude predictions. In other experiments, the orientation of deformation can be estimated.

The experiments of FIG. 26 can also be used to estimate the permeability of the medium for fluid flow. FIG. 26E is a comparison of measured permeability 2652 (red line) and the permeability predicted by a trained random forest model 2654 (blue line). The dark shading 2656 represents the 25-75 percentile range among the decision trees of the random forest model, while the light shading 2658 represents the 5-95 percentile range. That is, 50% of the decision trees produce estimates lying within the dark shaded band 2656, and 90% of the decision trees produce estimates within the light shaded band 2658. The model can be seen to estimate fluid permeability with good accuracy.

XIV. Example Amplitude Prediction

Figure 13:
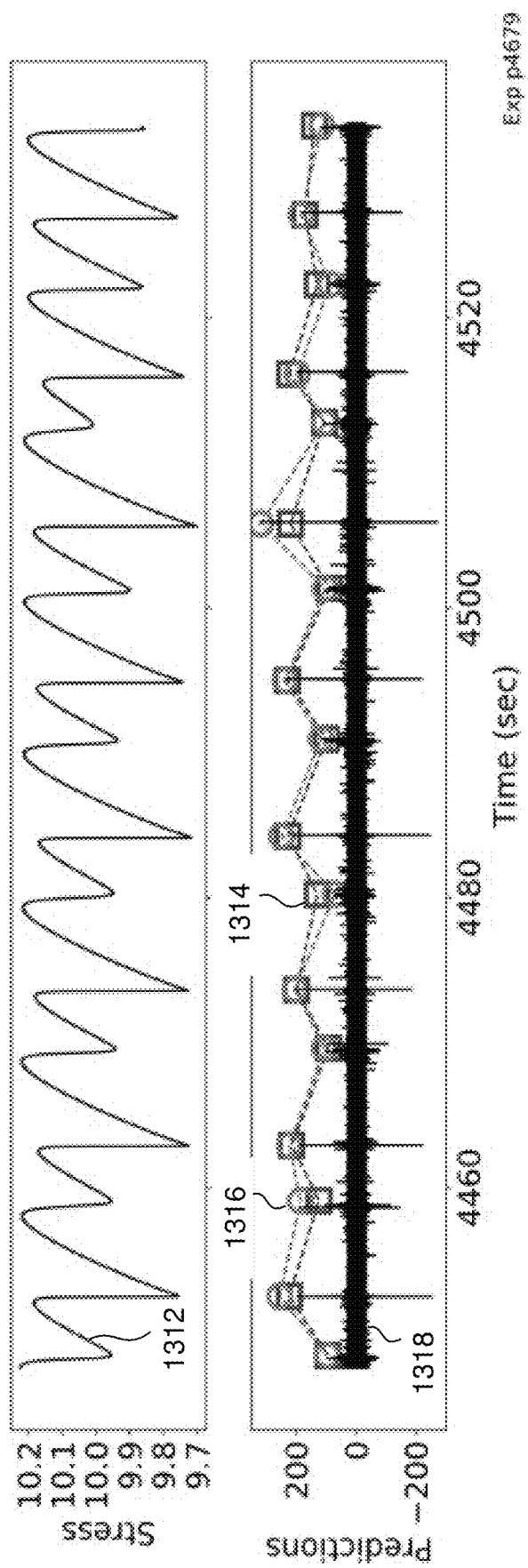
FIG. 13 is a graph illustrating amplitude prediction of slow-slip events in a regime similar to FIG. 11.

FIG. 13 is a graph illustrating amplitude prediction of slow-slip events in the same regime as FIG. 11. The top trace shows a time series 1312 of shear stress in MPa vs time. The bottom trace shows a time series 1318 of an acoustic signal, as well as observed peak acoustic signal amplitudes in absolute value (red circles, 1316) and predicted peak acoustic signal amplitudes in absolute value (blue squares 1314). In order to predict peak acoustic signal amplitude, two stage classification is performed similar to that shown in FIG. 1. In a first stage, a classifier similar to 152 is trained on slip event start times, and a classifier similar to 154 is trained on slip event end times; the outputs of these classifiers are combined to derive estimates of slip event duration. The predicted future event time is combined with a known time since the last slip event to derive an estimate of inter-event time. A second stage classifier similar to 156 can use the slip event duration estimate and the inter-event time estimate, along with other features, to predict the peak acoustic signal amplitude of a next slip event. Some other features that can be used by a second stage classifier include statistical parameters of the detected acoustic emission signal (such as variance) and the known (observed) peak acoustic signal amplitude of the most recent slip event. The output of the second stage classifier is the estimated peak acoustic signal amplitude of the next slip event, in absolute value, indicated by blue squares 1314.

Figure 14:
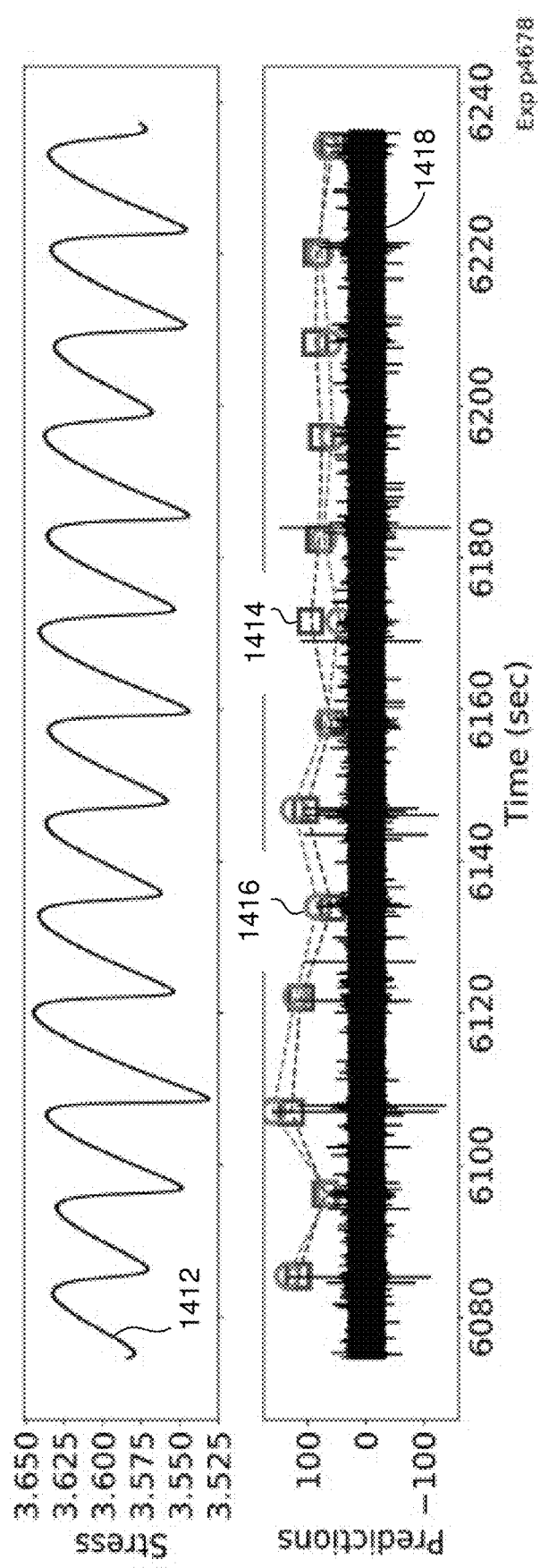
FIG. 14 is a graph illustrating amplitude prediction of slow-slip events in a regime similar to FIG. 12.

FIG. 14 is a graph illustrating amplitude prediction of slow-slip events in the same regime as FIG. 12. The top trace shows a time series 1412 of shear stress in MPa vs time. The bottom trace shows a time series 1418 of an acoustic signal, as well as observed peak acoustic signal amplitudes (red circles, 1416) and predicted peak acoustic signal amplitudes, in absolute value (blue squares 1414). In order to predict peak acoustic signal amplitude, two stage classification is performed similar to that described in context of FIG. 13.

FIGS. 13-14 demonstrate amplitude prediction of future failure events using only local moving time windows of acoustic emission signals, in two different regimes. In some examples, the detected acoustic emission signals and/or the predicted peak acoustic signal amplitudes can be corrected for distance between acoustic emission sensor(s) and a fault zone.

In some applications, the moment magnitude of a slip event is of greater interest than the acoustic signal amplitude. The moment magnitude can be derived from the peak acoustic signal amplitude. Alternatively, displacement U can be used as a training variable instead of or in addition to the shear stress τ. Then, with a first classifier providing an estimate of available stress at the next fault event, and a second classifier providing an estimate of slip distance at the next fault event, a measure of energy release can be determined from a combination of stress, fault area, and slip distance. For example, energy=stress×area×distance. In an earthquake application, moment can be derived from inversion of seismic waves to determine the slip area and displacement XV. Example Displacement Predictions In another example of the disclosed technology, the microscopic acoustic emission signal has been used to determine fault displacement as the macroscopic parameter. In the Cascadia subduction zone, gradual displacement on the fault is combined with microseismicity and small earthquakes. In this environment, the seismic acoustic emission signal can be processed to de-emphasize the microseismic and small earthquake events and allow the machine learning algorithm to focus on the sub-threshold acoustic emission signal. For example, the seismic sensor signals can be (a) corrected for instrument response, (b) offset to de-trend and compensate for daily average (c) bandpass filtered to retain frequency ranges where the sub-threshold signal is relatively strong while the microseismic event signals are relatively weak, and/or (d) clipped to remove small earthquakes, in any order or in any combination. Overlapping temporal samples of preprocessed signal can be extracted as described herein, and features evaluated for each. In an illustration from the Cascadia subduction zone, five 1 Hz wide filtered frequency bands were retained from 7 Hz to 12 Hz.

As in other examples, acoustic power was found to be a valuable feature, and can include overall acoustic power or acoustic power in one or more filtered frequency bands. Other valuable features can include inter-quartile ranges that are less susceptible to discrete seismic events, or similar mid-percentile intervals such as 40%-60%, 10%-90%, etc.

Figure 22:
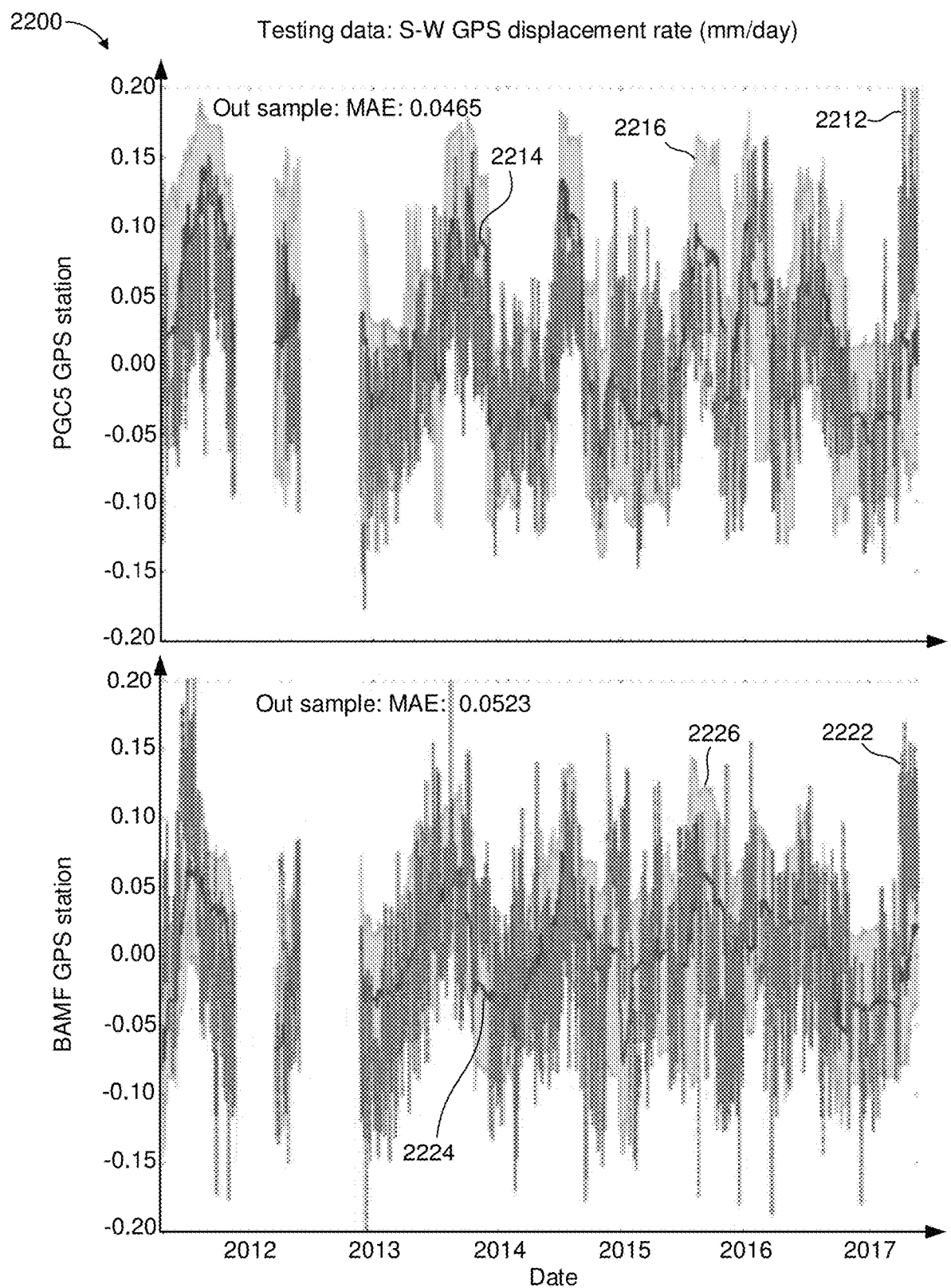
FIG. 22 is a graph comparing displacement estimates from a machine learning model with GPS observations, for two monitoring stations at Vancouver Island in the Cascadia subduction zone.

FIG. 22 is a graph 2200 comparing displacement estimates (in this case displacement rate) from a machine learning model with GPS observations, for two monitoring stations at Vancouver Island in the Cascadia subduction zone. The red dotted lines 2212, 2222 show the GPS measurement data. The solid blue lines 2214, 2224 show the estimates from the machine learning model, while the blue shading 2216, 2226 show 75% confidence intervals of the machine learning estimate. The historical record of data has two gaps in the years 2011-2012 where no data is shown in FIG. 22.

Figure 23:
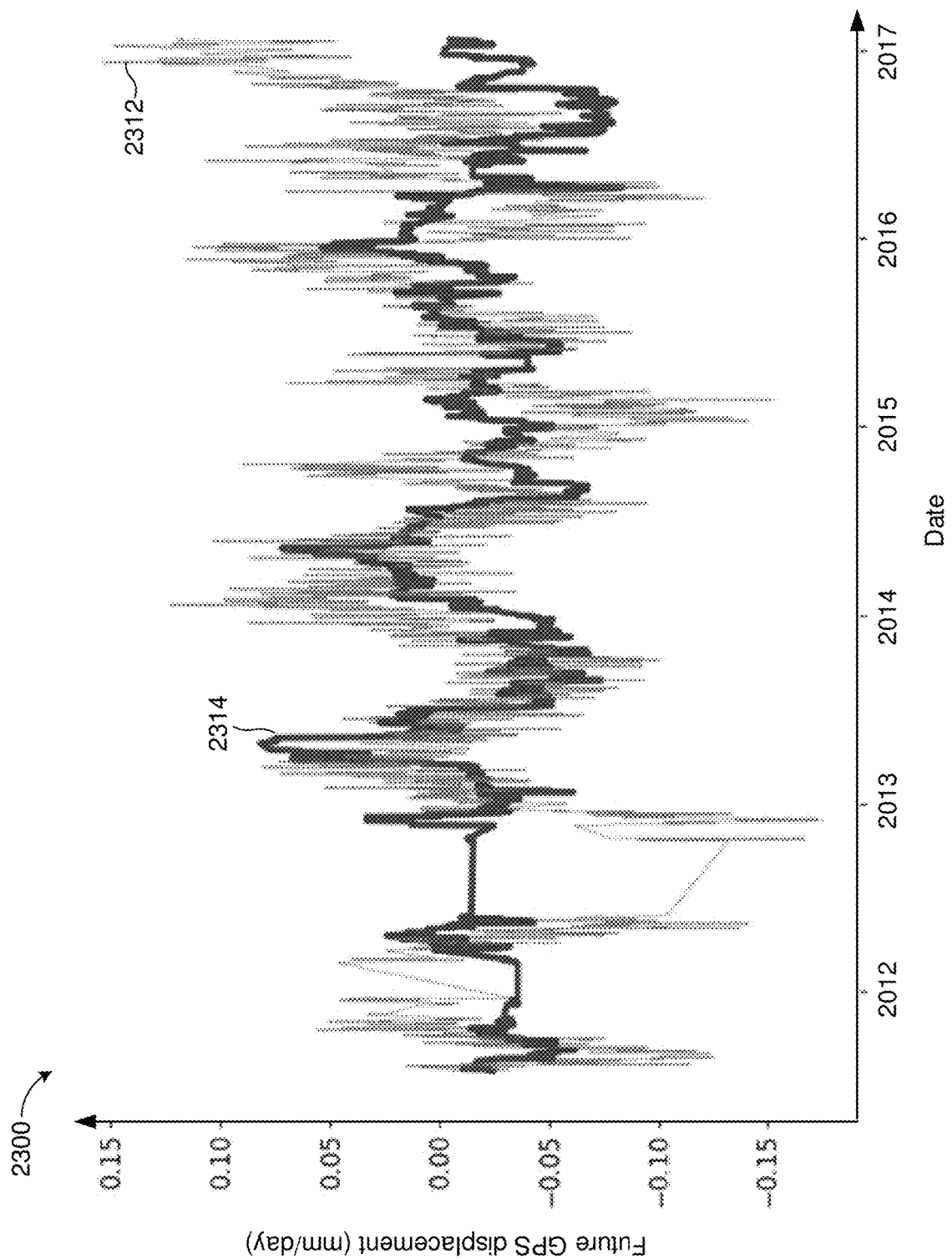
FIG. 23 is a graph comparing displacement predictions from a machine learning model with GPS observations, at a monitoring station in the Cascadia subduction zone.

FIG. 23 is a graph 2300 comparing displacement predictions from a machine learning model with GPS observations, at a monitoring station in the Cascadia subduction zone. For any given time coordinate t (on the horizontal axis), the red dotted line 2312 shows the value of the GPS observed displacement at t+2 months. For the same time coordinate t, the blue solid line 2314 shows the value of the predicted displacement at t+2 months. There is the same gap in the data as in FIG. 22. As an alternative to using GPS displacement, interferometric synthetic aperture radar (In-SAR) can be used as a reference or for training.

XVI. Additional Prediction Examples

New Zealand

In another example of the disclosed technology, the microscopic acoustic emission signal has been used to demonstrate the non-randomness of earthquakes in New Zealand. It is shown that in New Zealand, large earthquakes (magnitude 4 and up) can occur with much greater likelihood at times when the acoustic emission signal is strong. For example, a large earthquake in the Christchurch area can be 10 times more likely to occur when the acoustic emission signal is more than two standard deviations above the mean, compared to when the acoustic emission signal is below this threshold. Thus, the disclosed technology can be used to create seismic risk maps based on the evolution of the acoustic emission signal in time and space. These risk maps can be based on one or more signals emanating from the terrestrial medium, and represent an improvement over conventional seismic risk maps that rely on past rates of earthquake events and also assume that earthquake occurrence is random. Similar risk maps are not limited to earthquakes, and can be prepared for other failure types disclosed herein.

Chile

A similar approach to the Cascadia analysis has been applied in Chile, where a determination was made whether continuous signals identified in Earth carry predictive information regarding failure times. It was found that continuous seismic waves can carry information about impending earthquakes of large magnitude, indicating that earthquakes do not occur randomly, but follow precise patterns leading to failure. These signals can be connected to slow slip events, and can be particularly clear preceding major earthquakes.

XVII. First Example Method for Training a Random Forest

Figure 15:
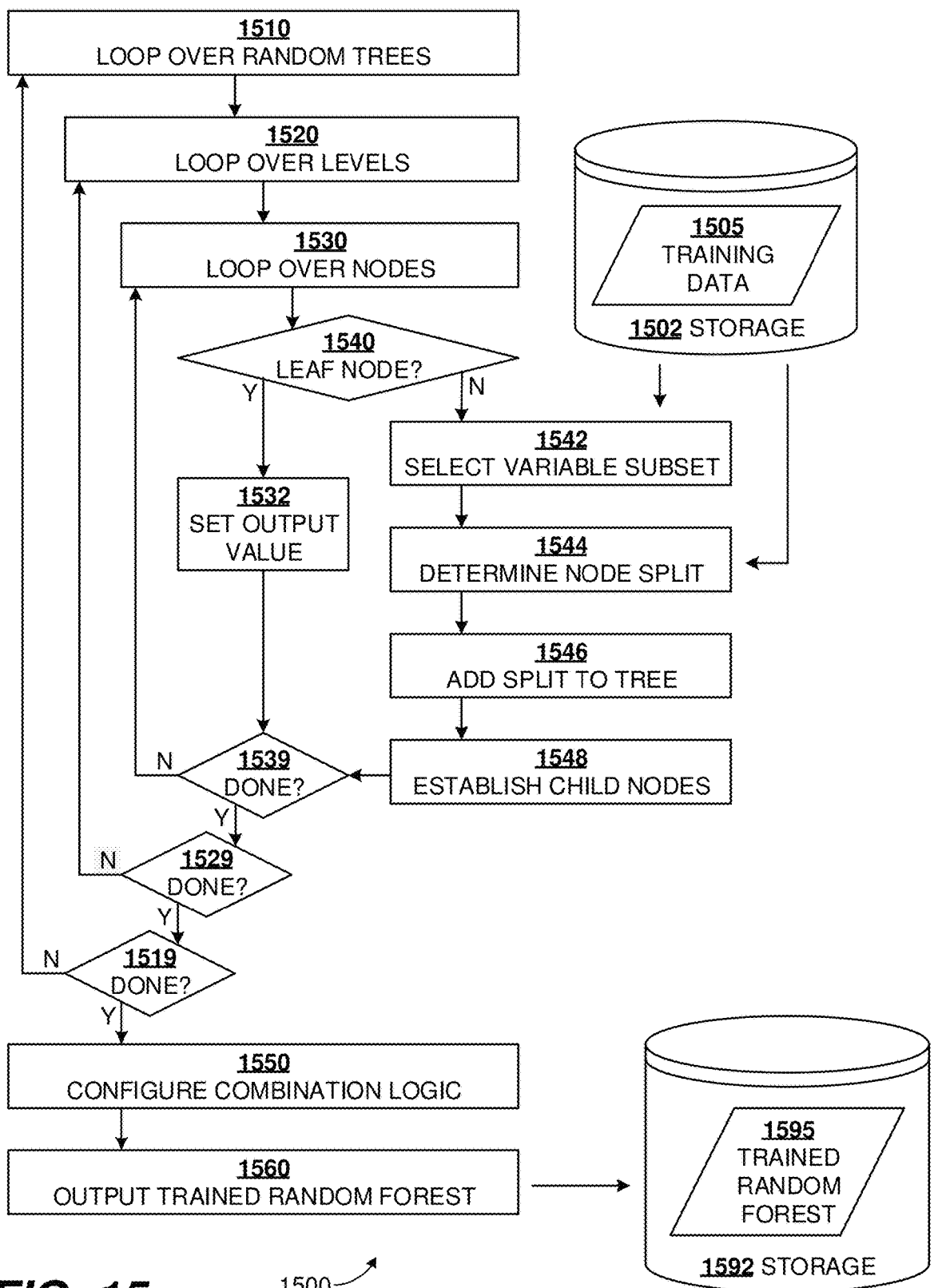
FIG. 15 is a flowchart of an exemplary method for training a random forest according to disclosed technology.

FIG. 15 is a flowchart 1500 outlining an exemplary method for training a random forest. As described herein, a random forest can incorporate a collection of independent classifiers such as decision trees. Each decision tree can be built node by node. For each non-leaf node at a level L, a corpus of training data 1505 can be used to determine a branching at that node, resulting in new nodes at level L+1. (The root node is regarded as level L=0, with level numbers increasing as a decision path is followed away from the root node.) Leaf nodes can be identified based on satisfying one or more leaf termination conditions. The decision tree is complete when all paths through the tree terminate in only leaf nodes or, equivalently, when all nodes at a given level L are leaf nodes, so that there are no nodes at level L+1. Multiple decision trees can be trained sequentially or in parallel. Combination logic can be configured to combine decisions of the various independent classifiers into a single result. Finally, the trained random forest 1595 can be stored in storage 1592. Hyperparameters can be used to control the number of independent classifiers, the leaf termination conditions, the procedure for determining branching at non-leaf nodes, or other parameters of the random forest.

At process block 1510, a loop over random trees is initiated. For each random tree, a loop over levels is initiated at process block 1520. As shown, the random trees are constructed sequentially. In alternate examples, process blocks 1510 and 1520 can be interchanged so that for a given level, all trees are built at that level before moving to the next level, thereby constructing the random trees in parallel. Details of loop operation (such as "for," "do," or "while" loops) are well known in the art and need not be described further herein. In some examples, the loop ranges (e.g. number of trees or number of levels) can be predetermined, while in other examples one or more loops can have dynamically determined ranges.

At process block 1530, a loop over nodes is begun. At process block 1540, a test is made whether the current node satisfies a leaf termination condition and is therefore a leaf node. If the current node is a leaf node, the procedure follows the Y branch to process block 1532, described below. Otherwise, the current node is not a leaf node, and the method follows the N branch to process block 1542, where training data 1505 is accessed from storage 1502.

Training data can be regarded as a number of data records, each data record including multiple attributes or fields. A data record can represent a single sample of a medium or region being studied. In some examples, a sample can be spatially localized (e.g. over 1 $cm^2$, 1 $m^2$, 1 $km^2$, or 1000 $km^2$) so that different samples are obtained from different locations, even at a single instant of time, while in other examples observations over some spatial extent are combined into a single sample or data record. In some examples, a sample can be temporally localized (e.g. over 1 millisecond, 1 second, 1 hour, 1 day, or 1 year) so that different samples are obtained at different times, even at a single spatial location, while in other examples, observations over an extended temporal duration can be combined into a single data record. Spatially localized samples can overlap. Temporally localized samples can overlap. For example, samples of an acoustic emission signal can be taken over 1 second windows progressively offset by 0.1 s, i.e. with 90% overlap.

The data record of a sample can be based on observations made by one or more sensors using the same or different modalities, in any combination. In an example laboratory experiment, sensors can include a combination of piezoelectric transducers (PZT), microphones, vibration sensors, eddy current sensors, strain gauges, fluid pressure sensors, or dynamometers. In an example earthquake fault zone, sensors can include a combination of seismometers, microphones, high-frequency GPS, interferometric synthetic aperture radar (InSAR), or laser interferometers. A single sample can be observed by different sensors in different positions or at different points in time, due to speed of propagation of observed signals in or from an observed medium, and optionally with directionally sensitive sensors. The sensors can directly or indirectly measure acoustic emission, vibration, or other quantities such as macroscopic stress, temperature, pressure, displacement, or pH.

The attributes of a training data record can be direct or indirect sensor observations, such as displacement, or can be quantities derived from one or more detected sensor signals. Some examples of derived quantities include amplitude, variance, or spectral power. Some of the attributes are inputs to be used by the random forest to perform classification; these attributes are termed "features."

Considering node n at process block 1542, a subset of features $\{X(n)\}$ is randomly selected from the set of features $\{X\}$ of the training data: $\{X(n)\} \subset \{X\}$. The size of the feature subset can be a controlled hyperparameter, or can itself be randomly chosen according to another hyperparameter. In some examples, the subset $\{X(n)\}$ can exclude features used as branching criteria at an immediate parent node of node n, while in other examples the subset $\{X(n)\}$ can exclude attributes used as branching criteria for all ancestors of node n. In further examples, no attributes are excluded during the process of determining $\{X(n)\}$.

In addition to features, training data records can contain one or more labels associated with the record, and can also contain trace information to identify or characterize the record.

At the root node of a decision tree, all training data records $\{T\}$ are available, however as the decision tree is followed to levels L>0, progressively fewer training samples will reach farther levels of the tree, due to the branching action of the decision tree. Some subset $\{T(n)\}$ of the training samples $\{T\}$ can reach a current node n. At process block 1544, the available attributes are evaluated to determine an effective split of the samples $\{T(n)\}$. The effective split can be an N-way partition of the samples $\{T(n)\}$ into child partitions, where N can be 2, 3, in the range 4 to 10, 11 to 100, or 101 to 1,000. An effective split can be determined according to variety of effective split criteria. In some examples, the effective split can be one that minimizes the residual variance (or another criterion, such as the Gini index or cross-entropy) of an output label summed over the child partitions, while in other examples, the effective split can be any split that provides a predetermined improvement in variance. The output labels of the training data records $\{T(n)\}$ are included within the training data 1505 and can be accessed from storage 1502. In some examples, the effective split can be constrained to avoid excessive imbalance between the child partitions, the quantity sought to be optimized by the split can be weighted to disfavor unbalanced splits or large numbers of partitions. In some examples, the number of partitions, the effective split criterion, or any constraint can all be predetermined, selected, or optimized as hyperparameters. In other examples, the number of partitions, the effective split criterion, or any constraint can be dynamically determined. For example, if the split is based on a categorical variable having four values, then the number of partitions can be set to four. A constraint or weighting related to imbalance can be dynamically adjusted, depending on the number of training samples $\{T(n)\}$.

With the effective split determined, the split criterion is added to node n of the current decision tree at process block 1546 and, at process block 1548, child nodes c=1 . . . N are set up as daughter nodes of node n, with respective training samples $\{T(c)\} \subset \{T(n)\}$ determined by the split. With the training for node n complete, the method proceeds to block 1539.

Meanwhile, for leaf nodes, the method reaches process block 1532 as described above. At process block 1532, one or more output labels are set for the current node. In some examples, a decision tree outputs a single value, while in other examples a decision tree can output an array of values. These output value(s) can be determined at node n based on known values for the samples $\{T(n)\}$. The samples $\{T(n)\}$ can often contain more than one sample. In such cases, an output value can be determined using a representative metric such as mean, weighted mean, median, mode, or other representative metric of the output value, over the samples $\{T(n)\}$. A weighted mean can use individual weights for each of the T(n) samples according to a quality associated with the sample. Where more than one output values are set, the same or different representative metrics can be used for the multiple output values. In some examples a pair of output values is set, a first output value for a parameter of interest (e.g. friction value, or time-to-fault), and a second output value for a confidence level or error measure associated with the first output value. The confidence level or error measure can be based upon the quality of the splits obtained along a decision path from the root node of the current tree to the current leaf node.

At process block 1539, if there are remaining nodes at the current level of the current random tree, the method follows the N branch to process block 1530 to evaluate a next node, otherwise the method follows the Y branch to process block 1529.

At process block 1529, the method checks whether all levels of the random tree have been completed. This determination can be made based on a predetermined maximum number of levels (another hyperparameter) or based on having reached a condition of no further non-leaf nodes in the current tree. If evaluation of further levels is required, the method follows the N branch back to process block 1520 to evaluate a next level, otherwise the method follows the Y branch to process block 1519.

At process block 1519, the method checks whether any more random trees are required to be configured. This determination can be made based on a predetermined maximum number of random trees, or based on a predetermined test (another hyperparameter) as to the predicted quality of classification achievable with the trees already trained. If training of further trees is required, the method follows the N branch back to process block 1510 to evaluate a next random tree, otherwise the method follows the Y branch to optional process block 1550.

When the method reaches process block 1550, M random trees have been trained, with each having Z(m) leaf nodes, where m=1 . . . M denotes a particular random tree. To obtain a single output value from respective output values of each decision tree, combination logic is configured at process block 1550. The combination logic can use a representative metric such as mean, weighted mean, median, mode or other representative metric of the output values over the M trees. A weighted mean can use weights for each tree's output based on a confidence level or error measure of that tree's output. In some examples, the combination logic is predetermined and process block 1550 can be omitted from the method.

With all decision trees trained and combination logic configured, the method proceeds to process block 1560, where the trained random forest 1595 is stored on a local or remote non-transitory medium such as storage 1592.

Unlike some other classifiers which can be trained by sequentially applying training samples to a fully built untrained or partially trained classifier, the decision tree training procedure described above uses all training samples to grow a partially built classifier in which the completed portion of the classifier is fully trained. As described herein, a random forest can incorporate classifiers other than decision trees, which can be trained in corresponding fashion.

The power of a random forest arises in being able to leverage multiple weak classifiers to build a strong classifier.

In some examples, regularization hyper-parameters can be computed by grid search based on a N-fold cross-validation, or using the EGO optimization method on a N-fold cross-validation, where N can be three, five, ten, or another positive integer. In some examples, a minimum number of training samples can be required to generate a split at a node, for example 30 samples. In further examples, a minimum number of training samples can be required to reach each leaf node, for example 30 samples. In additional examples, the number of features to be considered to determine a split can be constrained to a maximum, for example 40 features out of 100 features available in total.

XVIII. Second Example of Random Forest Training

Figure 16A:
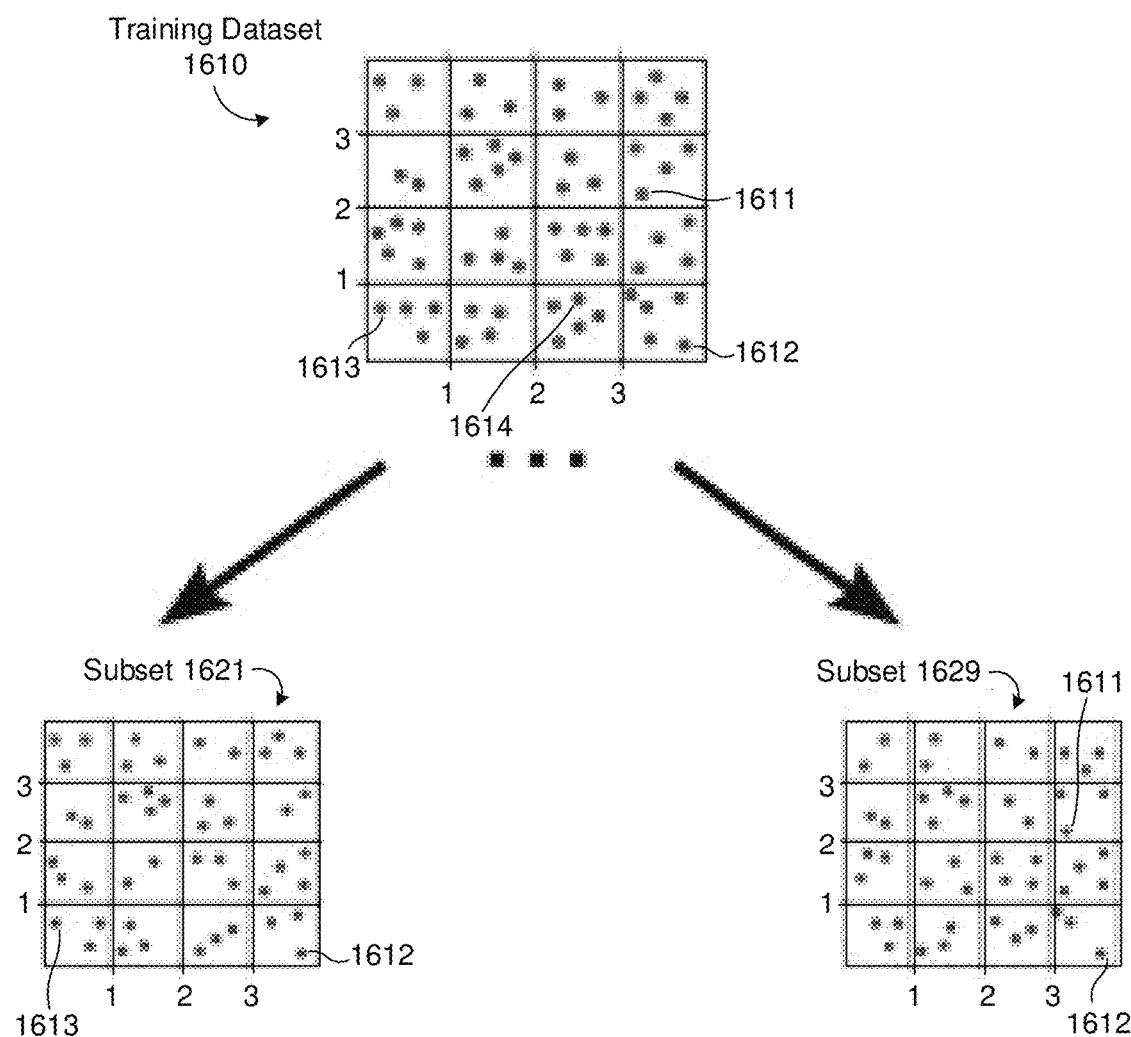
FIG. 16A is an illustration of example training data used to train a random forest.
Figure 16B:
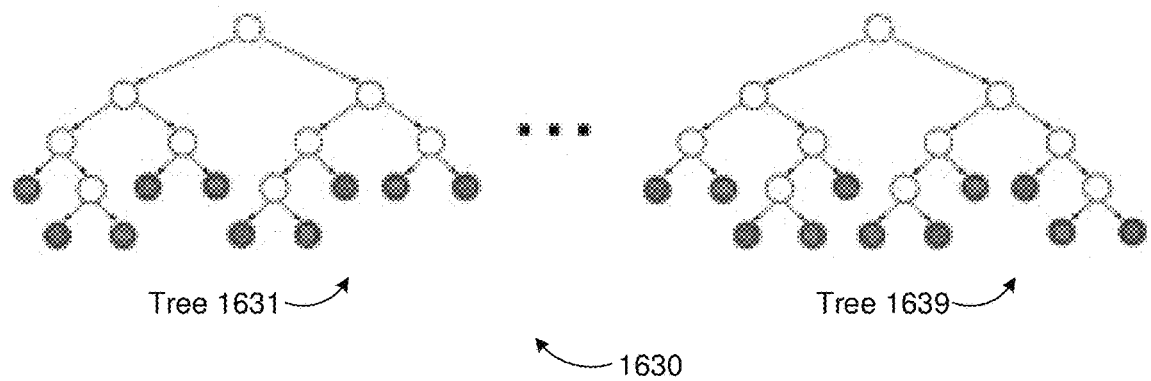
FIG. 16B is an illustration of a trained random forest.

FIGS. 16A-16B provide an illustrative example of random forest training. In FIG. 16A a complete training dataset 1610 is shown. Each marker 1611-1614 in the grid represents a single training data sample. In this example, the training data samples belong to two classes, as indicated by the difference in markers: green symbols are used for markers 1611-1612 to indicate that these samples belong to class G, and red symbols are for markers 1613-1614 to indicate that these samples belong to class R. The samples are organized along two feature dimensions into unit cells for clarity of illustration.

To generate a random forest 1630 comprising N trees 1631 . . . 1639, the training dataset 1610 is sampled N times to obtain N subsets 1621 . . . 1629 for the respective target trees 1631 . . . 1639. Examining the lower left cells of subsets 1621, 1629, sample 1613 is present in subset 1621 but absent from subset 1629. Sample 1611 is present in subset 1629 but absent from subset 1621. Samples can be present in more than one subset, for example sample 1612 is present in both subsets 1621, 1629. Samples need not occur in any subset, for example sample 1614 is absent from both subsets 1621, 1629. The sampling used to form subsets 1621 . . . 1629 can be random, with or without constraints.

By using different training data for the individual decision trees of a random forest, the trees can be decorrelated. This technique is sometimes called bootstrap aggregating, or simply "bagging."

FIG. 16B shows an ensuing trained random forest 1630, which includes a plurality of individual decision trees 1631 . . . 1639, after training (building) using the training data subsets 1621 . . . 1629. The decision trees terminate in leaf nodes shown with symbols indicating whether the leaf node corresponds to a determination of class "G" or class "R." The trees 1621 . . . 1629 have different structures at least partly because they have been trained with differing training data subsets 1621 . . . 1629.

XIX. Example Use of a Random Forest Classifier

Figure 17:
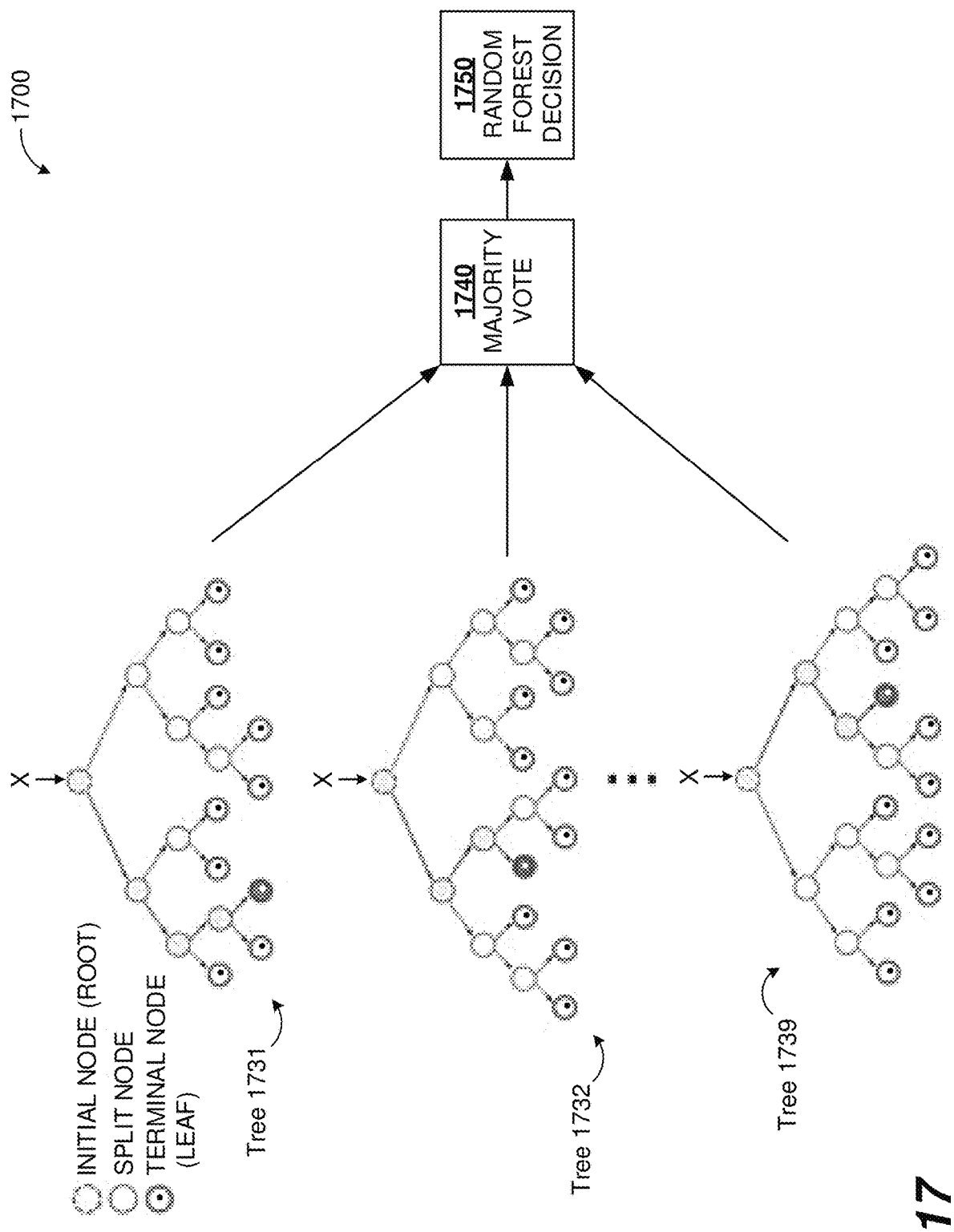
FIG. 17 is a diagram illustrating the use of a random forest classifier.

FIG. 17 is a diagram illustrating the use of a random forest classifier. Trained random forest 1700 is a classifier incorporating N trees 1731, 1732, . . . 1739 as shown. An incoming sample is independently processed by each decision tree 1731 . . . 1739, starting at the root nodes and traversing level by level until a leaf node is reached. In this example, each leaf node results in a binary determination of class (label): "G" or "R." The results of the several decision trees 1731 . . . 1739 are processed by combination logic 1740 to arrive at a consolidated result 1750. For a binary classifier, the combination logic 1740 can be a majority vote as depicted. For other classifiers, other combination logic can be used as disclosed herein. In some examples, a mean or weighted mean of the various decision tree labels can be used.

XX. Further Example Aspects and Variations

Sample Parameters

FIG. 18 is a set of charts illustrating various sampling parameters that can be used as sample features for classification. FIG. 18A shows a detected signal representing local dynamic strain within a medium in a laboratory experiment. A local strain-meter (piezo or accelerometer) measures the local deformation at a high frequency, i.e. the dynamic strain, effectively recording the seismic or acoustic signal. This seismic signal comes from granular (microscopic) interactions. The stress meter records the overall (macroscopic) shearing force on the fault.

Overlapping time windows of this signal are treated as distinct samples, and analyzed to obtain various sample parameters shown in FIGS. 18B-18E. The common horizontal axis represents running time during an experiment for the strain signal and each of the signal parameters. The duration of a time window is indicated by the width of dashed line box 1820. Using 10% time offset for successive samples (90% overlap), the width of box 1820 corresponds to 10 samples.

Figure 18A:
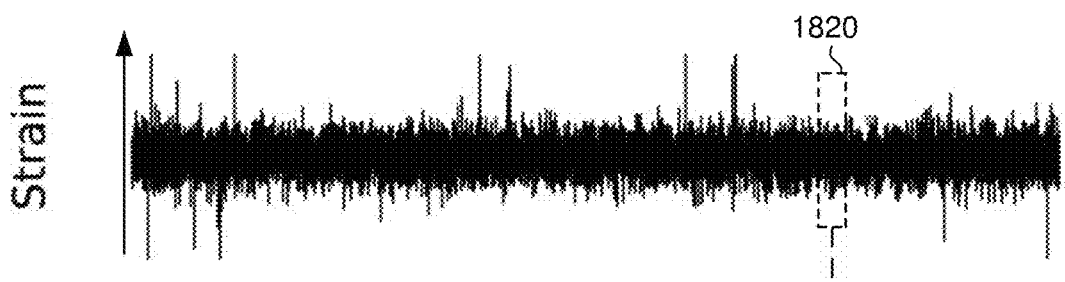
FIGS. 18A-18E are charts illustrating various sampling parameters that can be used as sample features for classification.
Figure 18B:
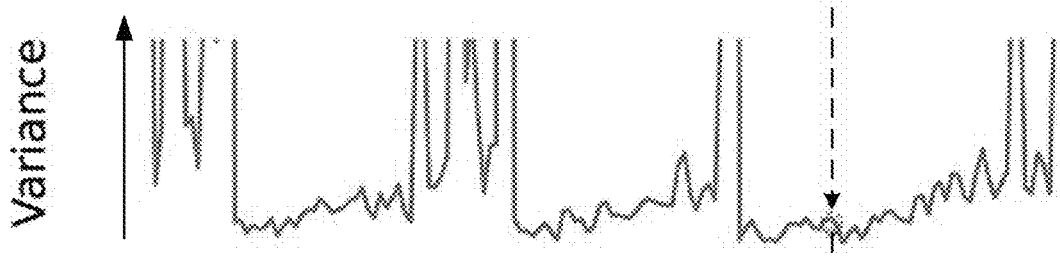
Figure 18C:
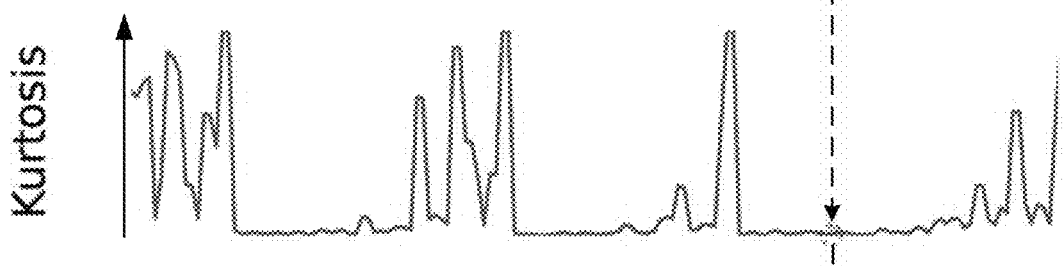

FIGS. 18B-18C are graphs of signal variance and kurtosis respectively, calculated for the succession of time windows. Variance and kurtosis are extracted signal parameters that can be used as sample features for classification according to disclosed technology. Skew ($3^{rd}$ moment), mean ($1^{st}$ moment), or other moments can also be used. The moments can be centered about the mean of the signal, and can be normalized, or un-normalized. In this group of features, a central percentile range can be included, such as the inter-quartile range from $25^{th}$ to $75^{th}$ percentiles of the sample data points.

Figure 18D:
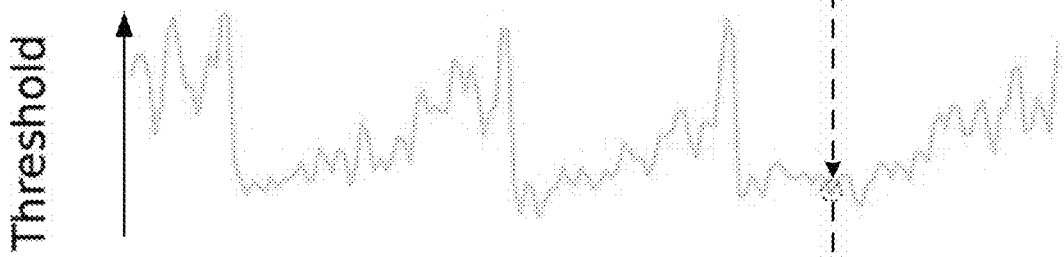

FIG. 18D is a graph indicating the number of data points within the sample that exceed a preset threshold. This and similar features can be used as indicators of precursor activity, when a burst of emission causes an unusual number of samples to exceed the threshold. The feature can be based on previously established percentile points, such as any among the $91^{st}$-$99^{th}$ percentiles. Optionally, inverse signal measures such any among the $1^{st}$-$9^{th}$ percentiles can be used. The feature can be defined as a number of data points or as a fraction of time.

Figure 18E:
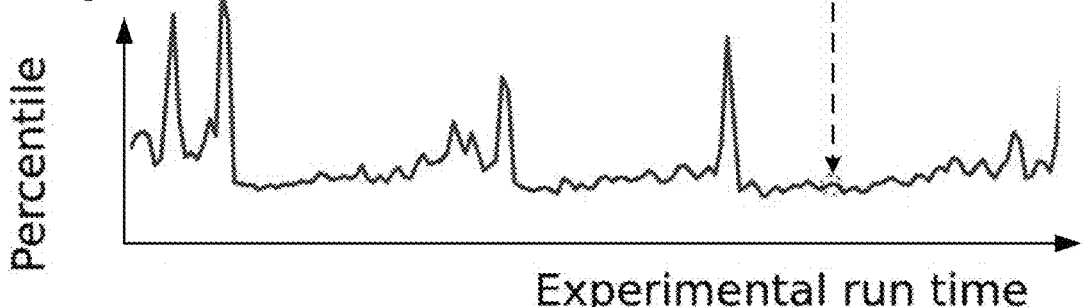

FIG. 18E is a graph showing the value of a preset percentile of the sample data points. Other similar features which can be used include the minimum, maximum, or difference between minimum and maximum for the data points in the sample. Further features which can be used as sample parameters include autocorrelation measures and features derived from a power spectrum. The integral of the power spectrum over a predetermined or tuned frequency band can be used as a feature.

The sample parameters can be evaluated by applying a windowing function to the sample data points, such as a rectangular, Hamming, or Hanning window. The sample parameters used as features for classification can include one or more of these or other sample parameters, or can use raw or processed signal values themselves.

Time correlation or spectral features can also be implemented. The autocorrelation of a time series $\in_t$ for a predetermined offset h can be defined as $$\rho(\epsilon; h) = \frac{E[(\epsilon_t - \bar{\epsilon})(\epsilon_{t-h} - \bar{\epsilon})]}{(\text{Var})(\epsilon_t)} \quad (1)$$

where E denotes expectation value, Var denotes variance, and the overline denotes the mean value. A partial correlation function can also be used. Another feature can be the integral of the power spectrum within a predetermined frequency band appropriate to the medium under study and the observed signals.

Any of these signal parameters can be calculated within a computing node such as 150 or 430, at a sensor such as 121 or 421, or at an auxiliary device or computer within the signal path. In examples, the total number of features used can take various values such as 1, 2, 3, 4, 5, 6-10, 11-25, 26-50, 51-200, 201-1000, or even more. In some examples, about 100 features can be used. In other examples, an initial random forest classifier can be trained with a larger set of features (e.g. 100-1000 features or more). After the more valuable features are determined (i.e. features having greatest impact on the coefficient of determination), a new random forest can be built using only the more valuable features (e.g. less than 20 features), to reduce the computational burden of feature extraction during live real-time operation of the classifier. The valuable features in a particular regime, geological environment, or application can differ from the valuable features in another regime, another geological environment, or another application.

Figure 19:
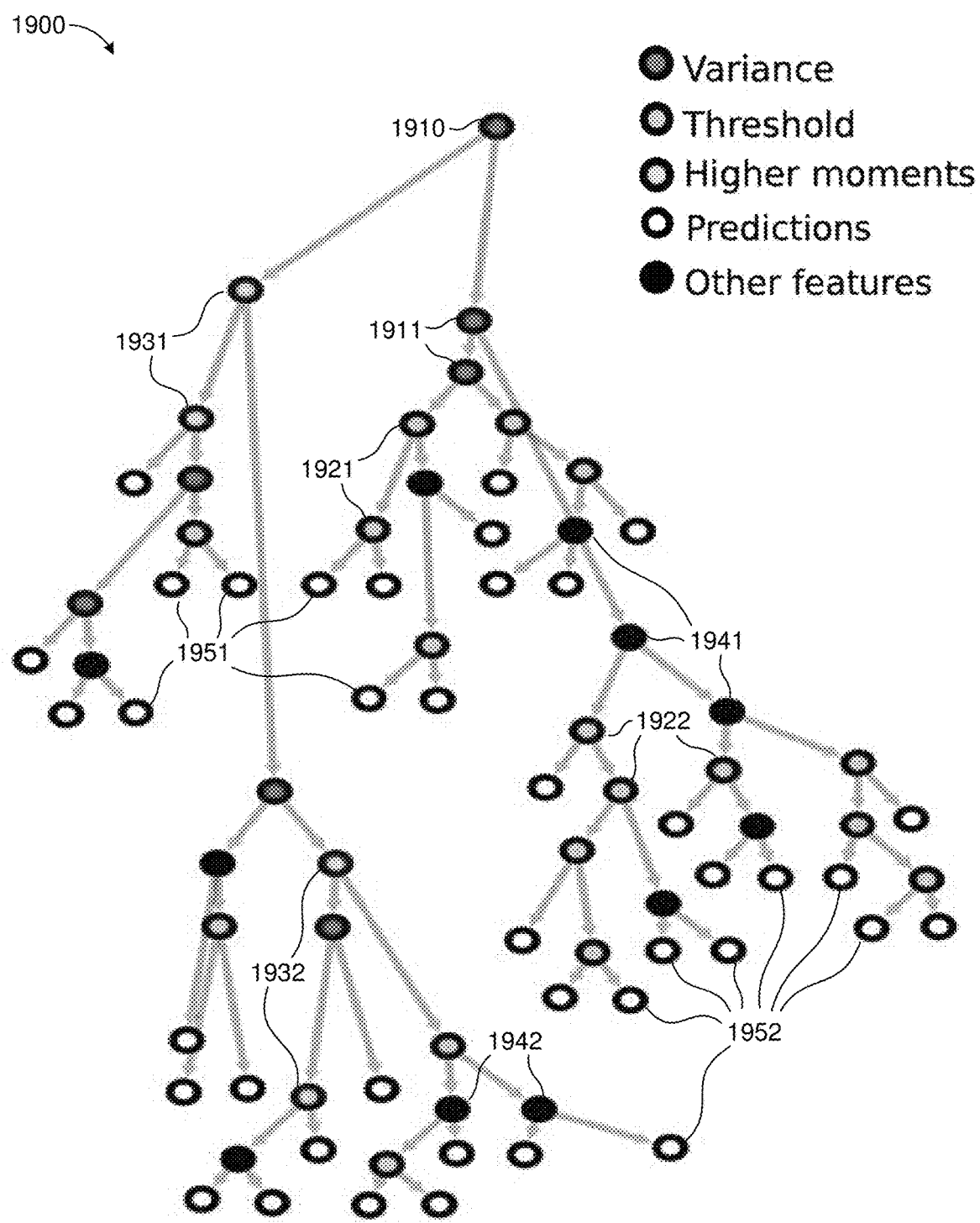
FIG. 19 illustrates a decision tree which uses a variety of extracted sample parameters and other features for classification.

FIG. 19 illustrates a decision tree 1900 which uses a variety of extracted sample parameters and other features for classification. The symbols used for non-leaf nodes of the decision tree 1900 indicate the type of feature used for branching at that tree node. For example, root node 1910 and nodes 1911 use sample variance as a criterion for making a split. Nodes 1921, 1922 use counts of data points above a threshold as a discriminant, while nodes 1931, 1932 use higher moments of the distribution of data points as a decision criterion. Nodes 1941, 1942 use other features as a branching criterion. A determination of which feature to use for branching at any non-leaf node can be made during training, for example at process blocks 1542-1544 in the flowchart of FIG. 15.

Nodes 1951, 1952 are leaf nodes at which no decision or branching occurs, and accordingly no decision criterion is used. Labeling of the particular class determined at the various leaf nodes is omitted from FIG. 19 for clarity of illustration. FIG. 19 depicts a decision tree for binary classification, wherein the split at each non-leaf node is a 2-way split; however neither of these is a requirement. A decision tree can lead to classification among any number of classes, or even according to a continuous variable. A non-leaf node can have degree (number of child nodes) that is greater than two, even for a binary classifier.

Gradient Boosted Trees

Another decision tree ensemble method such as gradient boosted trees (e.g. XGBoost) can be used. Hyperparameters of a gradient boosted trees model can be determined using an EGO (efficient global optimization) method, maximizing the performance using 5-fold cross-validation on the training set. As shown in FIGS. 6C-6D, the first 60% of the experimental data can be used for training, while the remaining 40% can be used for testing. Other apportionments can be used.

Each decision tree can estimate the frictional state using a sequence of decisions based on the statistical features derived from the temporal samples. The gradient boosted trees model can be trained by providing the algorithm with both (i) the time series of the measured friction, displacement, or strain, and (ii) features of the measured acoustic emission signal. The resulting ML model can be tested on a portion of data not used in training. During testing, the ML model has access only to the features of the acoustic emission data, and does not have access to any output measurements such as shear or friction. A coefficient of determination ($R^2$) can be used as an evaluation metric.

With the XGBoost implementation, the importance of specific features can be determined according to the number of times a given feature is used to build a split in the XGBoost model. In some examples, the variance of the raw acoustic signal, which is proportional to the average acoustic power over a sample, is found to be the most important feature, accounting for about 80% of the variance of the training dataset. In fact, FIGS. 7, 8 show classifier examples built using acoustic power as the sole feature. The single-feature classifier performance ($R^2 \approx 0.8$) can be compared with $R^2 \approx 0.9$ achieved with a broader set of sample features. In some examples, above-threshold counts, kurtosis, or counts outside extreme quantiles can improve the coefficient of determination. Because a single-feature classifier can model any arbitrary one-dimensional function, even a single-feature classifier can provide non-trivial predictive capability, beyond what a comparable statistics-based model can achieve.

Importance of Frictional State in Earthquakes and Laboratory Faults

Most tectonic earthquakes take place when juxtaposed crustal blocks that are locked or slowly slipping overcome the static fault friction and abruptly slide past one another. A rupture initiates and propagates along the fault plane, eventually coming to a stop as the dynamic fault friction puts a brake on continued slip, and the available energy has been dissipated. It is the frictional state that controls how the fault ruptures, its nucleation, and how big an earthquake will ultimately become. The fault frictional state also controls when the next event may take place under given anthropogenic (e.g. fluid-driven) forces.

Prior to Applicants' work, inferring the frictional state on faults, or where a fault is within its seismic cycle, could be extremely challenging. Seismic wave recordings at the time of events can inform about characteristics such as rupture velocity and can be used to calculate important parameters such as earthquake magnitude, the evolution of elasticity following an earthquake, or slip distribution. However, seismic waves have not been used to directly examine the frictional state throughout the entire seismic cycle, nor its distribution along the fault. In fact, no geophysical data set has enabled the direct and continuous quantification of the fault frictional state in fluid injection environments.

Determination of frictional characteristics have been attempted from theory, simulations, and laboratory experiments. Large scale stress simulations based on fluid flow or plate movements can provide estimates of stress and frictional state on a fault, but with significant error bounds, and have been unable to make predictions of future failures.

Laboratory experiments such as those described herein operate on the same principles as terrestrial earthquake cycles or fractures in man-made structures. The disclosed technologies, developed and validated in an indoor or outdoor laboratory setting, are applicable to a wide range of natural or man-made media. This includes applications to well collapse, wastewater injection, hydrocarbon extraction, geothermal harvesting, or CO2 sequestration.

Determining a Split in a Decision Tree

Above, process block 1544 has been described, at which an effective split of training data is made. Here, details of an example split are provided. Given a feature $X_m$ from a set of features {X} and a partition threshold c, the training data can be partitioned into $N_L$ samples $S_L$ having $X_m \leq c$ and $N_R$ samples $S_R$ having $X_m > c$, where the set of samples S reaching the current decision tree node is $S = S_L \cup S_R$, with $N = N_L + N_R$. Using var(x) to denote the variance of x, the second moment of the training data at the current node is $M_1 = N \cdot \text{var}(S)$. After split, the total second moment of the child nodes is $M_2 = N_L \cdot \text{var}(S_L) + N_R \cdot \text{var}(S_R)$. It can be desirable to select $X_m$ and c to minimize $M_2$, meaning that the largest feature contributing to $M_1$ is $X_m$. That is, $X_m$ can be selected from the features {X} available for the current node (discussed above in context of process block 1542) and a threshold value can be determined that minimizes $M_2$. Variance can be a suitable measure for determining an effective split particularly in examples such as regression, having continuous output labels. For other classifiers, such as bi-modal or multi-modal classifiers, other properties such as cross-entropy or Gini index can be used for determining effective splits.

In some examples, an exhaustive search can be computationally expensive, and an effective split can be selected from among an incomplete finite search. The effective split can be determined based on the minimum $M_2$ among the considered possibilities, or can be determined with applied constraints. In further examples, two or more partition thresholds can be used, with consequently three or more child nodes. In some examples, the feature $X_m$ is a binary or categorical variable, and no partition threshold c is required.

In the described example, once an effective or optimal split has been determined, the training data samples $S_L$ and $S_R$ are assigned to respective child nodes, and the process is recursively applied to the child nodes until a termination condition is reached. Different branches of a decision tree can reach termination at different depths within the tree.

Selecting Hyperparameters by the EGO Algorithm

The EGO algorithm can provide guided selection of various hyperparameters required to implement a classifier according to the disclosed technology. A function f(x) is defined to model the performance (e.g. $R^2$) as a function of a set of hyperparameters x. The function f(x) can be treated as a Gaussian process and is unknown at the outset. Initially, a few sets of hyperparameters are chosen, and the performance measure is calculated or estimated for each. The best of the hyperparameter sets is chosen as $x^+_0$, and the entire results form a database that can be used to estimate the Gaussian process f(x).

Then, an iterative procedure is commenced. With $x^+_T$ denoting the best hyperparameter set after T iterations, $x_{T+1}$ is chosen to maximize the expected value of $f(x) - f(x^+_T)$ when $x = X_{T+1}$. $X_{T+1}$ is added to the database, the Gaussian process f(x) is revised, and a new best set $x^+_{T+1}$ is determined, which may or may not be the same as $x^+_T$. The iteration stops when a convergence condition is reached, which can be a fixed number of iterations, or improvements in $R^2$ below a threshold.

As an example, hyperparameter selection by an EGO method can guide selection of time windows having a duration of about 2.5% of an average period of a seismic cycle, with 90% overlap between successive samples. The performance of a random forest or other classifier can be fairly insensitive to the specific hyperparameter values used. In some examples, a 2× variation of any single hyperparameter results in only a few percent variation in the $R^2$ performance.

Deep Learning

In some examples, a deep convolutional neural network (CNN) can be trained to recognize precursory seismic signals related to the failure of the medium. The CNN can be trained to recognize such signals on raw seismic data or on the spectrogram of the seismic data, and can also be trained to determine the origin of the precursory seismic signal in space. This component of the technology can improve the signal to noise ratio of the microscopic acoustic emission signals used to determine the physical state of the terrestrial medium. In the analysis of "tremor" seismic signals in Cascadia, which are seismic signals related to slow earthquakes, a deep learning algorithm can precisely identify tremor signals using one single seismic station. This kind of analysis usually requires cross-correlation between many stations, and short-term detection of tremor signals at one single station has long been considered very difficult or even impossible. With this new method for detecting tremor signals, the evolution of slow earthquakes can be accurately tracked in time and space, even from a single station. Using the additional CNN information as a feature in machine learning estimates of displacement can provide noise-free and considerably more precise estimates than can be obtained from GPS. In examples from Cascadia, introducing the CNN feature into a machine learning model caused correlation and $R^2$ to increase by more than 10%. Single-station estimation with CNN has been found to meet or exceed multi-station machine learning estimates without CNN. This analysis could also enable the analysis of tremor signals in areas where they are too weak to be detected at multiple stations.

Additional Features

In examples, the failure-prone medium can include one or more of: an earthquake fault zone, a landslide zone, an avalanche zone, or a volcanic zone, a rock specimen, a portion of a chassis, a portion of a drivetrain component, a portion of an engine, a portion of a motor, a fastener, a solid, a concrete solid, a reinforced composite, or an orthopedic material. The failure-prone medium can be in a state of fracture, incipient fracture, crack growth, ongoing fault movement, or partial separation.

The macroscopic parameter can include predicted time to failure, predicted duration of a failure, or predicted energy release of a failure; fault area, fault density, fault length, fault width, fault location; available energy; or fault system permeability, fault system permeability variation; fluid pressure, or fluid pressure variation. The microscopic processes can include one or more of: crack propagation, fracture, asperity wear, slip, change of state, chemical reaction, fluid flow, or fluid turbulence. The signals propagated from the medium to the sensors can include one or more of: acoustic emission, a laser signal, a pressure signal, an electric field, or a magnetic field. An apparatus according to the disclosed technology can operate on these signals, continuous representations of these signals, or discretized parameters obtained from these signals. In examples, estimation of a macroscopic parameter can include or be accompanied by determination of an error measure or confidence measure associated with the macroscopic parameter estimate. Failure prediction can be based at least partly on the macroscopic parameter estimate, an associated error measure, and/or an associated confidence measure.

Sensors can include a microphone, a seismometer, a strain gauge, a piezoelectric transducer, a polarimeter, a geophone, an accelerometer, a linear variable differential transformer (LVDT), a linear variable differential capacitor (LVDC), an interferometer, a vibration sensor, a pressure sensor, or an electronic amplifier.

The trained machine learning model can include one or more of: a trained random forest, a trained neural network, a trained support vector machine, a trained decision tree, a trained gradient boost machine, trained logistic regression, or trained linear discriminant analysis. In examples, a first trained machine learning model can output a first macroscopic parameter, and a second trained machine learning model, operating on the first macroscopic parameter and/or other outputs of the first trained machine learning model can output a second macroscopic parameter. The functionality of feature or parameter extraction from received signals, building or training one or more machine learning models, and operating the trained machine learning model(s) to determine macroscopic parameters and/or make predictions regarding a future failure event can be distributed among respective computing nodes, hardware processors, and/or virtual machines. Computer-executable instructions for operating the computing node(s) can be distributed among one or more non-transitory computer-readable storage media. Classifications performed by the trained machine learning models can operate on any combination of received signals, extracted signal parameters, samples associated with respective time windows, predetermined parameters, and/or predetermined database(s). Classifiers can include one or more of: a random forest, a neural network, a support vector machine, a decision tree, a gradient boost machine, logistic regression, or linear discriminant analysis. A training procedure can include one or more of: training a random forest, training a neural network, training a support vector machine, training a decision tree, training a gradient boost machine, training logistic regression, or training linear discriminant analysis. Configuring a computing node to implement a trained machine learning model or execute a trained classifier can include one or more of: defining and storing trained parameters accessible by previously stored instructions embodying a machine learning model; automatically generating and storing executable instructions embodying a trained machine learning model; or automatically generating and storing executable instructions equivalent to a trained machine learning model.

Samples used for training, classification, macroscopic parameter determination, or failure prediction can include any combination of: failure event data, data between failure events, subthreshold data. In examples, prediction of a future failure event can be made using only input samples of data between failure events, or using only input samples of subthreshold data, together with a trained classifier.

Extracted signal parameters (or features) can include one or more of: an amplitude, a power, a variance, a standard deviation, a kurtosis, a statistical moment, an average, a peak value, a fitted parameter, a spectral density, or a time constant. Features can also include a count of data points above a threshold, a count of data points below a threshold, a count of data points above a percentile of at least 90%, or a count of data points below a percentile of at most 10%.

While building a decision tree classifier or other classifier, selection of a subset of features at a given classifier node can be performed independently of any acts performed for parent nodes of the given node. In other examples, the selection can be constrained by features used to partition one or more parent nodes of the given node. Tree partitioning can be always binary. In other examples, at least one tree node can have an N-way partitioning, with N 2. Building or training a random forest classifier can include configuring combination logic to determine an output value of a macroscopic parameter for the random forest based on output values of the macroscopic parameter for at least one of the decision trees constituting the random forest. Training data can be obtained from the fluid-injected medium, or from a medium distinct from the fluid-injected medium.

An alert can include one or more of: a signal transmitted to an annunciator proximate to the fluid-injection site; a signal transmitted to an annunciator proximate to a location of the predicted failure; a message transmitted over a communication network to one or more destinations; or an audible signal emitted proximate to the apparatus. The alert can include a message including one or more of time, energy, duration, location, or type of the predicted failure. Alerts can be sent to receivers such as an annunciator, an email server, a mobile computing device, or a network adapter. Receivers can be part of a civil defense network, an early warning system, a public broadcast network, or a messaging system.

XXI. Example Computing Environment

Figure 20:
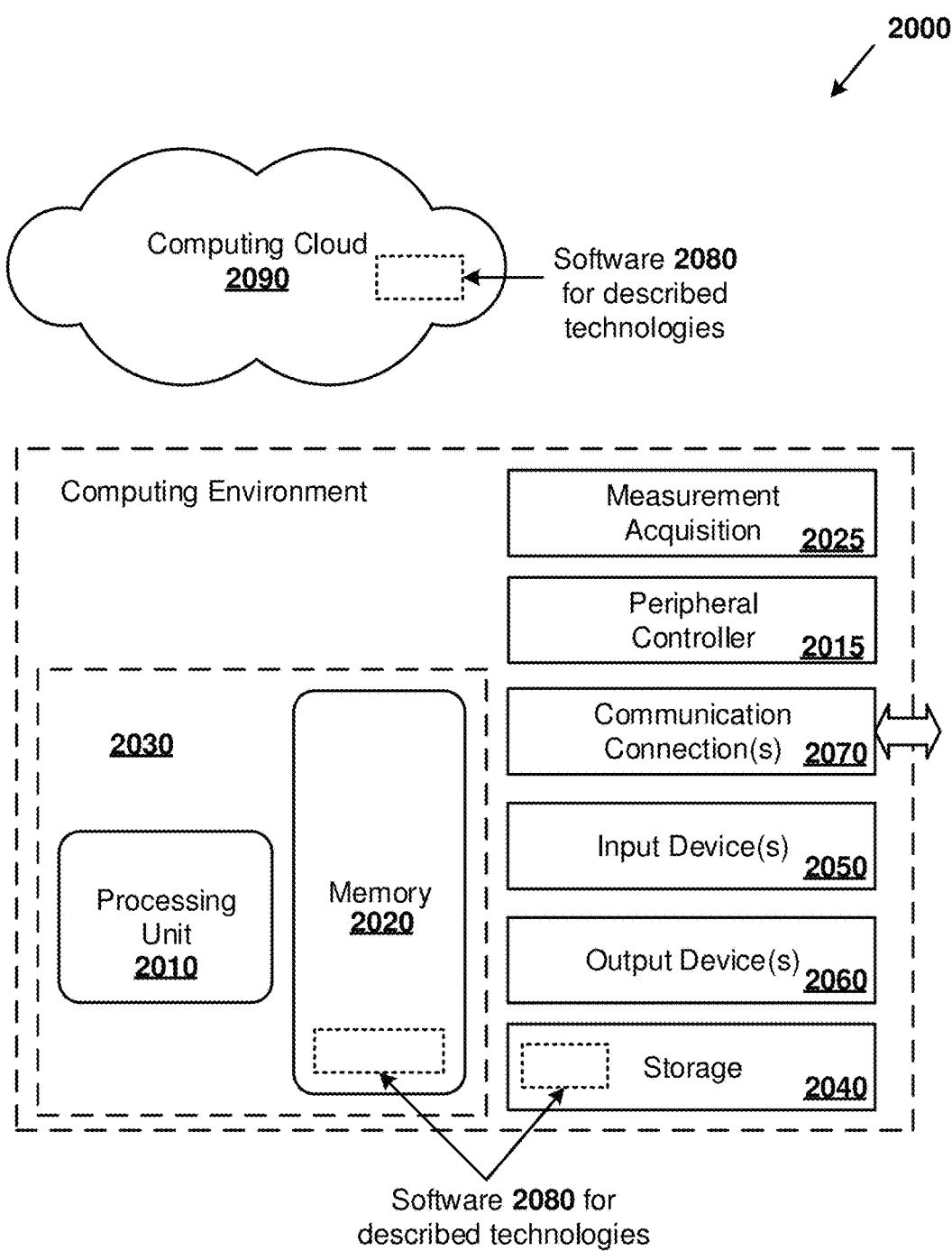
FIG. 20 illustrates a generalized example of a suitable computing environment in which described embodiments, techniques, and technologies, including generating and analyzing measurement data, can be implemented.

FIG. 20 illustrates a generalized example of a suitable computing environment 2000 in which described examples, techniques, and technologies, including generating or analyzing measurement data, extracting sample parameters, training a classifier, performing classification, estimating output parameters, evaluating critical state, or generating or disseminating an alert, can be implemented. For example, the computing environment 2000 can implement all of the functions described herein with respect to FIG. 1-4, 6, or 10-17.

The computing environment 2000 is not intended to suggest any limitation as to scope of use or functionality of the technology, as the technology may be implemented in diverse general-purpose or special-purpose computing environments. For example, the disclosed technology may be implemented with other computer system configurations, including hand-held devices, multiprocessor systems, microprocessor-based or programmable consumer electronics, network PCs, minicomputers, mainframe computers, compute clusters, supercomputers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 20, the computing environment 2000 includes at least one central processing unit 2010 and memory 2020. In FIG. 20, this most basic configuration 2030 is included within a dashed line. The central processing unit 2010 executes computer-executable instructions and may be a real or a virtual processor. In a multi-processing system, multiple processing units execute computer-executable instructions to increase processing power and as such, multiple processors can be running simultaneously. The memory 2020 may be volatile memory (e.g., registers, cache, RAM), non-volatile memory (e.g., ROM, EEPROM, flash memory, etc.), or some combination of the two. The memory 2020 stores software 2080, images, and video that can, for example, implement the technologies described herein. A computing environment may have additional features. For example, the computing environment 2000 includes storage 2040, one or more input devices 2050, one or more output devices 2060, and one or more communication connections 2070. An interconnection mechanism (not shown) such as a bus, a controller, or a network, interconnects the components of the computing environment 2000. Typically, operating system software (not shown) provides an operating environment for other software executing in the computing environment 2000, and coordinates activities of the components of the computing environment 2000.

The storage 2040 may be removable or non-removable, and includes magnetic disks, magnetic tapes or cassettes, CD-ROMs, CD-RWs, DVDs, or any other medium, including cloud storage, which can be used to store information and that can be accessed within, or from within, the computing environment 2000. The storage 2040 stores instructions for the software 2080 and measurement data, which can implement technologies described herein.

The input device(s) 2050 may be a touch input device, such as a keyboard, keypad, mouse, touch screen display, pen, or trackball, a voice input device, a scanning device, or another device, that provides input to the computing environment 2000. The input device(s) 2050 can also include interface hardware for connecting the computing environment to control and receive data from measurement acquisition components, including data acquisition systems coupled to a plurality of sensors, or a sensor network.

For audio, the input device(s) 2050 may be a sound card or similar device that accepts acoustic signal input in analog or digital form, or an optical disc reader that provides audio samples to the computing environment 2000. The output device(s) 2060 may be a display, printer, speaker, CD-writer, or another device that provides output from the computing environment 2000. A measurement acquisition subsystem 2025 or a peripheral controller 2015 can also be included within computing environment 2000.

The communication connection(s) 2070 enable communication over a communication medium (e.g., a connecting network) to another computing entity. The communication medium conveys information such as computer-executable instructions, compressed graphics information, video, or other data in a modulated data signal.

Some examples of the disclosed methods can be performed using computer-executable instructions implementing all or a portion of the disclosed technology in a computing cloud 2090. For example, classification, training, or an EGO method for hyperparameter selection can be performed on remote servers located in the computing cloud 2090 (e.g., as part of the computing environment 2000 of FIG. 1).

Computer-readable media are any available media that can be accessed within a computing environment 2000. By way of example and not limitation, with the computing environment 2000, computer-readable media include memory 2020 and/or storage 2040. As should be readily understood, the term computer-readable storage media includes the media for data storage such as memory 2020 and storage 2040, and not transmission media such as modulated data signals.

XXII. General Considerations

This disclosure is set forth in the context of representative embodiments that are not intended to be limiting in any way.

As used in this application the singular forms "a," "an," and "the" include the plural forms unless the context clearly dictates otherwise. Unless specifically stated or obvious from context, as used herein, the term "or" is understood to be inclusive. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "apply," "estimate," "analyze," "bin," "branch," "build," "discriminate", "estimate," "filter," "loop," "obtain," "receive," "sample," "train," "traverse," "window," and "determine" to describe the disclosed methods. These terms are high-level abstractions of the actual operations that are performed. The actual operations that correspond to these terms will vary depending on the particular implementation and are readily discernible by one of ordinary skill in the art.

One of ordinary skill having benefit of this disclosure will appreciate that optimization refers to a computer-implemented procedure that can be implemented by evaluating a parameter for a plurality of configurations and selecting a configuration and/or parameter value from among the evaluated configurations according to a predetermined criterion. The predetermined criterion can be having a maximum or minimum value of the parameter from among the evaluated configurations, or an optimum value of the parameter according to another criterion, such as closest parameter to a target value. Any number of configurations can be evaluated, even as few as two. In this disclosure, the terms "optimization," "minimization," "maximization," and related terms refer to any procedure that attempts to find objects (such as numerical values, or configurations of a system) that have superior values of a parameter as compared with other similar objects. Particularly, optimization requires neither perfection nor an infinite search. Due to discrete data representations and finite computation time, an optimization procedure can successfully terminate without finding an exact extremum.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented using computer-executable instructions stored on one or more computer-readable media (e.g., non-transitory computer-readable media, such as one or more optical media discs, volatile memory components (such as DRAM or SRAM), or nonvolatile memory components (such as flash drives or hard drives)) and executed on a computer (e.g., any commercially available, proprietary, hosted, or dedicated computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable media). The computer-executable instructions can be part of, for example, a dedicated software application, a software library, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, Python, R, SQL, SAS, MATLAB®, Common Lisp, Scheme, Julia, Dylan, Fortran, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Having described and illustrated the principles of our innovations in the detailed description and accompanying drawings, it will be recognized that the various examples can be modified in arrangement and detail without departing from such principles.

In view of the many possible examples to which the principles of the disclosed subject matter may be applied, it should be recognized that the illustrated examples are only preferred examples of the disclosed subject matter and should not be taken as limiting the scope of the claimed subject matter. We claim as our invention all such embodiments as may come within the scope of the following claims and equivalents thereto.

What is claimed is:

1. A method of predicting a future fluid-driven failure of a terrestrial medium, comprising:
   receiving signals representative of microscopic processes within the terrestrial medium;
   using a trained machine learning (ML) model, performing one or more classifications of the received signals; and
   using the classifications, obtaining estimates of one or more macroscopic parameters of the terrestrial medium indicative of the future fluid-driven failure.

2. The method of claim 1, wherein:
   the microscopic processes are movements or deformations occurring within the terrestrial medium prior to failure,
   the signals are acoustic signals, and
   a given macroscopic parameter, of the macroscopic parameters, is a predicted property of the future fluid-driven failure.

3. The method of claim 1, wherein the terrestrial medium comprises a hydraulic fracturing site or a geothermal energy extraction site, and wherein the microscopic processes comprise fluid-driven fracturing of the terrestrial medium.

4. The method of claim 1, further comprising providing a given macroscopic parameter, of the macroscopic parameters, as an input to an engineering remediation protocol.

5. The method of claim 1, wherein the macroscopic parameters comprise any of the following, or an error measure or a confidence measure of at least one of the following:
   a predicted time to failure, a predicted location of a failure, a predicted duration of a failure, a predicted energy release of a failure, a predicted permeability, a predicted fluid pressure, or a predicted fluid flow.

6. The method of claim 1, further comprising generating the received signals using sensors in mechanical communication with the terrestrial medium responsive to acoustic emission or pressure.

7. The method of claim 1, further comprising:
   responsive to the estimate of at least one of the macroscopic parameters, reducing a rate of fluid injection into the terrestrial medium.

8. The method of claim 1, further comprising:
   extracting signal parameters from the received signals; and
   wherein the classifications are performed on the signal parameters, and the signal parameters comprise one or more of:
   an amplitude, a power, a variance, a standard deviation, a kurtosis, a statistical moment, an average, a peak value, a fitted parameter, a spectral density, or a time constant.

9. The method of claim 1, wherein the macroscopic parameters comprise a first macroscopic parameter, the trained machine learning model is a first trained machine learning model, and the method further comprises:
   using a second trained machine learning model with at least one output of the first trained machine learning model as input, obtain an estimate of a second macroscopic parameter of the macroscopic parameters.

10. A method of configuring an apparatus for determining a macroscopic parameter of a terrestrial medium from second signals representative of fluid-driven microscopic processes within the terrestrial medium, the method comprising:

receiving training data comprising one or more first signals representative of fluid-driven microscopic processes in a first medium and associated values of the macroscopic parameter for the first medium;

applying a machine learning procedure to train or build one or more classifiers using the received training data; and configuring a computing node of the apparatus to perform classifications, using the trained or built classifiers and the second signals, for determining the macroscopic parameter of the terrestrial medium.

11. The method of claim 10, wherein the first medium is distinct from the terrestrial medium.

12. The method of claim 10, wherein the first medium is the terrestrial medium.

13. The method of claim 10, wherein the computing node is configured to use distinct trained or built classifiers in respective phases during and after fluid injection.

14. The method of claim 10, wherein the applying a machine learning procedure comprises at least one of:

training a random forest, training a neural network, training a support vector machine, training a decision tree, training a gradient boost machine, training logistic regression, or training a linear classification model.

15. The method of claim 10, wherein the applying action comprises:

from the received training data, forming a plurality of samples associated with respective time windows, each sample comprising (i) a plurality of features derived from the first signal(s) over the respective time window, and (ii) a value of the macroscopic parameter corresponding to the respective time window.

16. The method of claim 15, wherein a first classifier of the one or more classifiers is a random forest comprising a plurality of decision trees, and wherein the applying action further comprises:

for an instant node of a first plurality of nodes of the decision trees:
identifying the samples that are available at the instant node;
selecting a proper subset of the features;
determining an effective partitioning of the available samples at least partly based on a feature of the proper subset of features; and
generating child nodes of the instant node corresponding to the determined partitioning.

17. The method of claim 16, wherein the determining is based on an amount of reduction of variance or statistical moment from the instant node to at least one of the child nodes.

18. The method of claim 16, wherein the applying action further comprises:

configuring combination logic to determine an output value of the macroscopic parameter for the random forest based on output values of the macroscopic parameter for at least two of the decision trees.

19. One or more computer-readable media storing instructions which, when executed by one or more processors, cause the processors to perform the method of claim 10.

20. A system for predicting a future fluid-driven failure in a terrestrial medium, the system comprising:

one or more sensors; and a computing node communicatively coupled to the sensors by a first network, the computing node comprising at least one processor with memory coupled thereto, the computing node being configured to:

receive, from the sensors, respective signals representative of fluid-driven microscopic processes within the terrestrial medium;

extract at least one classification parameters from the received signals;

perform classification using the extracted classification parameters;

obtain at least one macroscopic parameter estimates from the classification;

using the at least one macroscopic parameter estimate, determine at least one fault system parameter associated with the future fluid-driven failure of the terrestrial medium; and when the at least one fault system parameter indicates a future failure event, issue an alert regarding the future failure event over a second network.

21. The system of claim 20, wherein the sensors are positioned in a vicinity of a given fluid injection site at respective locations chosen based at least partly on differential remote sensing measurements of a displacement field.

22. The system of claim 20, further comprising one or more receivers coupled to the computing node over the second network, wherein the receivers are part of a fluid injection control station and are situated to receive the alert issued by the computing node.

* * * * *